(12) United States Patent
Hai et al.

(10) Patent No.: US 11,132,527 B2
(45) Date of Patent: Sep. 28, 2021

(54) PHOTO-SENSING DETECTION APPARATUS, DISPLAY APPARATUS, METHOD OF FINGERPRINT DETECTION, AND METHOD OF OPERATING DISPLAY APPARATUS

(71) Applicant: BOE Technology Group Co., Ltd., Beijing (CN)

(72) Inventors: Xiaoquan Hai, Beijing (CN); Haisheng Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/959,237

(22) PCT Filed: Sep. 17, 2019

(86) PCT No.: PCT/CN2019/106225
§ 371 (c)(1),
(2) Date: Jun. 30, 2020

(87) PCT Pub. No.: WO2021/051276
PCT Pub. Date: Mar. 25, 2021

(65) Prior Publication Data
US 2021/0019491 A1    Jan. 21, 2021

Related U.S. Application Data

(63) Continuation-in-part of application No. PCT/CN2019/098374, filed on Jul. 30, 2019.

(30) Foreign Application Priority Data

Dec. 14, 2018 (CN) .......................... 201811535591.7

(51) Int. Cl.
*G06K 9/00* (2006.01)
*G06K 9/32* (2006.01)

(52) U.S. Cl.
CPC ......... *G06K 9/0004* (2013.01); *G06K 9/3233* (2013.01)

(58) Field of Classification Search
CPC ................ G06F 3/013; G06K 9/00912; G06K 9/00604; G06K 9/00013;
(Continued)

(56) References Cited

U.S. PATENT DOCUMENTS

| 2014/0355846 A1* | 12/2014 | Lee  | G06K 9/0004 |
| | | | 382/124 |
| 2016/0224816 A1* | 8/2016 | Smith | G06K 9/0004 |

(Continued)

FOREIGN PATENT DOCUMENTS

| CN | 106980850 A | 7/2017 |
| CN | 107230698 A | 10/2017 |

(Continued)

OTHER PUBLICATIONS

International Search Report & Written Opinion dated Jun. 17, 2020, regarding PCT/CN2019/106225.

*Primary Examiner* — Abhishek Sarma
(74) *Attorney, Agent, or Firm* — Intellectual Valley Law, P.C.

(57) ABSTRACT

A photo-sensing detection apparatus is provided. The photo-sensing detection apparatus includes a counter substrate; an array substrate facing the counter substrate; and a fingerprint sensing driver. The array substrate includes a plurality of light sources configured to emit light toward the counter substrate, at least a portion of the light being totally reflected by a surface of the counter substrate away from the array substrate; and a photosensor configured to detect the at least the portion of the light being totally reflected by the surface of the counter substrate away from the array substrate. The photo-sensing detection apparatus is configured to be operated in a time-division mode including a plurality of time- (Continued)

sequential photo-sensing modes. The fingerprint sensing driver is configured to detect a fingerprint information by integrating signals detected in the plurality of time-sequential photo-sensing modes.

20 Claims, 33 Drawing Sheets

(58) Field of Classification Search
CPC ........ G06K 2009/0006; G06K 9/00026; G02F 1/13338; G02F 1/13318; H01L 27/3227; H01L 27/3234; H01L 25/167; G06T 2207/20221
See application file for complete search history.

(56) References Cited

U.S. PATENT DOCUMENTS

| | | | |
|---|---|---|---|
| 2018/0033835 | A1 | 2/2018 | Zeng et al. |
| 2018/0060641 | A1 | 3/2018 | Kim et al. |
| 2019/0272408 | A1 | 9/2019 | Ding et al. |

FOREIGN PATENT DOCUMENTS

| | | | |
|---|---|---|---|
| CN | 107748874 | A | 3/2018 |
| CN | 107832752 | A | 3/2018 |
| CN | 110163058 | A | 8/2019 |
| CN | 110199249 | A | 9/2019 |
| WO | 2019085968 | A1 | 5/2019 |
| WO | 2019114276 | A1 | 6/2019 |
| WO | 2020051840 | A1 | 3/2020 |
| WO | 2020088360 | A1 | 5/2020 |

\* cited by examiner

PHOTO-SENSING DETECTION APPARATUS, DISPLAY APPARATUS, METHOD OF FINGERPRINT DETECTION, AND METHOD OF OPERATING DISPLAY APPARATUS

CROSS-REFERENCE TO RELATED APPLICATION

This application is a national stage application under 35 U.S.C. § 371 of International Application No. PCT/CN2019/106225, filed Sep. 17, 2019, which is a continuation-in-part of International Application No. PCT/CN2019/098374, filed Jul. 30, 2019, which claims priority to Chinese Patent Application No. 201811535591.7, filed on Dec. 14, 2018. Each of the forgoing applications is herein incorporated by reference in its entirety for all purposes.

TECHNICAL FIELD

The present invention relates to display technology, more particularly, to a photo-sensing detection apparatus, a display apparatus, a method of fingerprint detection, and a method of operating a display apparatus.

BACKGROUND

In recent years, various methods have been proposed in fingerprint and palm print recognition. Examples of optical method for recognizing fingerprint and palm print include total reflection method, light-path separation method, and scanning method. In a total reflection method, light from a light source such as ambient light enters into a pixel, and is totally reflected on the surface of a package substrate. When a finger or palm touches the display panel, the total reflection condition of the surface changes locally upon touch, leading to a disruption of the total reflection locally. The disruption of the total reflection results in a reduced reflection. Based on this principle, the ridge lines of a finger may be differentiated from the valley lines. Alternatively, fingerprint and palm print may be recognized by detecting changes in capacitance when a finger or palm touches the display panel.

SUMMARY

In one aspect, the present invention provides a photo-sensing detection apparatus, comprising a counter substrate; an array substrate facing the counter substrate; and a fingerprint sensing driver; wherein the array substrate comprises a plurality of light sources configured to emit light toward the counter substrate, at least a portion of the light being totally reflected by a surface of the counter substrate away from the array substrate; and a photosensor configured to detect the at least the portion of the light being totally reflected by the surface of the counter substrate away from the array substrate; wherein the photo-sensing detection apparatus is configured to be operated in a time-division mode comprising a plurality of time-sequential photo-sensing modes; and the fingerprint sensing driver is configured to detect a fingerprint information by integrating signals detected in the plurality of time-sequential photo-sensing modes.

Optionally, in a respective one of the plurality of time-sequential photo-sensing modes, a plurality of light emitting blocks spaced apart are configured to emit light, which is respectively reflected by a plurality of touch sub-regions in the surface of the counter substrate away from the array substrate; wherein the plurality of touch sub-regions are spaced apart from each other.

Optionally, in a respective one of the plurality of time-sequential photo-sensing modes, light respectively reflected by the plurality of touch sub-regions in the surface of the counter substrate away from the array substrate is respectively detected by a plurality of sensing sub-regions in the photosensor; and the plurality of sensing sub-regions in the photosensor are substantially non-overlapping.

Optionally, adjacent sensing sub-regions of the plurality of sensing sub-regions abut each other.

Optionally, the plurality of time-sequential photo-sensing modes comprise a first mode and a second mode; a plurality of first light emitting blocks spaced apart are configured to emit light in the first mode, which is respectively reflected by a plurality of first touch sub-regions in the surface of the counter substrate away from the array substrate; a plurality of second light emitting blocks spaced apart are configured to emit light in the second mode, which is respectively reflected by a plurality of second touch sub-regions in the surface of the counter substrate away from the array substrate; the plurality of first touch sub-regions are spaced apart from each other; and the plurality of second touch sub-regions are spaced apart from each other.

Optionally, light respectively reflected by the plurality of first touch sub-regions in the surface of the counter substrate away from the array substrate is respectively detected by a plurality of first sensing sub-regions in a first sensing region in the photosensor; light respectively reflected by the plurality of second touch sub-regions in the surface of the counter substrate away from the array substrate is respectively detected by a plurality of second sensing sub-regions in a second sensing region in the photosensor; the first sensing region and the second sensing region are partially overlapping; the plurality of first sensing sub-regions are substantially non-overlapping; and the plurality of second sensing sub-regions are substantially non-overlapping.

Optionally, a total number of the plurality of first light emitting blocks and a total number of the plurality of second light emitting blocks are substantially same.

Optionally, positions of the plurality of first light emitting blocks and positions of the plurality of second light emitting blocks are related by a translational displacement.

Optionally, in a respective one of the plurality of time-sequential photo-sensing modes, a plurality of light emitting blocks are configured to emit light; and the plurality of light emitting blocks have a substantially same size.

Optionally, the substantially same size is a size optimized for achieving a maximum value of a contrast value; wherein the contrast value is defined by $$\frac{|Sr - Sv|}{|Sr + Sv|};$$

wherein Sr stands for signals corresponding to ridges of a fingerprint; and Sv stands for signals corresponding to valleys of the fingerprint.

Optionally, a respective one of the plurality of light emitting blocks comprises a (9 subpixel×9 subpixel) block.

Optionally, the photo-sensing detection apparatus further comprises a touch sensing driver circuit configured to control touch detection of a touch region in the photo-sensing detection apparatus; wherein, in a respective one of the plurality of time-sequential photo-sensing modes, a plurality of light emitting blocks spaced apart are configured to emit light; and the plurality of light emitting blocks are limited in a region corresponding to the touch region.

In another aspect, the present invention provides a display apparatus, comprising the photo-sensing detection apparatus described herein or fabricated by a method described herein; wherein the display apparatus is operated in a time-division mode comprising a display mode and a fingerprint sensing mode; the display apparatus is configured to display an image in the display mode; and the photo-sensing detection apparatus is configured to detect a fingerprint in the fingerprint sensing mode.

Optionally, the plurality of light sources are a plurality of light emitting elements in the display apparatus configured to emit light for image display in the display mode.

Optionally, the display apparatus is substantially absent of any vacuum space at least in a display area of the display apparatus and between the array substrate and the counter substrate.

Optionally, the display apparatus further comprises an optical clear resin layer substantially throughout the display area and a peripheral area of the display apparatus.

Optionally, the optical clear resin layer comprises an optically clear adhesive.

Optionally, the display apparatus further comprises an optical clear resin layer substantially throughout a peripheral area of the display apparatus and a medium layer substantially throughout the display area of the display apparatus.

Optionally, the medium layer comprises silicone oil.

In another aspect, the present invention provides a method of fingerprint detection, comprising operating a photo-sensing detection apparatus in a time-division mode comprising a plurality of time-sequential photo-sensing modes; and integrating signals detected in the plurality of time-sequential photo-sensing modes to detect a fingerprint information; wherein the photo-sensing detection apparatus comprises a counter substrate; an array substrate facing the counter substrate; and a fingerprint sensing driver; wherein, in a respective one of the plurality of time-sequential photo-sensing modes, the method comprises emitting light using a plurality of light sources toward the counter substrate, at least a portion of the light being totally reflected by a surface of the counter substrate away from the array substrate; and detecting the at least the portion of the light being totally reflected by the surface of the counter substrate away from the array substrate using a photosensor.

Optionally, in a respective one of the plurality of time-sequential photo-sensing modes, the method comprises driving a plurality of light emitting blocks spaced apart to respectively emit light, which is respectively reflected by a plurality of touch sub-regions in a surface of the counter substrate away from the array substrate; wherein the plurality of touch sub-regions are spaced apart from each other.

Optionally, in the respective one of the plurality of time-sequential photo-sensing modes, further comprising respectively detecting light emitted from the plurality of light emitting blocks, and respectively reflected by the plurality of touch sub-regions in the surface of the counter substrate away from the array substrate, in a plurality of sensing sub-regions in the photosensor; wherein the plurality of sensing sub-regions in the photosensor are substantially non-overlapping.

Optionally, the plurality of time-sequential photo-sensing modes comprise a first mode and a second mode; wherein the method comprises driving a plurality of first light emitting blocks spaced apart to emit light in the first mode, which is respectively reflected by a plurality of first touch sub-regions in the surface of the counter substrate away from the array substrate; and driving a plurality of second light emitting blocks spaced apart to emit light in the second mode, which is respectively reflected by a plurality of second touch sub-regions in the surface of the counter substrate away from the array substrate; wherein the plurality of first touch sub-regions are spaced apart from each other; and the plurality of second touch sub-regions are spaced apart from each other.

Optionally, the method further comprises respectively detecting light emitted from the plurality of first light emitting blocks, and respectively reflected by the plurality of first touch sub-regions in the surface of the counter substrate away from the array substrate, in a plurality of first sensing sub-regions in the photosensor; respectively detecting light emitted from the plurality of second light emitting blocks, and respectively reflected by the plurality of second touch sub-regions in the surface of the counter substrate away from the array substrate, in a plurality of second sensing sub-regions in the photosensor; the first sensing region and the second sensing region are partially overlapping; the plurality of first sensing sub-regions are substantially non-overlapping; and the plurality of second sensing sub-regions are substantially non-overlapping.

Optionally, in a respective one of the plurality of time-sequential photo-sensing modes, the method comprises driving a plurality of light emitting blocks spaced apart to respectively emit light, which is reflected by a surface of the counter substrate away from the array substrate; and determining a size of each of the plurality of light emitting blocks.

Optionally, the plurality of light emitting blocks have a substantially same size; and determining the size of each of the plurality of light emitting blocks comprises determining the size of each of the plurality of light emitting blocks as a size that is optimized for achieving a maximum value of a contrast value; wherein the contrast value is defined by $$\frac{|Sr - Sv|}{|Sr + Sv|};$$

wherein Sr stands for signals corresponding to ridges of a fingerprint; and Sv stands for signals corresponding to valleys of the fingerprint.

Optionally, the method further comprises detecting a touch region in the photo-sensing detection apparatus upon a touch; and driving a plurality of light emitting blocks spaced apart to respectively emit light in a respective one of the plurality of time-sequential photo-sensing modes, which is reflected by a surface of the counter substrate away from the array substrate; wherein the plurality of light emitting blocks are limited in a region corresponding to the touch region.

In another aspect, the present invention provides a method of operating a display apparatus, comprising operating the display apparatus in a time-division mode comprising a display mode and a fingerprint sensing mode; wherein, in the display mode, the method comprises displaying an image using the display apparatus; and in the fingerprint sensing mode, the method comprises detecting a fingerprint according to the method described herein; and the fingerprint sensing mode comprises the plurality of time-sequential photo-sensing modes.

Optionally, the time-division mode further comprises a touch sensing mode; wherein, in the touch sensing mode, the method further comprises detecting a touch region in the photo-sensing detection apparatus upon a touch; wherein, in the fingerprint sensing mode, the method further comprises driving a plurality of light emitting blocks spaced apart to respectively emit light in a respective one of the plurality of time-sequential photo-sensing modes, which is reflected by a surface of the counter substrate away from the array substrate; wherein the plurality of light emitting blocks are limited in a region corresponding to the touch region.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a photo-sensing detection apparatus, a display apparatus, a method of fingerprint detection, and a method of operating a display apparatus that substantially obviate one or more of the problems due to limitations and disadvantages of the related art. In one aspect, the present disclosure provides a photo-sensing detection apparatus. In some embodiments, the photo-sensing detection apparatus includes a counter substrate; an array substrate facing the counter substrate; and a fingerprint sensing driver. In some embodiments, the array substrate includes a plurality of light sources configured to emit light toward the counter substrate, at least a portion of the light being reflected by a surface of the counter substrate away from the array substrate; and a photosensor configured to detect the at least the portion of the light being totally reflected by the surface of the counter substrate away from the array substrate. Optionally, the photo-sensing detection apparatus is configured to be operated in a time-division mode comprising a plurality of time-sequential photo-sensing modes. Optionally, the fingerprint sensing driver is configured to detect a fingerprint information by integrating signals detected in the plurality of time-sequential photo-sensing modes.

As used herein, the term "fingerprint" refers to a print of a human body part. The term fingerprint includes a print of a finger such as a thumb. The term fingerprint also include a print of a palm or a foot.

Figure 1:
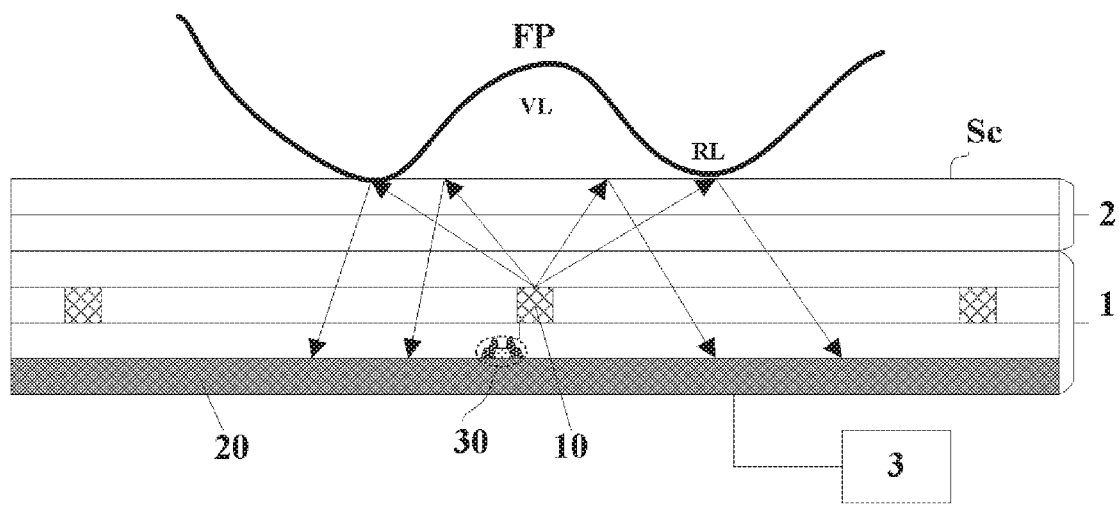
FIG. 1 is a schematic diagram illustrating the structure of a photo-sensing detection apparatus in some embodiments according to the present disclosure.

FIG. 1 is a schematic diagram illustrating the structure of a photo-sensing detection apparatus in some embodiments according to the present disclosure. Referring to FIG. 1, the photo-sensing detection apparatus in some embodiments includes an array substrate 1, a counter substrate 2 facing the array substrate 1, and a fingerprint sensing driver 3 connected to the array substrate 1. The array substrate 1 in some embodiments includes a plurality of light sources 10 configured to emit light toward the counter substrate 2, at least a portion of the light being totally reflected by a surface Sc of the counter substrate 2 away from the array substrate 1. The array substrate 1 further includes a photosensor 20 configured to detect the at least the portion of the light being totally reflected by the surface Sc of the counter substrate 2 away from the array substrate 1, thereby detecting a fingerprint FP information. The array substrate 1 further includes a plurality of thin film transistors 30 respectively connected to the plurality of light sources 10 for controlling light emission of the plurality of light sources 10. The plurality of light sources 10 may emit monochromic light. Optionally, the plurality of light sources 10 are respectively configured to emit different light of different colors. In one example, the plurality of light sources 10 includes multiple red light sources emitting red light, multiple green light sources emitting green light, and multiple blue light sources emitting blue light.

In some embodiments, the plurality of light sources 10 are a plurality of light emitting elements in the photo-sensing detection apparatus. Various appropriate light emitting elements may be used in the present display substrate. Examples of appropriate light emitting elements include an organic light emitting diode, a quantum dots light emitting diode, and a micro light emitting diode.

The plurality of light sources 10 are configured to emit light toward the counter substrate 2. As shown in FIG. 1, at least a portion of the light emitted from the plurality of light sources 10 is reflected by, e.g., totally reflected by a surface Sc of the counter substrate 2 away from the array substrate 1 thereby forming totally reflected light. The surface Sc is, for example, a touch surface on which a fingerprint touch occurs. When a finger (or palm) is placed on the side of the counter substrate 2 away from the array substrate 1, a finger print FP (or a palm print) can be detected. As shown in FIG. 1, the finger print FP has a plurality of ridges lines RL and a plurality of valley lines VL. Light emitted from the plurality of light sources 10 irradiates the plurality of valley lines VL and the plurality of ridge lines RL of the finger print FP (or the palm print). Due to the difference between the plurality of valley lines VL and the plurality of ridge lines RL in the reflection angle and the intensity of reflected light, the light projected onto the photosensor 20 can produce different electrical currents, so that the plurality of valley lines VL and the plurality of ridge lines RL of the finger print FP (or the palm print) can be recognized.

In one example, light irradiates on one of the plurality of valley lines VL. The finger (or the palm) is not in touch with the screen surface (the side of the counter substrate 2 away from the array substrate 1) in regions corresponding to the plurality of valley lines VL, and total reflection conditions in these regions remain intact (for example, the medium on a side of the counter substrate 2 away from the array substrate 1 is air). Light irradiates on the surface Sc of the counter substrate 2 away from the array substrate 1 in the regions corresponding to the plurality of valley lines VL, and (at least a portion of) light is totally reflected by the surface Sc of the counter substrate 2 away from the array substrate 1. The light totally reflected by the surface Sc of the counter substrate 2 away from the array substrate 1 in the regions corresponding to the plurality of valley lines VL is detected.

In another example, light irradiates on one of the plurality of ridge lines RL. The finger (or the palm) is in touch with the screen surface (the side of the counter substrate 2 away from the array substrate 1) in regions corresponding to the plurality of ridge lines RL, and total reflection conditions in these regions are disrupted (for example, the medium on a side of the counter substrate 2 away from the array substrate 1 is not air but finger). Light irradiates on the surface Sc of the counter substrate 2 away from the array substrate 1 in the regions corresponding to the plurality of ridge lines RL, diffused reflection occurs on the interface, thereby generating diffused reflected light transmitting along various directions. A photosensor 20 proximal to the one of the plurality of ridge lines RL detects less reflected light as compared to a region corresponding to the one of the plurality of valley lines VL. Accordingly, the plurality of ridge lines RL and plurality of valley lines VL can be differentiated and recognized.

Figure 2:
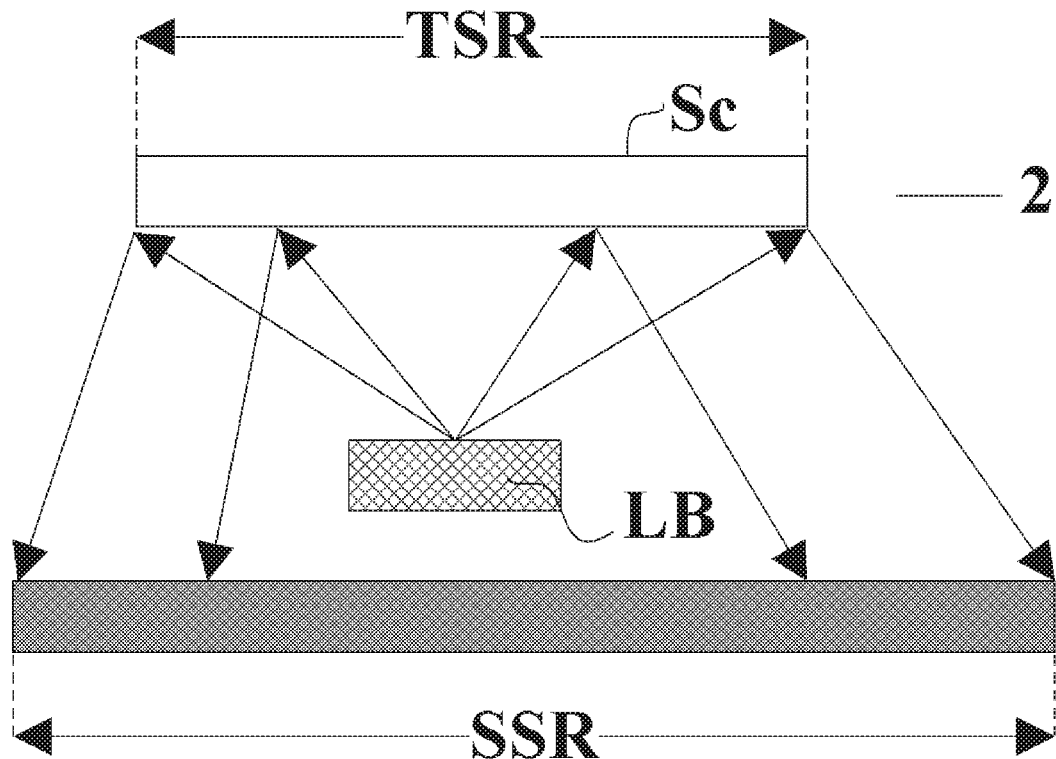
FIG. 2 illustrates a photo-sensing detection mechanism in some embodiments according to the present disclosure.

FIG. 2 illustrates a photo-sensing detection mechanism in some embodiments according to the present disclosure. Referring to FIG. 2, in some embodiments, a respective one of a plurality of light emitting blocks LB is configured to emit light toward the counter substrate 2, at least a portion of the light being reflected by a surface Sc of the counter substrate 2 away from the array substrate 1. The respective one of the plurality of light emitting blocks LB illuminates a respective one of a plurality of touch sub-regions TSR ("object"), for example, the respective one of the plurality of touch sub-regions TSR represents a sub-region of the touch interface receiving light emitted from the respective one of the plurality of light emitting blocks LB. The photosensor is configured to detect the reflected light in a respective one of a plurality of sensing sub-regions SSR ("image") in the photosensor.

The respective one of a plurality of light emitting blocks LB may include one or more of the plurality of light sources 10 in FIG. 1. Optionally, the respective one of a plurality of light emitting blocks LB includes multiple ones of the plurality of light sources 10 in FIG. 1. The respective one of a plurality of light emitting blocks LB may have any appropriate shapes and dimensions. Optionally, the respective one of a plurality of light emitting blocks LB includes m subpixels x n subpixels, m≥1, and n≥1. Optionally, m=9, and n=9. Optionally, the respective one of a plurality of light emitting blocks LB has a circular shape.

Figure 3:
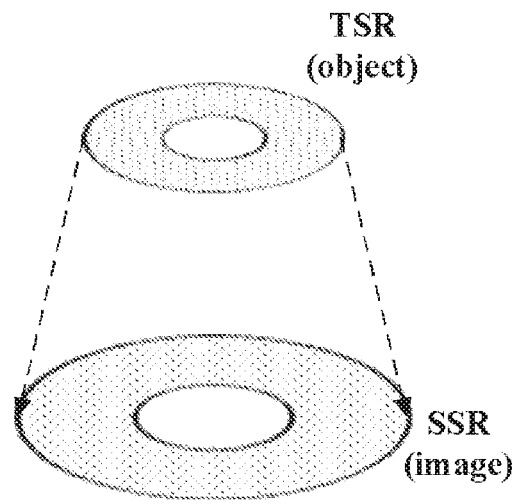
FIG. 3 illustrates a relationship between a respective one of a plurality of touch sub-regions (object) and a respective one of a plurality of sensing sub-regions (image) in a photosensor in some embodiments according to the present disclosure.
Figure 4:
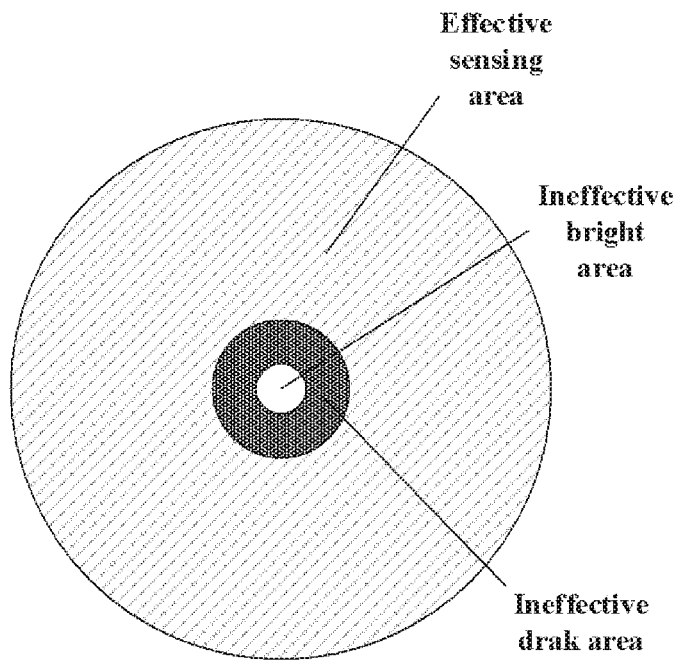
FIG. 4 illustrates a respective one of a plurality of sensing sub-regions (image) in a photosensor in some embodiments according to the present disclosure.

FIG. 3 illustrates a relationship between a respective one of a plurality of touch sub-regions (object) and a respective one of a plurality of sensing sub-regions (image) in a photosensor in some embodiments according to the present disclosure. As shown in FIG. 3, in some embodiments, the respective one of the plurality of sensing sub-regions SSR ("image") is larger than the respective one of the plurality of touch sub-regions TSR ("object"). FIG. 4 illustrates a respective one of a plurality of sensing sub-regions (image) in a photosensor in some embodiments according to the present disclosure. Referring to FIG. 4, the respective one of the plurality of sensing sub-regions SSR includes an ineffective bright area in the center, an ineffective dark area surrounding the ineffective bright area, and an effective sensing area surrounding the ineffective dark area.

It is discovered in the present disclosure that, when a distance between the finger and the photosensor is relatively large, the diffused light reflected by the finger (e.g., the plurality of ridge lines of a finger) may affect the fingerprint recognition, resulting in a blurred fingerprint image and subsequently inaccurate fingerprint detection. It is further discovered in the present disclosure that, although a light collimator may be used to enrich fingerprint information and filter out diffused light, the device inevitably becomes thicker due to the presence of the light collimator.

Accordingly, to overcome these issues, the present disclosure provides a novel photo-sensing detection apparatus configured to be operated in a time-division mode. The time-division mode includes a plurality of time-sequential photo-sensing modes. The fingerprint sensing driver is configured to detect a fingerprint information by integrating signals detected in the plurality of time-sequential photo-sensing modes. In some embodiments, in a respective one of the plurality of time-sequential photo-sensing modes, a plurality of light emitting blocks spaced apart are configured to emit light, which is respectively reflected by a plurality of touch sub-regions in the surface of the counter substrate away from the array substrate and respectively detected by a plurality of sensing sub-regions in the photosensor. Optionally, the plurality of touch sub-regions are spaced apart from each other. Optionally, light respectively reflected by the plurality of touch sub-regions in the surface of the counter substrate away from the array substrate is respectively detected by a plurality of sensing sub-regions in the photosensor. Optionally, the plurality of sensing sub-regions in the photosensor are substantially non-overlapping. As used herein, the term "substantially non-overlapping" refers to two sub-regions being at least 50 percent (e.g., at least 60 percent, at least 70 percent, at least 80 percent, at least 90 percent, at least 95 percent, at least 99 percent, and 100 percent) non-overlapping. Optionally, adjacent sensing sub-regions of the plurality of sensing sub-regions abut each other. As used herein, the term "abut" means "to meet," and "to be contiguous." "Contiguous" means "close together," "neighboring" or "adjoining." Consequently, to abut means to touch or to adjoin wherein the cut edges are in contact or in proximity.

In each of the plurality of time-sequential photo-sensing modes, the plurality of light emitting blocks are used for detecting fingerprint information. The plurality of light emitting blocks are spaced apart from each other sufficiently such that the plurality of sensing sub-regions in the photosensor are substantially non-overlapping. By having this design, the diffused light from neighboring light emitting blocks may be prevented from being detected by the respective one of the plurality of sensing sub-regions corresponding to the respective one of the plurality of light emitting blocks. Signal-to-noise ratio of the signals detected by the respective one of the plurality of sensing sub-regions can be significantly enhanced.

Figure 5:
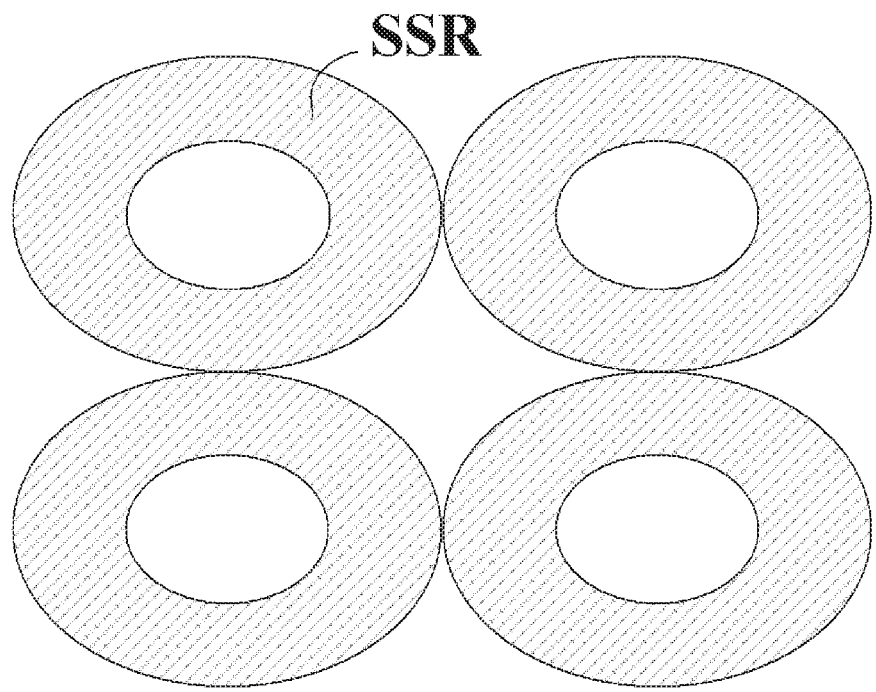
FIG. 5 illustrates a plurality of sensing sub-regions abutting each other in some embodiments according to the present disclosure.
Figure 6:
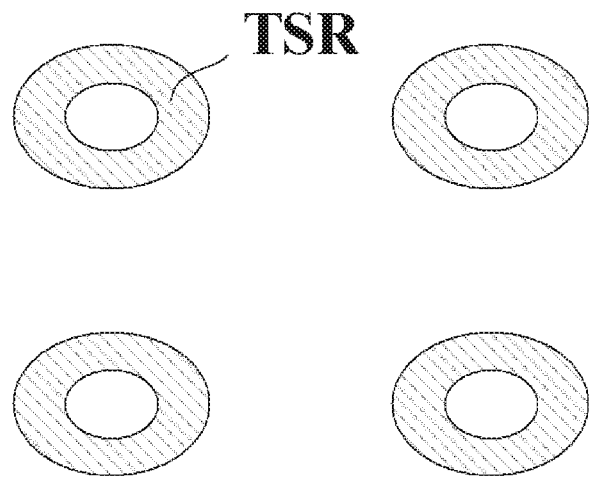
FIG. 6 illustrates a plurality of touch sub-regions corresponding to a plurality of sensing sub-regions in FIG. 5.

FIG. 5 illustrates a plurality of sensing sub-regions abutting each other in some embodiments according to the present disclosure. FIG. 6 illustrates a plurality of touch sub-regions corresponding to a plurality of sensing sub-regions in FIG. 5. Referring to FIG. 5, the plurality of sensing sub-regions SSR ("image") in the photosensor are non-overlapping and abut each other. However, as shown in FIG. 6, the plurality of touch sub-regions TSR corresponding to the plurality of sensing sub-regions SSR in FIG. 5 are spaced apart from each other. Accordingly, in each single one of the plurality of time-sequential photo-sensing modes, only partially fingerprint information may be detected, for example, the fingerprint in the space between adjacent touch sub-regions of the plurality of touch sub-regions TSR in FIG. 6 is not detected in a single one of the plurality of time-sequential photo-sensing modes.

Accordingly, in order to detect complete fingerprint information, the present photo-sensing detection apparatus is configured to be operated in a time-division mode including a plurality of time-sequential photo-sensing modes. The fingerprint sensing driver is configured to detect a fingerprint information by integrating signals detected in the plurality of time-sequential photo-sensing modes. Specifically, in some embodiments, the plurality of time-sequential photo-sensing modes include a first mode and a second mode. A plurality of first light emitting blocks spaced apart are configured to emit light in the first mode, which is respectively reflected by a plurality of first touch sub-regions in the surface of the counter substrate away from the array substrate and respectively detected by a plurality of first sensing sub-regions in a first sensing region in the photosensor. A plurality of second light emitting blocks spaced apart are configured to emit light in the second mode, which is respectively reflected by a plurality of second touch sub-regions in the surface of the counter substrate away from the array substrate and respectively detected by a plurality of second sensing sub-regions in a second sensing region in the photosensor. The plurality of first touch sub-regions are spaced apart from each other. The plurality of second touch sub-regions are spaced apart from each other.

Optionally, light respectively reflected by the plurality of first touch sub-regions in the surface of the counter substrate away from the array substrate is respectively detected by a plurality of first sensing sub-regions in a first sensing region in the photosensor. Optionally, light respectively reflected by the plurality of second touch sub-regions in the surface of the counter substrate away from the array substrate is respectively detected by a plurality of second sensing sub-regions in a second sensing region in the photosensor. Optionally, the first sensing region and the second sensing region are partially overlapping. The plurality of first sensing sub-regions are substantially non-overlapping. Optionally, the plurality of second sensing sub-regions are substantially non-overlapping.

FIGS. 7A to 7F illustrate a method of detecting complete fingerprint information in a plurality of time-sequential photo-sensing modes in some embodiments according to the present disclosure. In FIGS. 7A to 7E, four modes are used to demonstrate the detection of complete fingerprint information in a touch region TR. The four modes of the plurality of time-sequential photo-sensing modes include a first mode M1, a second mode M2, a third mode M3, and a fourth mode M4.

Figure 7A:
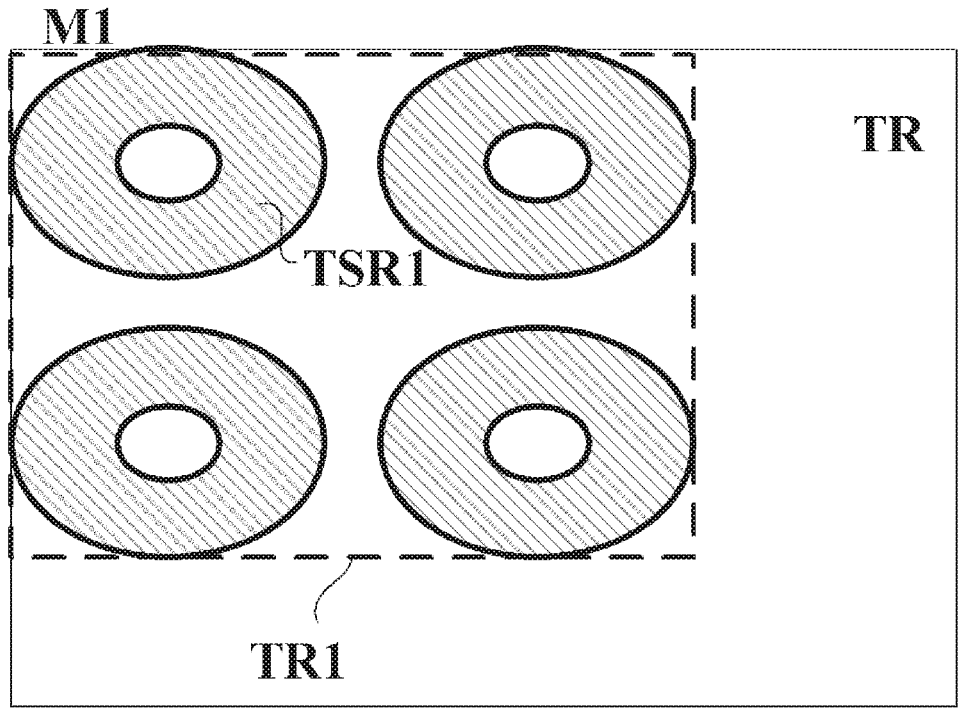
FIGS. 7A to 7E illustrate a method of detecting complete fingerprint information in a plurality of time-sequential photo-sensing modes in some embodiments according to the present disclosure.

In the first mode M1, a plurality of first light emitting blocks spaced apart are configured to emit light, which is respectively reflected by a plurality of first touch sub-regions TSR1 in the surface of the counter substrate away from the array substrate. The plurality of first touch sub-regions TSR1 are spaced apart from each other, each of the plurality of first touch sub-regions TSR1 corresponds to a partial fingerprint. Light respectively reflected by the plurality of first touch sub-regions TSR1 in the surface of the counter substrate away from the array substrate is respectively detected by a plurality of first sensing sub-regions in a first sensing region in the photosensor. The plurality of first sensing sub-regions respectively detect signals originated from a plurality of first touch sub-regions TSR1 in a first touch region TR1 as shown in FIG. 7A. The fingerprint information between adjacent touch sub-regions TSR1 of the plurality of first touch sub-regions TSR1 in the first touch region TR1, as well as a central area of each of the plurality of first touch sub-regions corresponding to the ineffective sensing area (e.g., the ineffective bright area and the ineffective dark area in FIG. 4), is not detected in the first mode M1.

Figure 7B:
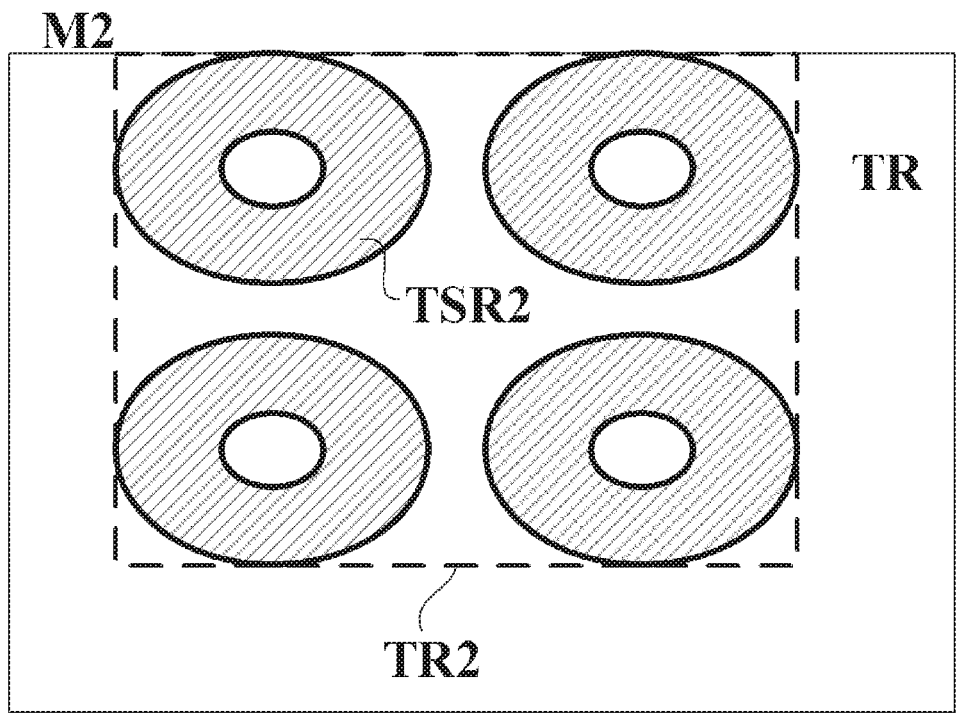

In the second mode M2, a plurality of second light emitting blocks spaced apart are configured to emit light, which is respectively reflected by a plurality of second touch sub-regions TSR2 in the surface of the counter substrate away from the array substrate. The plurality of second touch sub-regions TSR2 are spaced apart from each other, each of the plurality of second touch sub-regions TSR2 corresponds to a partial fingerprint. Light respectively reflected by the plurality of second touch sub-regions TSR2 in the surface of the counter substrate away from the array substrate is respectively detected by a plurality of second sensing sub-regions in a second sensing region in the photosensor. The plurality of second sensing sub-regions respectively detect signals originated from a plurality of second touch sub-regions TSR2 in a second touch region TR2 as shown in FIG. 7B. The fingerprint information between adjacent touch sub-regions of the plurality of second touch sub-regions TSR2 in the second touch region TR2, as well as a central area of each of the plurality of second touch sub-regions TSR2 corresponding to the ineffective sensing area, is not detected in the second mode M2.

Figure 7C:
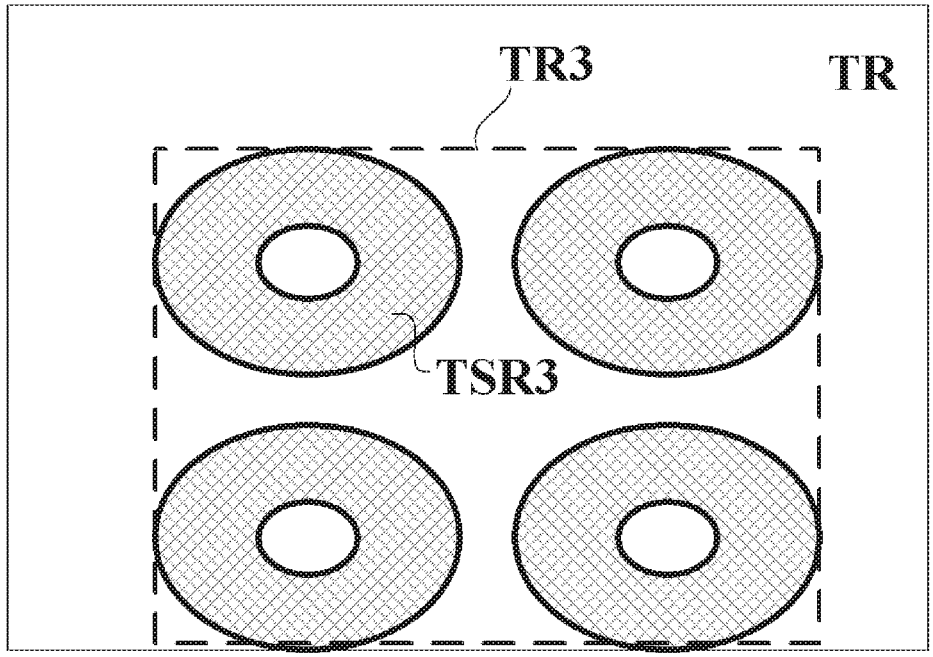

In the third mode M3, a plurality of third light emitting blocks spaced apart are configured to emit light, which is respectively reflected by a plurality of third touch sub-regions TSR3 in the surface of the counter substrate away from the array substrate. The plurality of third touch sub-regions TSR3 are spaced apart from each other, each of the plurality of third touch sub-regions TSR3 corresponds to a partial fingerprint. Light respectively reflected by the plurality of third touch sub-regions TSR3 in the surface of the counter substrate away from the array substrate is respectively detected by a plurality of third sensing sub-regions in a third sensing region in the photosensor. The plurality of third sensing sub-regions respectively detect signals originated from a plurality of third touch sub-regions TSR3 in a third touch region TR3 as shown in FIG. 7C. The fingerprint information between adjacent touch sub-regions of the plurality of third touch sub-regions TSR3 in the third touch region TR3, as well as a central area of each of the plurality of third touch sub-regions TSR3 corresponding to the ineffective sensing area, is not detected in the third anode M3.

Figure 7D:
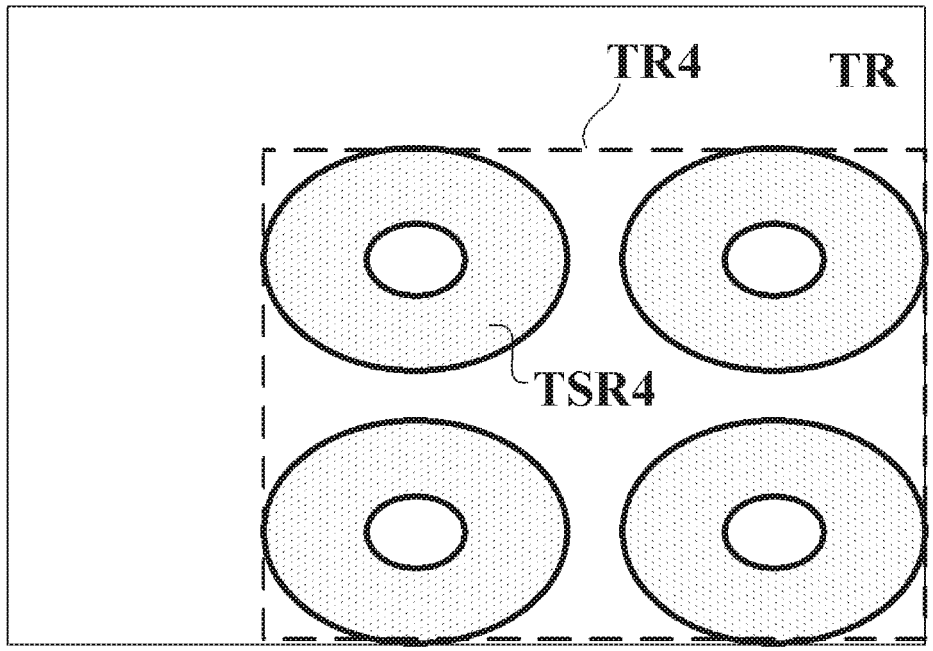

In the fourth mode M4, a plurality of fourth light emitting blocks spaced apart are configured to emit light, which is respectively reflected by a plurality of fourth touch sub-regions TSR4 in the surface of the counter substrate away from the array substrate. The plurality of fourth touch sub-regions TSR4 are spaced apart from each other, each of the plurality of fourth touch sub-regions TSR4 corresponds to a partial fingerprint. Light respectively reflected by a plurality of fourth touch sub-regions TSR4 in the surface of the counter substrate away from the array substrate is respectively detected by a plurality of fourth sensing sub-regions in a fourth sensing region in the photosensor. The plurality of fourth sensing sub-regions respectively detect signals originated from a plurality of fourth touch sub-regions TSR4 in a fourth touch region TR4 as shown in FIG. 7D. The fingerprint information between adjacent touch sub-regions of the plurality of fourth touch sub-regions TSR4 in the fourth touch region TR4, as well as a central area of each of the plurality of fourth touch sub-regions TSR4 corresponding to the ineffective sensing area, is not detected in the fourth mode M4.

Figure 7E:
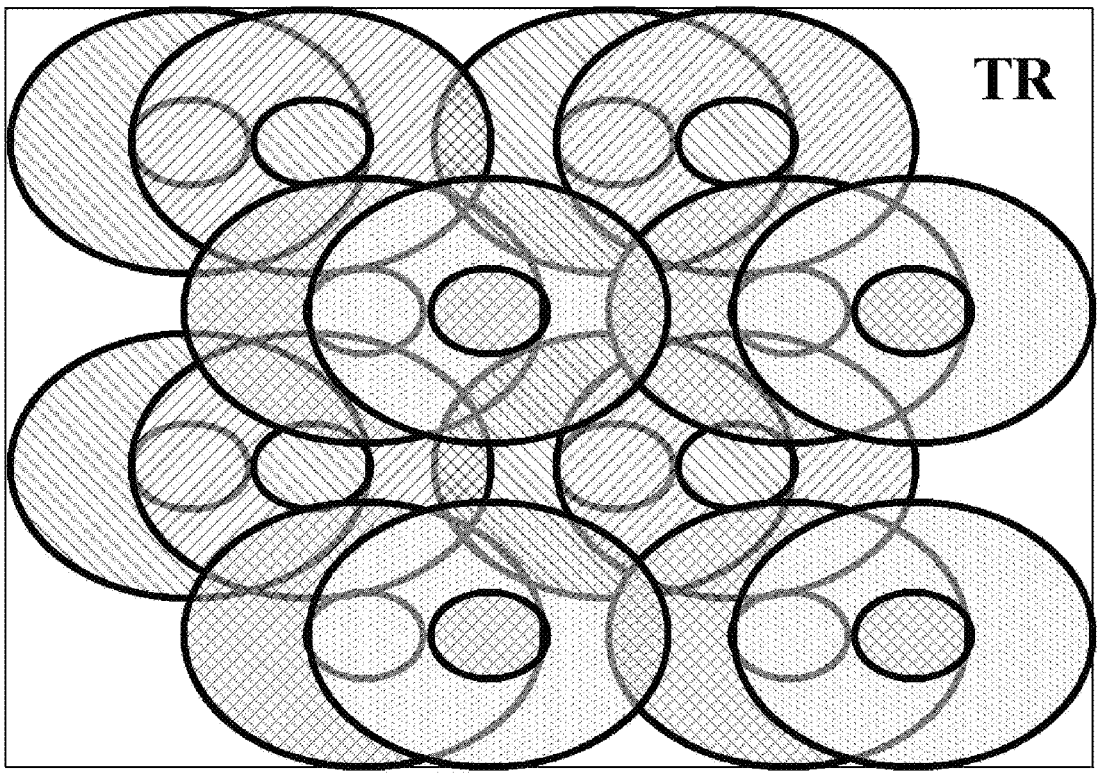
Figure 7F:
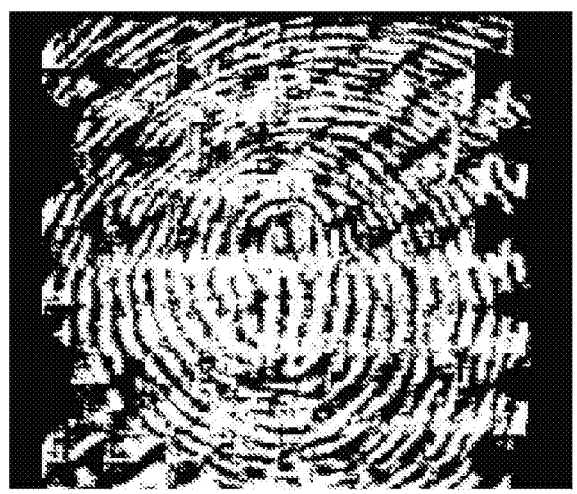
FIG. 7F illustrates an exemplary fingerprint detected by the present photo-sensing detection apparatus.
Figure 8A:
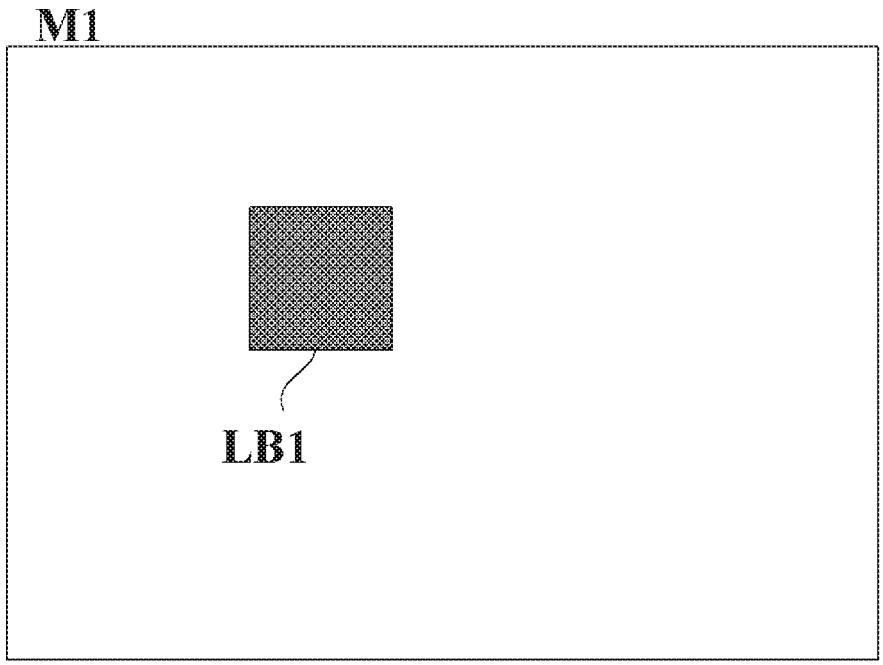
FIGS. 8A to 8D illustrate translational displacement of light emitting blocks in a plurality of time-sequential photo-sensing modes in some embodiments according to the present disclosure.
Figure 8B:
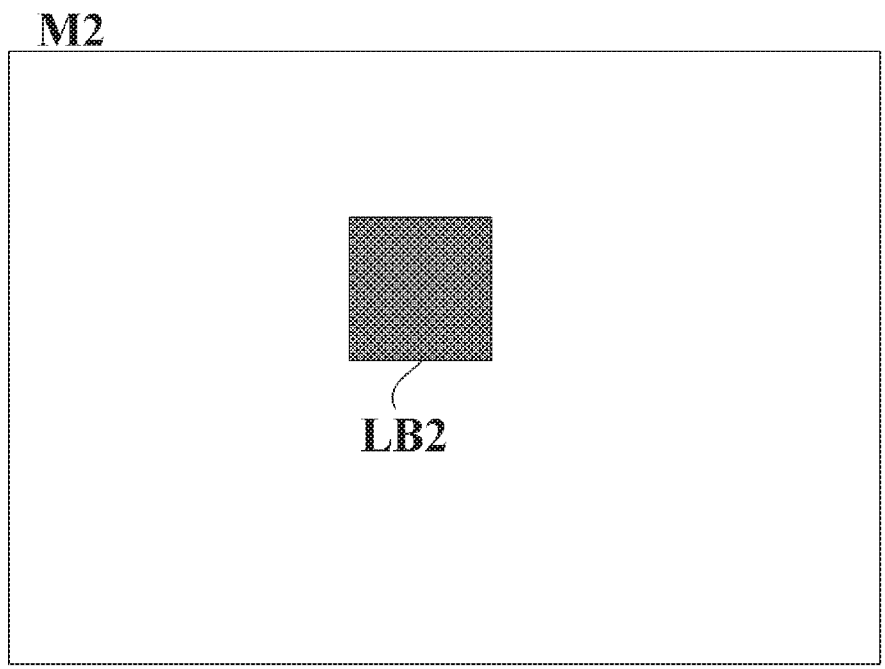
Figure 8C:
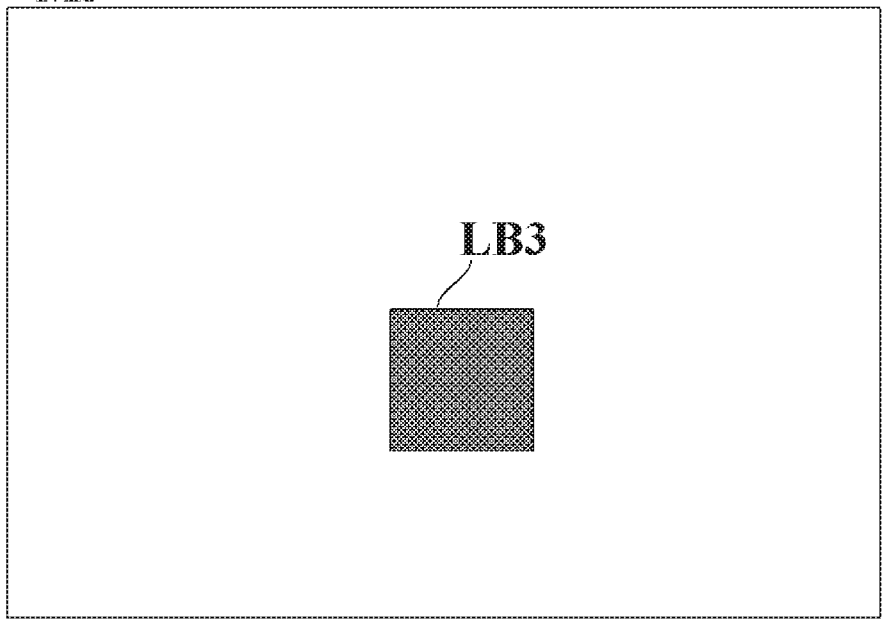
Figure 8D:
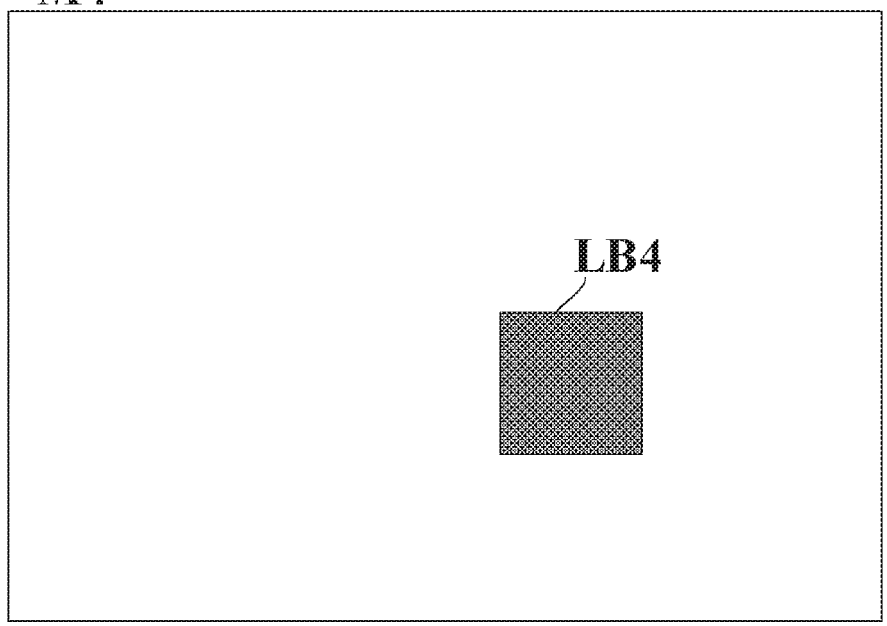

To detect complete fingerprint information, the present photo-sensing detection apparatus integrates signals detected in the first mode M1, the second mode M2, the third mode M3, and the fourth mode M4. As shown in FIG. 7E, the integration of signals from the plurality of time-sequential photo-sensing modes enables detection of complete fingerprint information in the first touch region TR1, the second touch region TR2, the third touch region TR3, and the fourth touch region TR4. The fingerprint information missing in one mode can be supplemented by fingerprint information detected in other modes. As illustrated in FIG. 7E, not only the missing fingerprint information between adjacent touch sub-regions, but also the missing fingerprint information in the central area of each of the touch sub-regions corresponding to the ineffective sensing area, can be effectively supplemented when the photo-sensing detection apparatus is operated in the time-division mode as described herein. FIG. 7F illustrates an exemplary fingerprint detected by the present photo-sensing detection apparatus.

The plurality of time-sequential photo-sensing modes may include any appropriate number of modes, e.g., N number of modes. Optionally, N≥3. Optionally, N≥4. Optionally, N≥5. Optionally, N=6.

In some embodiments, a total number of the plurality of light emitting blocks in each mode is substantially same. For example, a total number of the plurality of first light emitting blocks and a total number of the plurality of second light emitting blocks are substantially same. For example, when N=4, total number of the plurality of first light emitting blocks, a total number of the plurality of second light emitting blocks, a total number of the plurality of third light emitting blocks, and a total number of the plurality of fourth light emitting blocks, are substantially same. As used herein, the term "substantially same" refers to a difference between two values not exceeding 10% of a base value (e.g., one of the two values), e.g., not exceeding 8%, not exceeding 6%, not exceeding 4%, not exceeding 2%, not exceeding 1%, not exceeding 0.5%, not exceeding 0.1%, not exceeding 0.05%, and not exceeding 0.01%, of the base value.

It follows that a total number of touch sub-regions in each mode is substantially same, and a total number of sensing sub-regions in each mode is substantially same. For example, when N=4, a total number of the plurality of first touch sub-regions, a total number of the plurality of second touch sub-regions, a total number of the plurality of third touch sub-regions, a total number of the plurality of fourth touch sub-regions, a total number of the plurality of first sensing sub-regions, a total number of the plurality of second sensing sub-regions, a total number of the plurality of third sensing sub-regions, and a total number of the plurality of fourth sensing sub-regions, are substantially same.

As shown in FIGS. 7A to 7E, in some embodiments, positions of the plurality of touch sub-regions in two different modes are related by a translational displacement. As used herein, the term "translational displacement" refers to a first region can become substantially (e.g., completely) overlap with a second region by a translational movement, and that two regions are substantially coextensive after the translational movement. For example, positions of the plurality of first touch sub-regions TSR1 are related to positions of the plurality of second touch sub-regions TSR2 by a rightward translation along a horizontal direction, e.g., the plurality of first touch sub-regions TSR1 overlaps with and are coextensive with the plurality of second touch sub-regions TSR2 after the rightward translation. In another example, positions of the plurality of second touch sub-regions TSR2 are related to positions of the plurality of third touch sub-regions TSR3 by a rightward translation along a horizontal direction followed by a downward translation along a vertical direction, e.g., the plurality of second touch sub-regions TSR2 overlaps with and are coextensive with the plurality of third touch sub-regions TSR3 after the rightward translation and the downward translation.

It follows that positions of the plurality of sensing sub-regions in two different modes are related by a translational displacement. For example, positions of the plurality of first sensing sub-regions are related to positions of the plurality of second sensing sub-regions by a rightward translation along a horizontal direction, e.g., the plurality of first sensing sub-regions overlaps with and are coextensive with the plurality of second sensing sub-regions after the rightward translation. In another example, positions of the plurality of second sensing sub-regions are related to positions of the plurality of third sensing sub-regions by a rightward translation along a horizontal direction followed by a downward translation along a vertical direction, e.g., the plurality of second sensing sub-regions overlaps with and are coextensive with the plurality of third sensing sub-regions after the rightward translation and the downward translation.

In some embodiments, positions of the plurality of light emitting blocks in two different modes are related by a translational displacement. Optionally, positions of the plurality of first light emitting blocks and positions of the plurality of second light emitting blocks are related by a translational displacement. For example, positions of the plurality of first light emitting blocks are related to positions of the plurality of second light emitting blocks by a rightward translation along a horizontal direction, e.g., the plurality of first light emitting blocks overlaps with and are coextensive with the plurality of second light emitting blocks after the rightward translation, in another example, positions of the plurality of second light emitting blocks are related to positions of the plurality of third light emitting blocks by a rightward translation along a horizontal direction followed by a downward translation along a vertical direction, e.g., the plurality of second light emitting blocks overlaps with and are coextensive with the plurality of third light emitting blocks after the rightward translation and the downward translation. FIGS. 8A to 8D illustrate translational displacement of light emitting blocks in a plurality of time-sequential photo-sensing modes in some embodiments according to the present disclosure. Referring to FIGS. 8A to 8D, the plurality of first light emitting blocks LB1, the plurality of second light emitting blocks LB2, the plurality of third light emitting blocks LB3, and the plurality of fourth light emitting blocks are related by a translational displacement.

In any one of the plurality of time-sequential photo-sensing modes, only plurality of light emitting blocks designated for that particular individual mode are configured to emit light, while light sources other that the plurality of light emitting blocks designated for that particular individual mode are turned off, to reduce interference to fingerprint detection in the sensing region corresponding to the plurality of light emitting blocks designated for that particular individual mode. For example, in some embodiments, at least light sources surrounding the plurality of light emitting blocks designated for that particular individual mode are turned off. In one example, any light source within X number of subpixels surrounding the plurality of light emitting blocks designated for that particular individual mode are turned off, wherein X is equal to or greater than 20 subpixels.

As shown in FIGS. 7A to 7E, in some embodiments, at least in a same one of the plurality of time-sequential photo-sensing modes (e.g., the first mode, the second mode, the third mode, or the fourth mode), the plurality of touch sub-regions have a substantially same size. It follows that, at least in a same one of the plurality of time-sequential photo-sensing modes, the plurality of sensing sub-regions have a substantially same size. In some embodiments, and referring to FIGS. 8A to 8D, at least in a same one of the plurality of time-sequential photo-sensing modes, the plurality of light emitting blocks have a substantially same size. Optionally, in any and all of the plurality of time-sequential photo-sensing modes, the plurality of touch sub-regions have a substantially same size, the plurality of sensing sub-regions have a substantially same size, and the plurality of light emitting blocks have a substantially same size.

Figure 9:
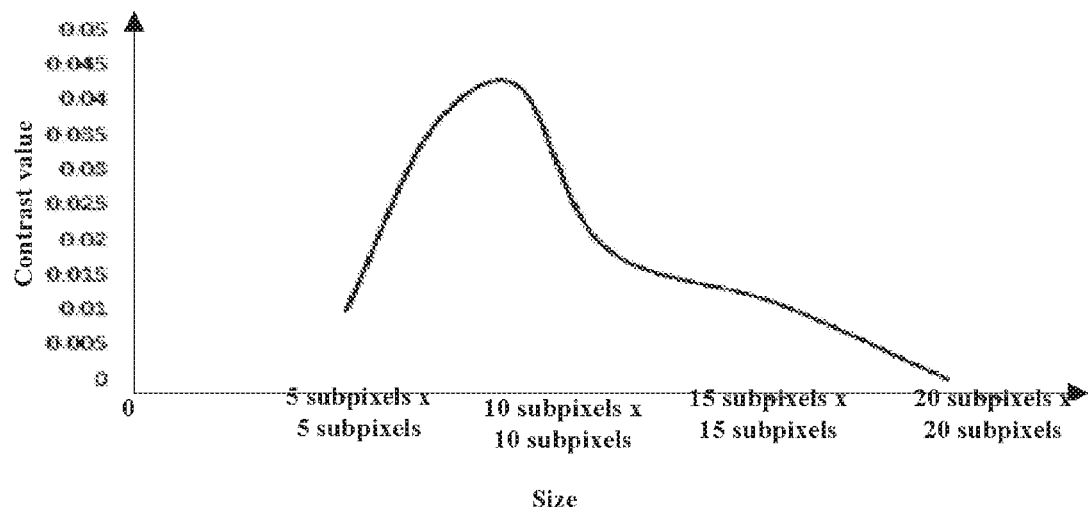
FIG. 9 illustrates a correlation between a contract value and a size of a respective one of the plurality of light emitting blocks in some embodiments according to the present disclosure.

In some embodiments, the size of the respective one of the plurality of light emitting blocks can be determined as a size optimized for achieving a maximum contrast value. As used herein, the term contrast value is defined by $$\frac{|Sr - Sv|}{|Sr + Sv|};$$

wherein Sr stands for signals corresponding to ridges of a fingerprint; and Sv stands for signals corresponding to valleys of the fingerprint. FIG. 9 illustrates a correlation between a contract value and a size of a respective one of the plurality of light emitting blocks in some embodiments according to the present disclosure. As shown in FIG. 9, in some embodiments, the size optimized for achieving a maximum contrast value is a (9 subpixel×9 subpixel) block.

In some embodiments, the photo-sensing detection apparatus further includes a touch sensing driver circuit configured to control touch detection of a touch region in the photo-sensing detection apparatus. The touch sensing driver circuit may be integrated as a unitary circuit with the fingerprint sensing driver 3 in FIG. 1. Optionally, the touch sensing driver circuit is a separate or stand-alone circuit configured specifically for control touch detection of a touch region in the photo-sensing detection apparatus. In some embodiments, the photo-sensing detection apparatus is operated in a time-division mode, which includes a touch sensing mode followed by a plurality of time-sequential photo-sensing modes. Various appropriate methods may be used for detect a touch region. For example, the photo-sensing detection apparatus in some embodiments further includes a touch substrate including a plurality of touch electrodes (mutual capacitive or self-capacitive type).

In some embodiments, as shown in FIGS. 7A to 7D, the plurality of touch sub-regions corresponding to the respective one of the plurality of light emitting blocks are limited in the touch region TR. By first determining a touch region in which the finger is in contact with the surface of the counter substrate, the fingerprint detection can be performed more efficiently and with a greater speed. In some embodiments, the plurality of light emitting blocks in each of the plurality of time-sequential photo-sensing modes are limited in a region corresponding to the touch region TR.

In another aspect, the present disclosure provides a display apparatus including the photo-sensing detection apparatus described herein. In some embodiments, the display apparatus is operated in a time-division mode including a display mode and a fingerprint sensing mode. The display apparatus is configured to display an image in the display mode. The photo-sensing detection apparatus is configured to detect a fingerprint during the fingerprint sensing mode. In some embodiments, the photo-sensing detection apparatus is integrated into the display apparatus as a unitary unit. For example, in some embodiments, the plurality of light sources are a plurality of light emitting elements in the display apparatus configured to emit light for image display in the display mode. In another example, the photosensor is integrated into the display apparatus, e.g., in an inter-subpixel region of the display apparatus.

Examples of appropriate display apparatus include, but are not limited to, an electronic paper, a mobile phone, a tablet computer, a television, a monitor, a notebook computer, a digital album, a GPS, etc.

Figure 10:
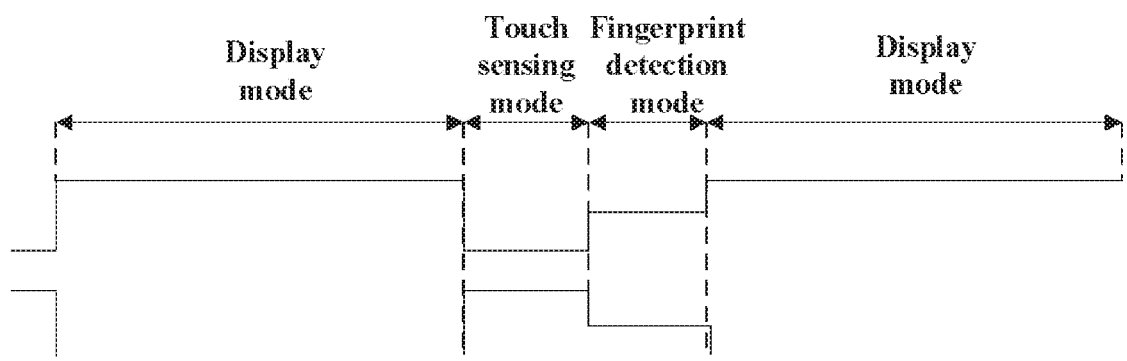
FIG. 10 illustrates a time-division operation mode of a display apparatus in some embodiments according to the present disclosure.

FIG. 10 illustrates a time-division operation mode of a display apparatus in some embodiments according to the present disclosure. Referring to FIG. 10, the display apparatus in some embodiments is operated in a time-division mode including a display mode, a touch sensing mode, and a fingerprint detection mode. Optionally, and referring to FIG. 10, the touch sensing mode and the fingerprint detection mode are two distinct modes occurring in two different non-overlapping time frames. Optionally, the touch sensing mode and the fingerprint detection mode occurs in two partially overlapping time frames. Optionally, the touch sensing mode and the fingerprint detection mode occurs substantially simultaneously, e.g., at the same time. In this case, the touch sensing mode and the fingerprint detection mode become an integrated touch sensing and fingerprint detection mode.

In some embodiments, in the touch sensing mode, the display apparatus is configured to detect a touch region in which the finger is in contact with the surface of the counter substrate. In the display mode, the display apparatus is configured to display an image. In the fingerprint detection mode, the display apparatus is configure to detect a fingerprint information. In some embodiments, the fingerprint detection mode include a plurality of time-sequential photo-sensing modes as described herein.

Figure 11:
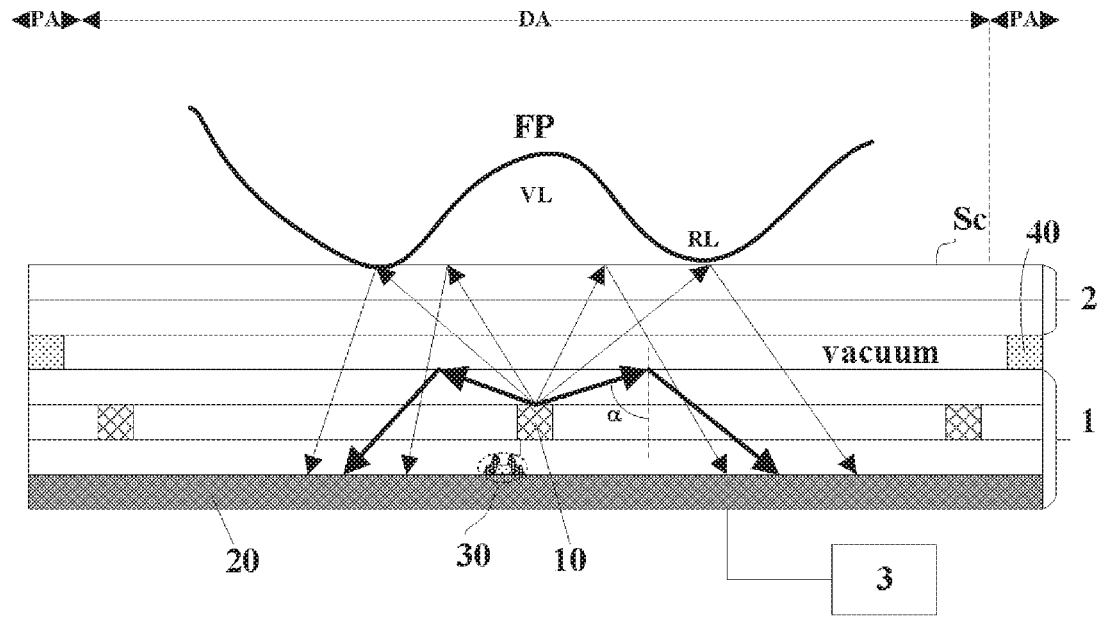
FIG. 11 is a schematic diagram illustrating the structure of a display apparatus in some embodiments according to the present disclosure.

FIG. 11 is a schematic diagram illustrating the structure of a display apparatus in some embodiments according to the present disclosure. Referring to FIG. 11, in some embodiments, the display apparatus includes an array substrate 1 and a counter substrate 2 facing the array substrate 1. The array substrate 1 and the counter substrate 2 are adhered together using an optical clear resin layer 40 disposed in a peripheral area PA of the display apparatus. In the display area DA and between the array substrate 1 and the counter substrate 2, there is a vacuum space. As shown in FIG. 11, when the incident angle α of light emitted from the array substrate 1 with respect to an interface between the vacuum space and a top layer of the array substrate 1 is equal to or greater than a threshold value, a portion of light (depicted as bold line) is totally reflected at the interface between the vacuum space and the top layer of the array substrate 1. Due to the presence of the vacuum space, this portion of light would not reach the interface between the finger and the surface Sc of the counter substrate 2 away from the array substrate 1. As a result, a portion of fingerprint information corresponding to this portion of light reflected by the interface between the vacuum space and the top layer of the array substrate 1 cannot be detected. Moreover, the portion of light reflected by the interface between the vacuum space and the top layer of the array substrate 1 adds to the noise of the signal detected by the photosensor 20.

Figure 12:
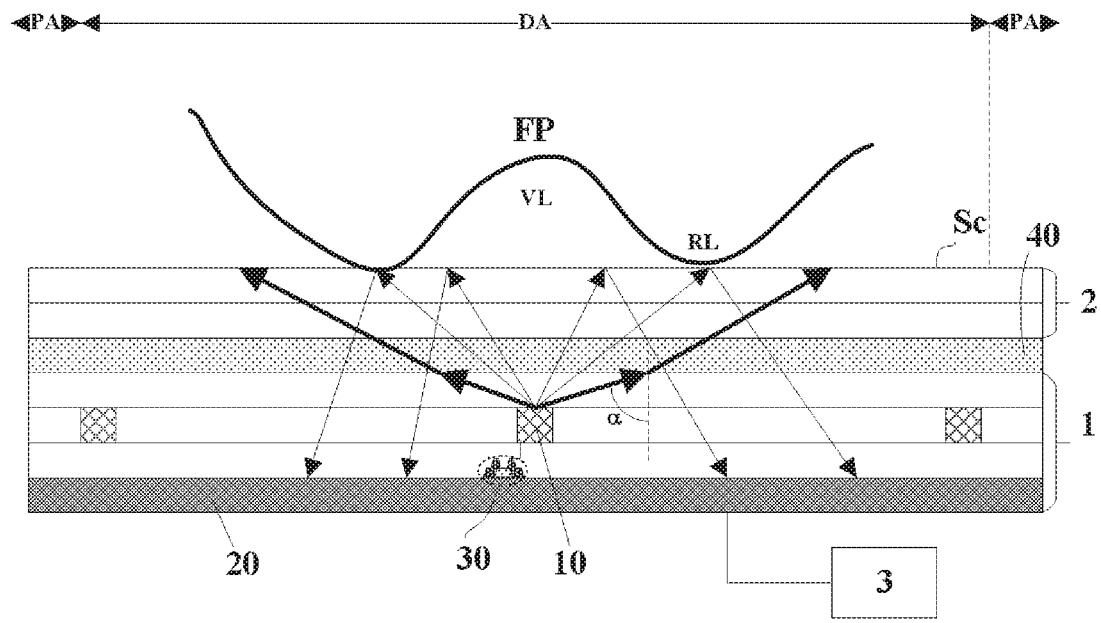
FIG. 12 is a schematic diagram illustrating the structure of a display apparatus in some embodiments according to the present disclosure.

To overcome this issue, the present disclosure provides a display apparatus in which a vacuum space is substantially absent between the array substrate 1 and the counter substrate 2. Optionally, the display apparatus is absent of any vacuum space at least in the display area DA and between the array substrate 1 and the counter substrate 2. FIG. 12 is a schematic diagram illustrating the structure of a display apparatus in some embodiments according to the present disclosure. Referring to FIG. 12, the array substrate 1 and the counter substrate 2 are adhered together using an optical clear resin layer 40 substantially throughout the display area DA of the display apparatus, thus eliminating any vacuum space between the array substrate 1 and the counter substrate 2 and at least in the display area DA. As shown in FIG. 12, due to the presence of the optical clear resin layer 40 at least in the display area DA and between the array substrate 1 and the counter substrate 2, the portion of light depicted as bold line at the incident angle α (or greater) is not totally reflected at the interface between the optical clear resin layer 40 and the top layer of the array substrate 1. Instead, this portion of light continues to travel to the interface between the finger and the surface Sc of the counter substrate 2 away from the array substrate 1. As a result, a more complete fingerprint information may be detected, and the noise level reduced. Optionally, the optical clear resin layer 40 is an optically clear adhesive (OCA) layer.

As used herein the term "peripheral area" refers to an area of a display substrate (e.g., a counter or an array substrate) in a display panel where various circuits and wires are provided to transmit signals to the display substrate. To increase the transparency of the display apparatus, non-transparent or opaque components of the display apparatus (e.g., battery, printed circuit board, metal frame), can be disposed in the peripheral area rather than in the display areas.

As used herein, the term "display area" refers to an area of a display substrate (e.g., a counter substrate or an array substrate) in a display panel where image is actually displayed. Optionally, the display area may include both a subpixel region and an inter-subpixel region. A subpixel region refers to a light emission region of a subpixel, such as a region corresponding to a pixel electrode in a liquid crystal display or a region corresponding to a light emissive layer in an organic light emitting diode display panel. An inter-subpixel region refers to a region between adjacent subpixel regions, such as a region corresponding to a black matrix in a liquid crystal display or a region corresponding a pixel definition layer in an organic light emitting diode display panel. Optionally, the inter-subpixel region is a region between adjacent subpixel regions in a same pixel. Optionally, the inter-subpixel region is a region between two adjacent subpixel regions from two adjacent pixels.

Figure 13:
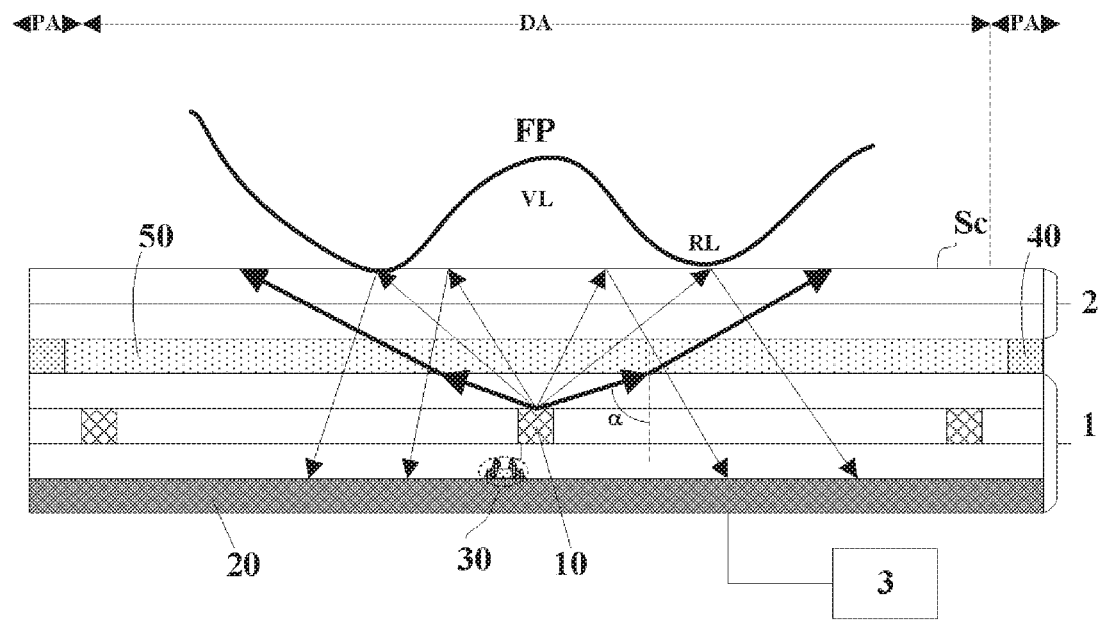
FIG. 13 is a schematic diagram illustrating the structure of a display apparatus in some embodiments according to the present disclosure.

FIG. 13 is a schematic diagram illustrating the structure of a display apparatus in some embodiments according to the present disclosure. Referring to FIG. 13, in some embodiments, the array substrate 1 and the counter substrate 2 are adhered together using an optical clear resin layer 40 disposed in the peripheral area PA of the display apparatus. In the display area DA and between the array substrate 1 and the counter substrate 2, the display apparatus further includes a medium layer 50 to eliminate any vacuum space between the array substrate 1 and the counter substrate 2 and at least in the display area DA. As shown in FIG. 13, due to the presence of the medium layer 50 at least in the display area DA and between the array substrate 1 and the counter substrate 2, the portion of light depicted as bold line at the incident angle α (or greater) is not totally reflected at the interface between the medium layer 50 and the top layer of the array substrate 1. Instead, this portion of light continues to travel to the interface between the finger and the surface Sc of the counter substrate 2 away from the array substrate 1. As a result, a more complete fingerprint information may be detected, and the noise level reduced.

Optionally, the medium layer 50 includes a material having a refractive index in a range of 1.3 to 1.7, e.g., 1.4 to 1.6, 1.45 to 1.55, 1.48 to 1.52, or approximately 1.5. Optionally, the medium layer 50 includes a liquid material. Optionally, the medium layer 50 includes silicone oil.

In another aspect, the present disclosure provides a method of fingerprint detection. In some embodiments, the method includes operating a photo-sensing detection apparatus in a time-division mode comprising a plurality of time-sequential photo-sensing modes; and integrating signals detected in the plurality of time-sequential photo-sensing modes to detect a fingerprint information. In same embodiments, the photo-sensing detection apparatus comprises a counter substrate; an array substrate facing the counter substrate; and a fingerprint sensing driver. In some embodiments, in a respective one of the plurality of time-sequential photo-sensing modes, the method includes emitting light using a plurality of light sources toward the counter substrate, at least a portion of the light being reflected by a surface of the counter substrate away from the array substrate; and detecting the at least the portion of the light being totally reflected by the surface of the counter substrate away from the array substrate using a photosensor.

In some embodiments, in a respective one of the plurality of time-sequential photo-sensing modes, the method includes driving a plurality of light emitting blocks spaced apart to respectively emit light, which is respectively reflected by a plurality of touch sub-regions in a surface of the counter substrate away from the array substrate. Optionally, the plurality of touch sub-regions are spaced apart from each other. Optionally, in the respective one of the plurality of time-sequential photo-sensing modes, the method further includes respectively detecting light emitted from the plurality of light emitting blocks, and respectively reflected by the plurality of touch sub-regions in the surface of the counter substrate away from the array substrate, in a plurality of sensing sub-regions in the photosensor. Optionally, the plurality of sensing sub-regions in the photosensor are substantially non-overlapping. Optionally, adjacent sensing sub-regions of the plurality of sensing sub-regions abut each other.

In some embodiments, the plurality of time-sequential photo-sensing modes comprise a first mode and a second mode. In some embodiments, the method includes driving a plurality of first light emitting blocks spaced apart to emit light in the first mode, which is respectively reflected by a plurality of first touch sub-regions in the surface of the counter substrate away from the array substrate; and driving a plurality of second light emitting blocks spaced apart to emit light in the second mode, which is respectively reflected by a plurality of second touch sub-regions in the surface of the counter substrate away from the array substrate. Optionally, the plurality of first touch sub-regions are spaced apart from each other. Optionally, the plurality of second touch sub-regions are spaced apart from each other.

In some embodiments, the method further includes respectively detecting light emitted from the plurality of first light emitting blocks, and respectively reflected by the plurality of first touch sub-regions in the surface of the counter substrate away from the array substrate, in a plurality of first sensing sub-regions in the photosensor; and respectively detecting light emitted from the plurality of second light emitting blocks, and respectively reflected by the plurality of second touch sub-regions in the surface of the counter substrate away from the array substrate, in a plurality of second sensing sub-regions in the photosensor. Optionally, the first sensing region and the second sensing region are partially overlapping. Optionally, the plurality of first sensing sub-regions are substantially non-overlapping. Optionally, the plurality of second sensing sub-regions are substantially non-overlapping.

Optionally, a total number of the plurality of first light emitting blocks and a total number of the plurality of second light emitting blocks are substantially same.

Optionally, positions of the plurality of first light emitting blocks and positions of the plurality of second light emitting blocks are related by a translational displacement.

Optionally, in a respective one of the plurality of time-sequential photo-sensing modes, a plurality of light emitting blocks are configured to emit light; and the plurality of light emitting blocks have a substantially same size.

In some embodiments, in a respective one of the plurality of time-sequential photo-sensing modes, the method includes driving a plurality of light emitting blocks spaced apart to respectively emit light, which is respectively reflected by a plurality of touch sub-regions in a surface of the counter substrate away from the array substrate; and determining a size of each of the plurality of light emitting blocks. Optionally, determining the size of each of the plurality of light emitting blocks includes determining the size of each of the plurality of light emitting blocks that is optimized for achieving a maximum value of a contrast value. Optionally, the contrast value is defined by $$\frac{|Sr - Sv|}{|Sr + Sv|};$$

wherein Sr stands for signals corresponding to ridges of a fingerprint; and Sr stands for signals corresponding to valleys of the fingerprint.

In some embodiments, the method further includes detecting a touch region in the photo-sensing detection apparatus upon a touch; and driving a plurality of light emitting blocks spaced apart to respectively emit light in a respective one of the plurality of time-sequential photo-sensing modes, which is respectively reflected by a plurality of touch sub-regions in a surface of the counter substrate away from the array substrate. Optionally, the plurality of light emitting blocks are limited in a region corresponding to the touch region.

In another aspect, the present disclosure provides a method of operating a display apparatus. In some embodiments, the method of operating a display apparatus includes operating the display apparatus in a time-division mode comprising a display mode and a fingerprint sensing mode. Optionally, in the display mode, the method comprises displaying an image using the display apparatus. Optionally, in the fingerprint sensing mode, the method includes detecting a fingerprint according to the method described herein. Optionally, the fingerprint sensing mode comprises the plurality of time-sequential photo-sensing modes.

Optionally, the plurality of light sources are a plurality of light emitting elements in the display apparatus configured to emit light for image display in the display mode.

In some embodiments, the time-division mode further comprises a touch sensing mode. In some embodiments, in the touch sensing mode, the method further includes detecting a touch region in the photo-sensing detection apparatus upon a touch. In some embodiments, in the fingerprint sensing mode, the method further includes driving a plurality of light emitting blocks spaced apart to respectively emit light in a respective one of the plurality of time-sequential photo-sensing modes, which is respectively reflected by a plurality of touch sub-regions in a surface of the counter substrate away from the array substrate. Optionally, the plurality of light emitting blocks are limited in a region corresponding to the touch region.

Figure 14:
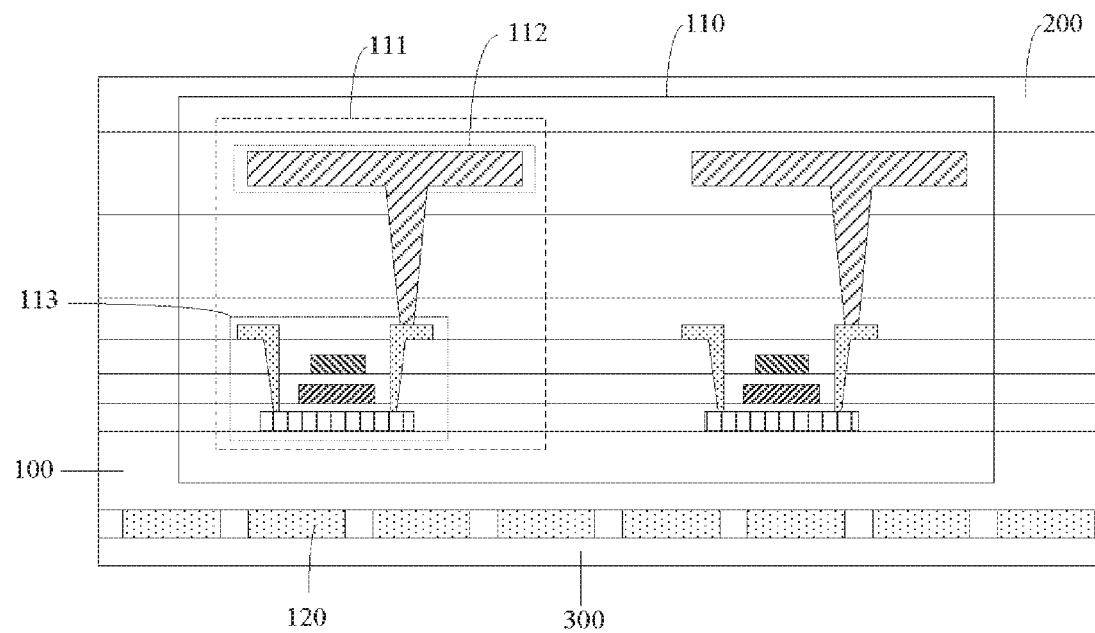
FIG. 14 schematically shows a structural diagram of a fingerprint recognition apparatus according to an embodiment of the present invention.

As shown in FIG. 14, a fingerprint recognition apparatus according to an embodiment of the present invention may comprise: a substrate 100, a plurality of pixel units 110 located at a side of the substrate 100, and a plurality of image sensors 120 located at another side of the substrate 100 facing the plurality of pixel units 110. Here, the image sensors 120 are used for receiving light rays reflected by an interface. Each pixel unit 110 comprises a plurality of sub-pixels 111. In one embodiment, the pixel unit 110 may comprise three sub-pixels 111, e.g., a red sub-pixel, a green sub-pixel and a blue sub-pixel. In another embodiment, the pixel unit 110 may also comprise four sub-pixels 111, for example, a red sub-pixel, a green sub-pixel, a blue sub-pixel and a white sub-pixel. In yet another embodiment, sub-pixels 111 in the pixel unit 110 may all be white sub-pixels. There is no limit as to the number of sub-pixels and colors of the sub-pixels.

In an embodiment, an electroluminescent diode such as an organic light emitting diode (OLED), a quantum dot light emitting diode (QLED), etc. may have self-generating light, low energy consumption, etc. In an embodiment, as shown in FIG. 14, each sub-pixel 111 may comprise an electroluminescent diode 112 and a pixel circuitry 113 used for driving the electroluminescence diode 112 to emit light. Here, the electroluminescent diode 112 may be an OLED or a QLED. Generally, a pixel circuitry may comprise a plurality of transistors such as drive transistors, switch transistors, etc., and storage capacitors. Its structure may be the same as that in the prior art. No limit is made here. In addition, in order to protect a film layer in the fingerprint recognition apparatus, as shown in FIG. 14, the fingerprint recognition apparatus may further comprise a protecting glass 200 located at a side of the sub-pixels 111 opposite the substrate 100. The protecting glass 200 is generally transparent, for example, a glass substrate. It should be noted that FIG. 14 only takes a driving transistor in the pixel circuitry 113 as an example for description.

Figure 15A:
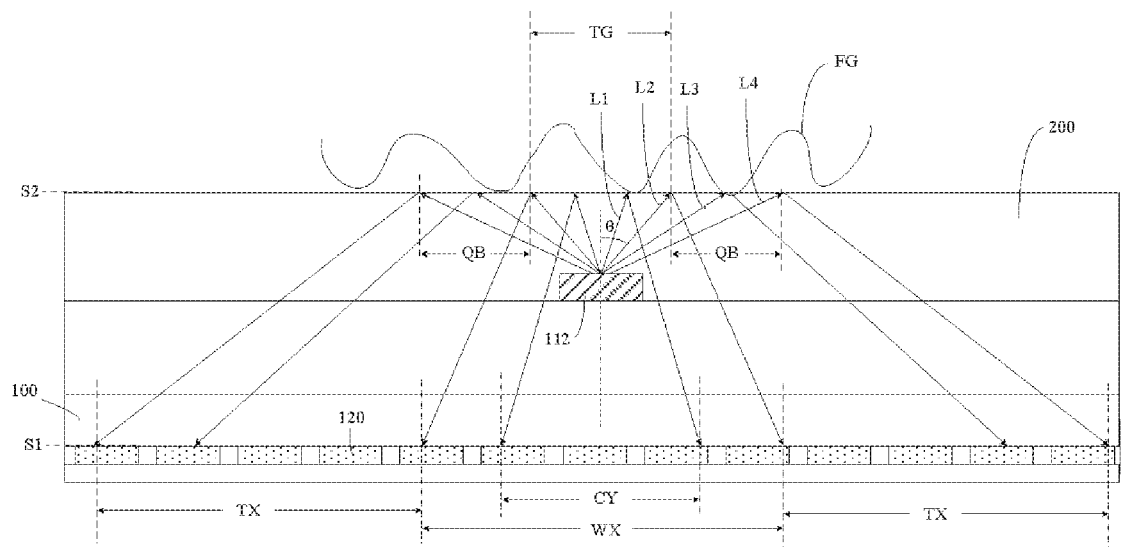
FIG. 15a schematically shows a structural diagram of a finger touch fingerprint recognition apparatus according to an embodiment of the present invention.
Figure 15B:
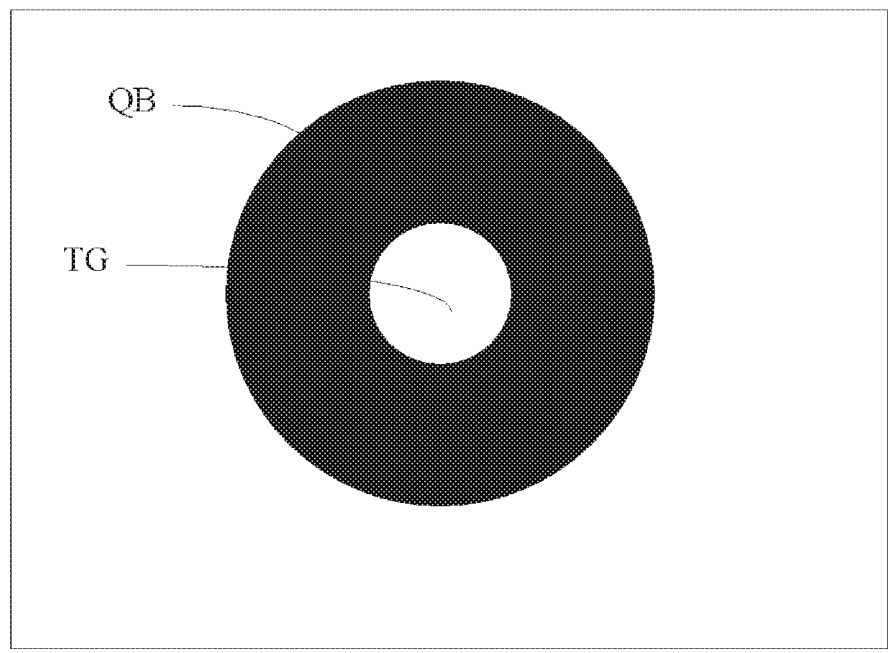
FIG. 15b schematically shows a diagram of a total reflection zone and a light transmission region according to an embodiment of the present invention.
Figure 15C:
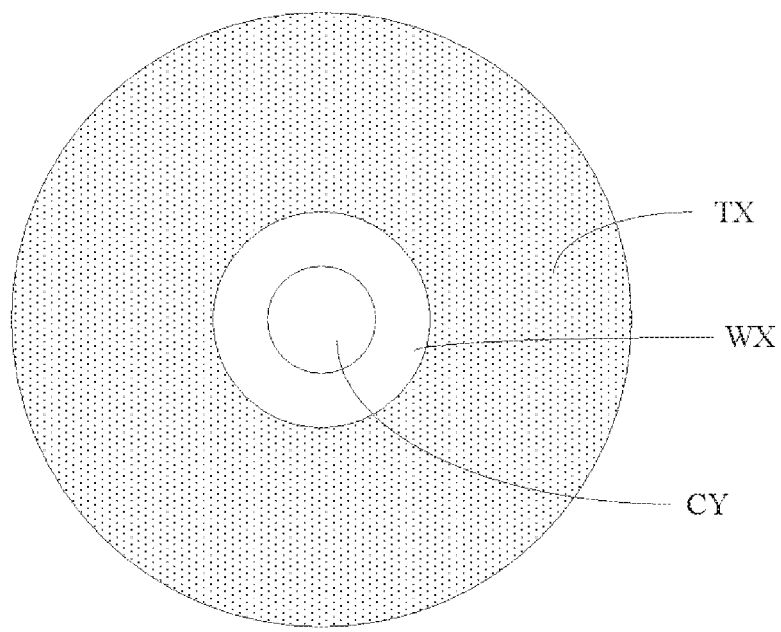
FIG. 15c schematically shows a diagram of a valid image zone, an invalid image zone and a residual image zone according to an embodiment of the present invention.

In an embodiment, at least one sub-pixel is a point light source. As shown in FIG. 15a to FIG. 15c, when a point light source emits light and fingerprint acquisition is carried out, the electroluminescent diode 112 emits light to irradiate the protective glass 200. Due to the effect of total reflection, when an incident angle of light emitted by the electroluminescent diode 112 is larger than or equal to the critical angle $\theta$ of total reflection, total reflection occurs. As a result, light rays L2-L4 cannot pass through the glass 200 and an annular total reflection zone QB may be formed. The incident angle of the light ray L1 is smaller than the critical angle $\theta$ of total reflection, it can emit to form a light transmission zone TG surrounded by the total reflection zone QB. When a finger touches the protecting glass 200, there can be a total reflection zone QB and a light transmission zone TG in an interface S2 touched by the finger. Light rays in the region where the light ray L1 is located or in the light transmission region TG can be reflected by the protection glass 200, in addition, the light rays in the region can also be reflected by the interface S2 touched by the finger, the two kinds of light reflected can be incident on image sensors. However, difference between the two kinds of the reflected light is small. As a result, valley and ridge cannot be distinguished. In addition, the angle between the light ray L1 and a normal angle is relatively small, so that its light intensity is relatively high. Thus, when light in the region where the light L1 is located is incident on the image sensors after being reflected, the light sensing detection range of the image sensors 120 may be exceeded, so that valley and ridge cannot be distinguished. In this way, an invalid image zone WX is formed on the plane S1 where the image sensors 120 are located. That is, in the invalid image zone WX, although the image sensors 120 also receive light, but distinction between different light signals is low. As a result, the distinction between different light induced electric signals generated by the image sensors in the invalid image zone WX is low. As a result, valley and ridge cannot be distinguished.

Because the light intensity of the light received by image sensors in the invalid image zone WX is relatively large, after the image sensors receive light, there can be a residual image for a period of time. If the residual image does not fade, when an image sensor receives light at a subsequent time, electric signal generated by the image sensor is not accurate due to the influence of the residual image. Therefore, fingerprints acquired are not accurate. In addition, because light intensity at a center of the light transmission region TG is strongest, so that intensity of light received by image sensors at a central zone of the invalid image zone (namely, residual image zone CY) is strongest. Therefore, influence of a residual image of an image sensor in the residual image zone CY on accuracy of fingerprints acquired is largest. Accordingly, fingerprint acquisition may be carried out through light of the total reflection zone QB. In an embodiment, when the ridges of fingerprints FG touch the total reflection zone QB, the total reflection condition is destroyed. When the valley areas touch the total reflection zone QB, the total reflection condition is not destroyed in those areas. Thus, due to influence of valley and ridge, light rays in the total reflection zone QB irradiate on image sensors, a fingerprint image alternating with brightness and darkness can be formed. In this way, when a point light source emits light, the light emitted by the point light source and in the total reflection zone QB forms an annular valid image zone TX on a plane S1 where the image sensors 120 are located after being reflected by an interface touched by a finger. In addition, the valid image zone TX surrounds the invalid image zone WX. The invalid image zone WX has a residual image zone CY. Here, the central zone of the invalid image zone WX can be a residual image zone CY. Of course, the residual image zone CY may be determined by design according to actual application environment. No limit is made here.

Figure 16:
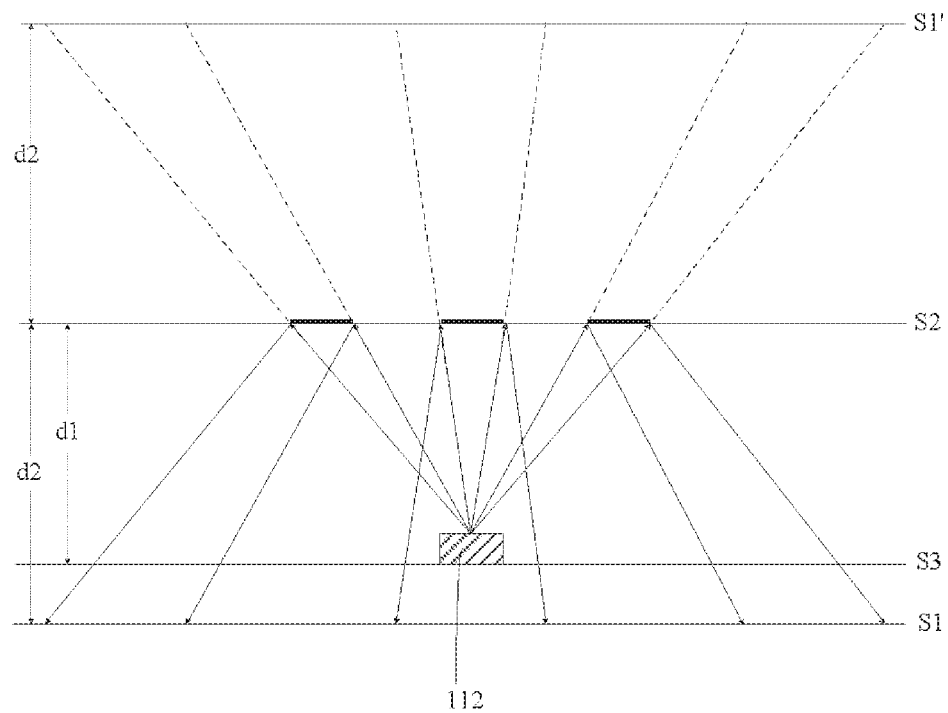
FIG. 16 schematically shows a diagram of amplification ratios according to an embodiment of the present invention.

As shown in FIG. 15a to FIG. 16, S1 represents a plane where the image sensors 120 are located. S1' represents a mirror plane of S1. S2 represents a plane of an interface where fingers FG touch. S3 represents a plane where an electroluminescent diode 112 in a point light source is located. d1 represents the distance between the plane S2 where the interface touched by the finger is located and the plane S3 where the sub-pixels of point light sources which emit light are located. d2 represents the distance between the plane S2 where the interface touched by the finger is located and the plane S1 where the image sensors are located. Because d2>d1, it can be seen that a fingerprint image formed on the image sensor is an amplified image compared with the original fingerprint. In addition, the amplification ratio A can satisfy the formula:

$$A = \frac{d1 + d2}{d1}.$$

The area of the invalid image zone SWX and the area of the light transmission zone STG satisfy the formula: SWX=A²*STG.

Figure 17:
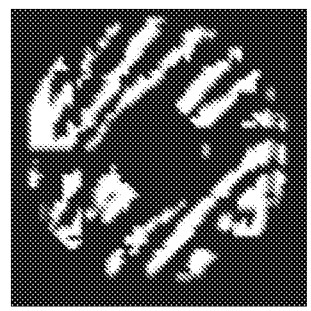
FIG. 17 schematically shows a simulation diagram of a fingerprint image obtained when fingerprints touch a total reflection zone.

In addition, a simulation result for a fingerprint image obtained when fingers touch the total reflection zone QB is shown in FIG. 17. As can be seen from FIG. 17, the valid image zone of the formed fingerprint image is annular. There is a missing part at a center. The missing part is located in the invalid image zone, and the missing fingerprint corresponds to the fingerprint in the light transmitting region. In order to obtain the fingerprint of the missing part at the center, an electroluminescent diode adjacent to the electroluminescent diode 112 that is emitting light in FIG. 15a may be controlled to emit light at a subsequent time, so that the missing part in FIG. 17 may be covered or obtained at the subsequent time. However, due to characteristics of an image sensor, after the image sensor receives light, there can be a residual image for a period of time. If the residual image does not fade, when the image sensor receives light at a subsequent time, electric signal generated by the image sensor is not accurate due to influence of the residual image. Thus, the fingerprints acquired are not accurate, and the effectiveness of fingerprint recognition may be low.

Based on this, an embodiment provides a driving method of a fingerprint recognition apparatus, which is used to improve accuracy of fingerprints acquired, and to improve effectiveness of fingerprint recognition.

The driving method of the fingerprint recognition apparatus according to an embodiment may comprise a fingerprint input stage:

In the fingerprint input stage, for a same image sensor, the interval between the time when receiving light of a residual image zone and the time when receiving light of a valid image zone is at least a preset residual image fading period.

The driving method of the fingerprint recognition apparatus according to an embodiment, at the fingerprint input stage, controls that the interval between the time when light of the residual image zone is received and the time when light of the valid image zone is received by a same image sensor is at least a preset residual image fading period. Thus, the residual image generated after the image sensor receives light in the residual image zone, can fade into an error-acceptable range through the preset residual image fading period. Therefore, when light in the valid image zone is received by the image sensor, it may be regarded that the residual image has already been eliminated. Therefore, accuracy of electric signal generated by the image sensor is improved. Further, accuracy of fingerprints acquired is improved, and effectiveness of fingerprint recognition is improved.

Figure 18:
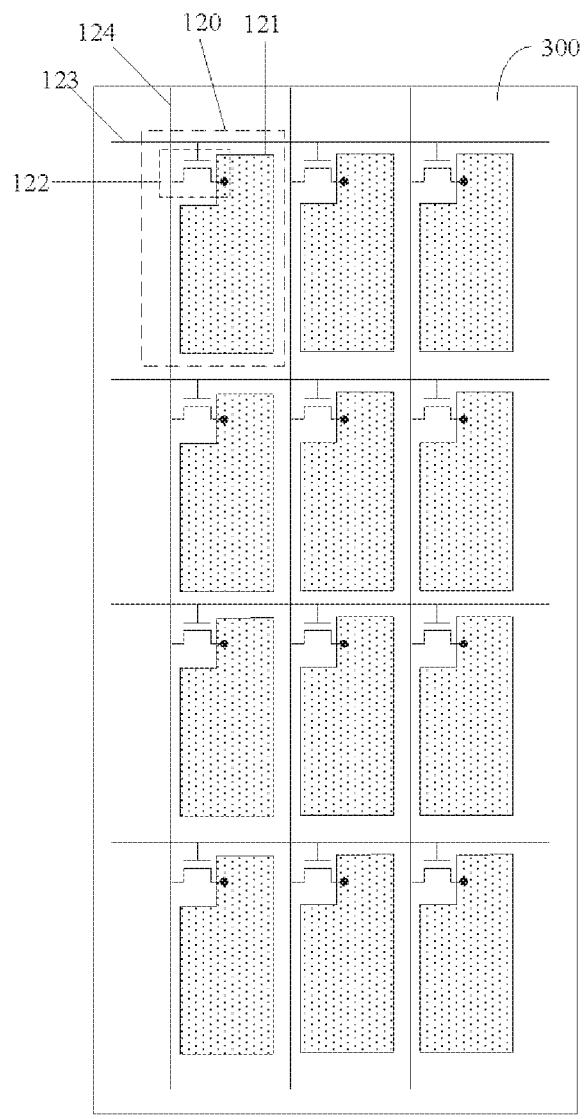
FIG. 18 schematically shows a diagram of distribution structure of image sensors located on a support substrate.

In an embodiment, as shown in FIG. 18, the image sensor 120 may comprise: a photodiode 121, and a switch transistor 122 electrically connected with the photodiode 121. In addition, the gate electrode of the switch transistor 122 is electrically connected with a fingerprint acquisition line 123. The source electrode of the switch transistor 122 is electrically connected with the photodiode 121. The drain electrode of the switch transistor 122 is electrically connected with a detection output line 124. In this way, when the fingerprint acquisition line 123 transmits gate-electrode-on signal, the switch transistor 122 is turned on, the driving circuitry may be turned on with the photodiode through the detection output line 124, so that the driving circuitry may obtain electric signal generated by the photodiode. When the fingerprint acquisition line 123 transmits a gate-electrode-off signal, the switch transistor 122 is turned off. In this way, the driving circuitry may determine a fingerprint image according to the obtained electric signal.

In an embodiment of the present invention, the preset residual image fading period may be predetermined. The method for determining the preset residual image fading period may use the following way. As shown in FIG. 18, a light source is controlled to emit light with a preset light intensity. Within time T1, electric signal Lt1 generated by each photodiode 121 is detected. Then, the light source is turned off. Within different times T2_b (1≤b≤B; b is a positive integer number, B is a positive integer number), electric signal Lt2_b generated by each photodiode 121 is detected. For electric signal Lt2_b detected within each time T2_b, based on electric signals Lt1 and Lt2_b generated by each photodiode 121, residual image ratio Lag_b corresponding to each photodiode 121 within time T2_b may be determined:

$$\text{Lag\_b} = \frac{Lt1 - Lt2\_b}{Lt1}.$$

Based on residual image ratio Lag_b corresponding to each photodiode 121, average value of residual image ratio corresponding to time T2_b is determined. When the average value of the residual image ratio corresponding to the time T2_b satisfies residual image elimination ratio, the time T2_b may serve as a preset residual image fading period. Here, residual image elimination ratio may be a numerical value in a range of 20%-100%. For example, the residual elimination ratio may be 20%, 50%, 70%, 80%, or 100%. Of course, if performance of a photodiode is different, time length for eliminating a residual image is also different. Thus, the numerical value of the residual image elimination ratio may be determined by design according to actual application environment. It is not restricted by the examples given here.

In an embodiment of the present invention, each point light source may be a sub-pixel. Or, each point light source may comprise all sub-pixels in a pixel unit. Or, each point light source may also comprise all sub-pixels in more than one pixel unit. Of course, different application environments have different requirements on the number of the sub-pixels in the point light source. Therefore, the number of the sub-pixels in a point light source can be determined by design according to actual application environment. It is not restricted by the examples given here.

In an embodiment, the interval between the time when the light of a residual image zone is received and the time when the light of a valid image zone is received by a same image sensor can be a preset residual image fading period. Of course, the interval between the time when the light of a residual image zone is received and the time when the light of a valid image zone is received by a same image sensor can be determined by design according to actual application environment. It is not restricted by the examples given here.

It should be noted that: the embodiments are intended to better explain the present invention, not to limit the present disclosure.

In an embodiment, fingerprint input stage can have a plurality of fingerprint acquisition cycles. Here, the number of the fingerprint acquisition cycles can be determined by design according to actual application environment. No limit is made here.

In an embodiment, the interval between the time when light from a residual image zone is received and the time when light from a valid image zone is received by a same image sensor is at least a preset residual image fading period.

For example, each point light source may be turned on during a time slot of a light emitting sequence. Point light sources with a same light emitting sequence in two adjacent fingerprint acquisition cycles are controlled to emit light with an interval which is at least at a preset residual image fading period, so as to satisfy the condition that the interval between the time when light of a residual image zone is received and the time when light of a valid image zone is received by a same image sensor within two adjacent fingerprint acquisition cycles is at least the preset residual image fading period.

The driving method according to an embodiment controls point light sources with a same light-emitting sequence in two adjacent fingerprint acquisition cycles to emit light with an interval which is at least the preset residual image fading period, so that a residual image generated by the point light sources in a preceding fingerprint acquisition cycle may fade into an acceptable range of error after the preset residual image fading period in a subsequent fingerprint acquisition cycle. Thus, in the subsequent fingerprint acquisition cycle, the residual image may be regarded as already eliminated from the image sensor. Therefore, in the subsequent fingerprint acquisition cycle, accuracy of electric signal of image sensors in the valid image zone corresponding to the point light sources with a same light emitting sequence is improved. Further, accuracy of fingerprints acquired is improved. Effectiveness of fingerprint recognition may be improved.

Description below is given with an example that: in two adjacent fingerprint acquisition cycles, point light sources of a same light emitting sequence are controlled to emit light at an interval which is the preset residual image fading period.

In an embodiment of the present invention, each fingerprint acquisition cycle may comprise N consecutive fingerprint acquisition frames. In each fingerprint acquisition frame, a plurality of point light sources in a finger touching zone may be controlled to emit light simultaneously, and electric signals generated by each image sensor in the finger touching zone may be collected. N may be an integer larger than 1. For example, N may be set to be 2, 3, 4, 5, 6, etc., which needs to be determined by design according to actual application environment. It is not restricted by the examples given here.

Figure 19:
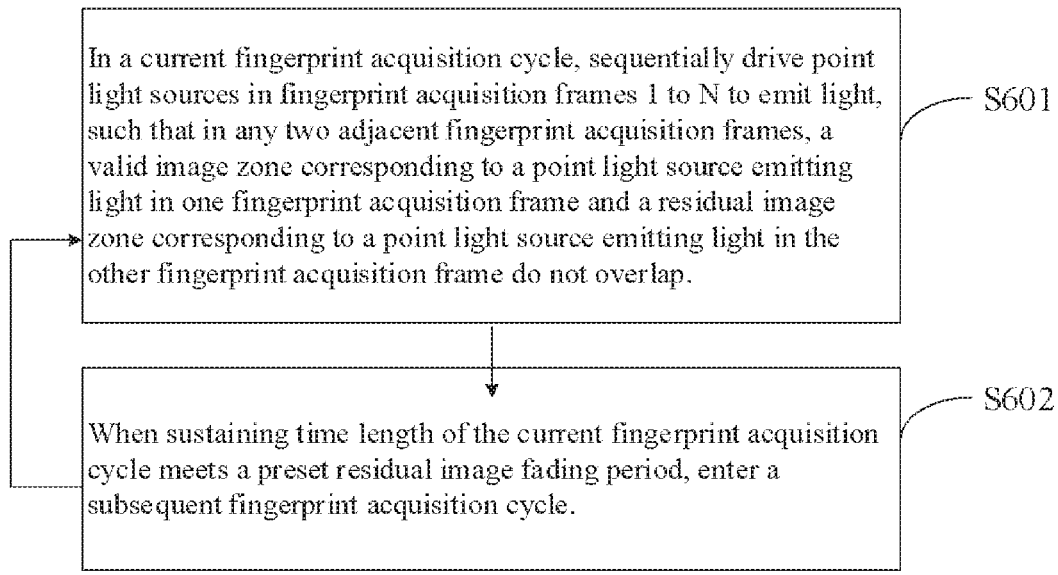
FIG. 19 is a flowchart 1 of a driving method according to an embodiment of the present invention.

In an embodiment, as shown in FIG. 19, point light sources of a same light emitting sequence in two adjacent fingerprint acquisition cycles is controlled to emit light at an interval which is at least the preset residual image fading period. This satisfies the condition that the interval between the time when light of a residual image zone is received and the time when light of a valid image zone is received by a same image sensor in two adjacent fingerprint acquisition cycles is at least the preset residual image fading period. The control may comprise the following steps:

S601: in a current fingerprint acquisition cycle, sequentially drive point light sources in fingerprint acquisition frames from 1 to N to emit light, so that valid image zones formed by point light sources emitting light in a fingerprint acquisition frame and residual image zones formed by point light sources emitting light in an adjacent fingerprint acquisition frame satisfy condition that they do not overlap with each other. In an embodiment, electric signal generated by all the image sensors in the fingerprint recognition apparatus may be collected. In another embodiment, only electric signal generated by image sensors in the finger touching zone may be collected, so that acquisition time of electric signal may be shortened. In order to determine a finger touching zone, in an embodiment, at beginning of a first fingerprint acquisition cycle, the following may be performed: obtaining a finger touching zone, e.g., an area touched by a finger, in the fingerprint recognition apparatus.

S602, when the time length of the current fingerprint acquisition cycle meets a preset residual image fading period, enter a subsequent fingerprint acquisition cycle. In an embodiment, in the current fingerprint acquisition cycle and the subsequent fingerprint acquisition cycle, point light sources emitting light are different. It should be noted that at any time the point light sources turned on to emit light simultaneously may be a subset of point light sources of a fingerprint recognition apparatus or a subset of point light sources of a touching zone of a fingerprint recognition apparatus. Moreover, the respective subset of point light sources may generate respective sets of valid image zones, invalid image zones and residual image zones correspondingly. In one embodiment, one subset of point light sources turned on at one time slot of a fingerprint acquisition cycle has no overlapping with another subset of point light sources turned on in another time slot of the same fingerprint acquisition cycle or another time slot of a different fingerprint acquisition cycle. This may apply to all embodiments described herein.

The driving method according to an embodiment may control a plurality of point light sources to emit light and obtain electric signals generated by image sensors in a first fingerprint acquisition frame of a current fingerprint acquisition cycle. Then, in a second fingerprint acquisition frame, a plurality of point light sources may controlled to emit light and electric signal generated by image sensors are obtained. Then, the rest is carried out similarly. No redundant description is given here. Because a current fingerprint acquisition cycle can include N fingerprint acquisition frames, the current fingerprint acquisition cycle has a sustaining time length. Thus, when the sustaining time length of the current fingerprint acquisition cycle meets the preset residual image fading period, a residual image on an image sensor in the residual image zone in a first fingerprint acquisition frame in the current fingerprint acquisition cycle can be regarded as already faded, so that the current fingerprint acquisition cycle may end, and a subsequent fingerprint acquisition cycle may start. A plurality of point light sources are controlled to emit light in a first fingerprint acquisition frame of a subsequent fingerprint acquisition cycle and electric signal generated by image sensors are obtained. Then, point light sources are controlled to emit light in a second fingerprint acquisition frame and electric signal generated by image sensor are obtained. Then, the rest is carried out similarly, until all fingerprint acquisition cycles are completed, so that electric signals corresponding to the finger fingerprint are all obtained. No redundant description is given here. Therefore, accuracy of electrical signal of an image sensor can be improved, and effectiveness of fingerprint recognition may be improved. In addition, in an embodiment, the rest of the fingerprint is obtained during waiting time for the residual image to fade, so that the fingerprint input time can be reduced. Effectiveness of fingerprint recognition is further improved.

Figure 20A:
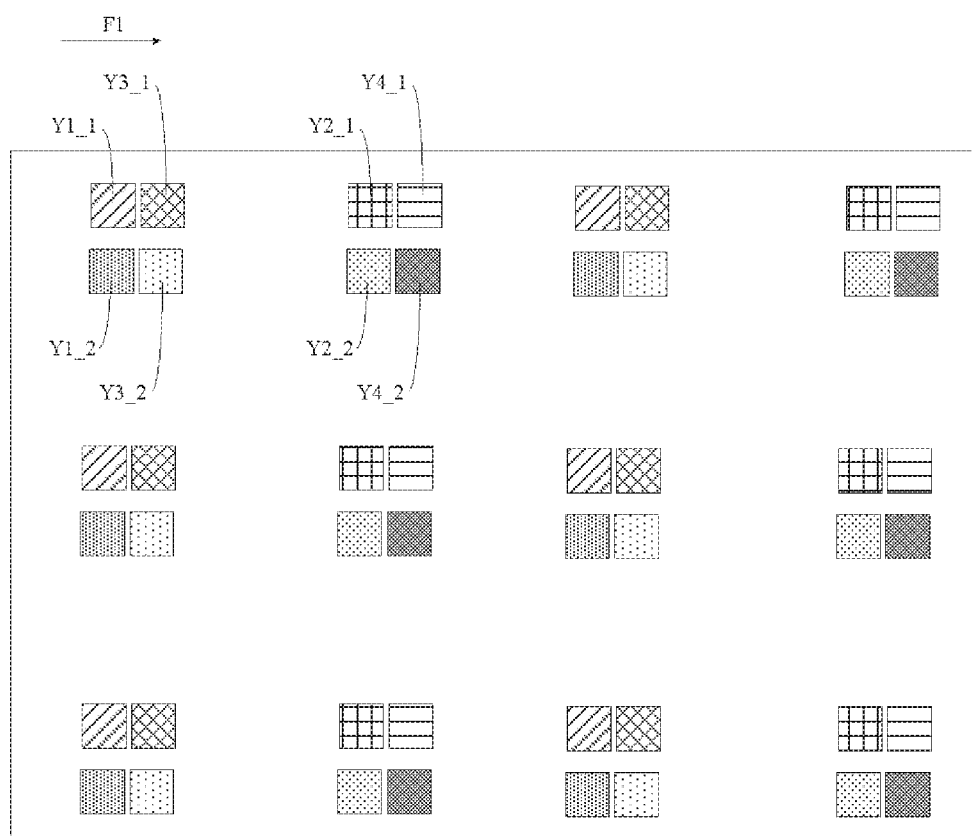
FIG. 20a schematically shows a structural diagram 1 of point light sources according to an embodiment of the present invention.
Figure 20B:
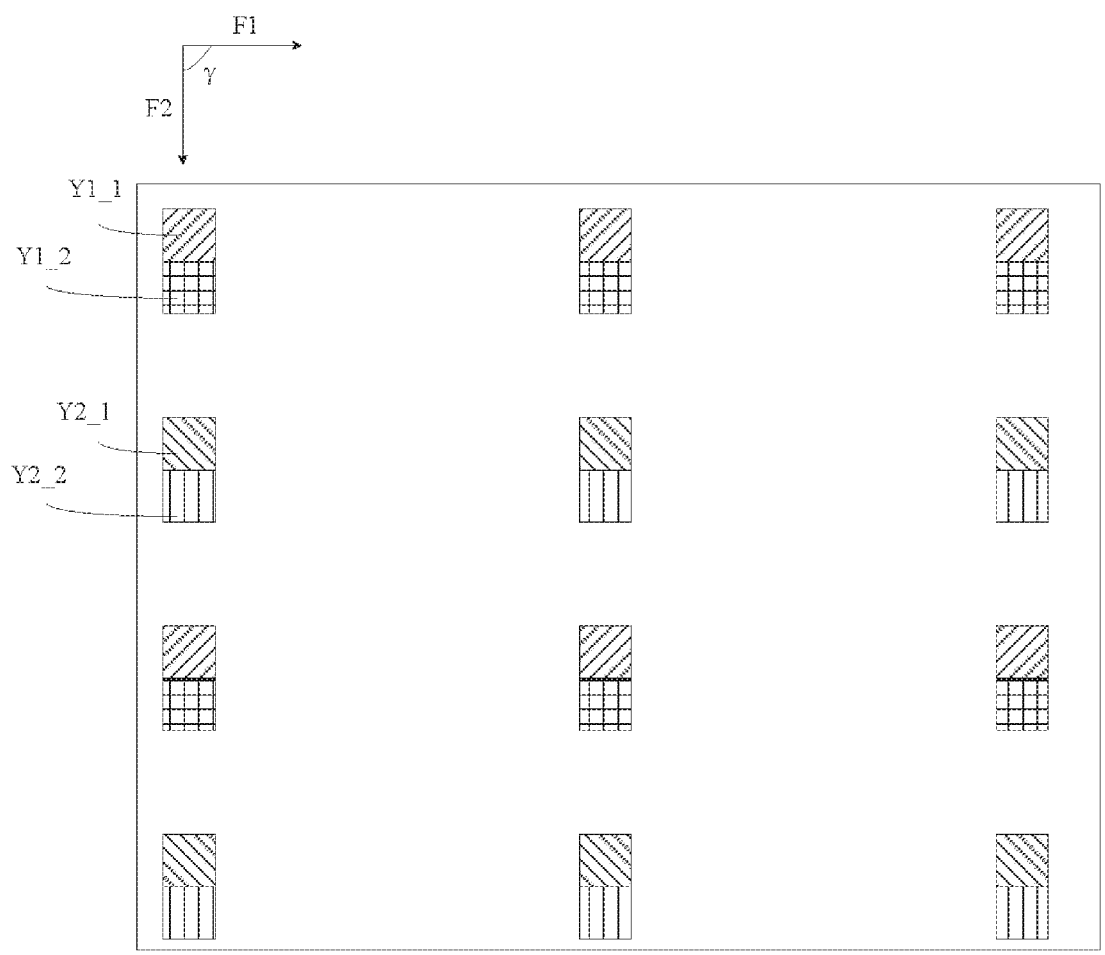
FIG. 20b schematically shows a structural diagram 2 of point light sources according to an embodiment of the present invention.
Figure 20C:
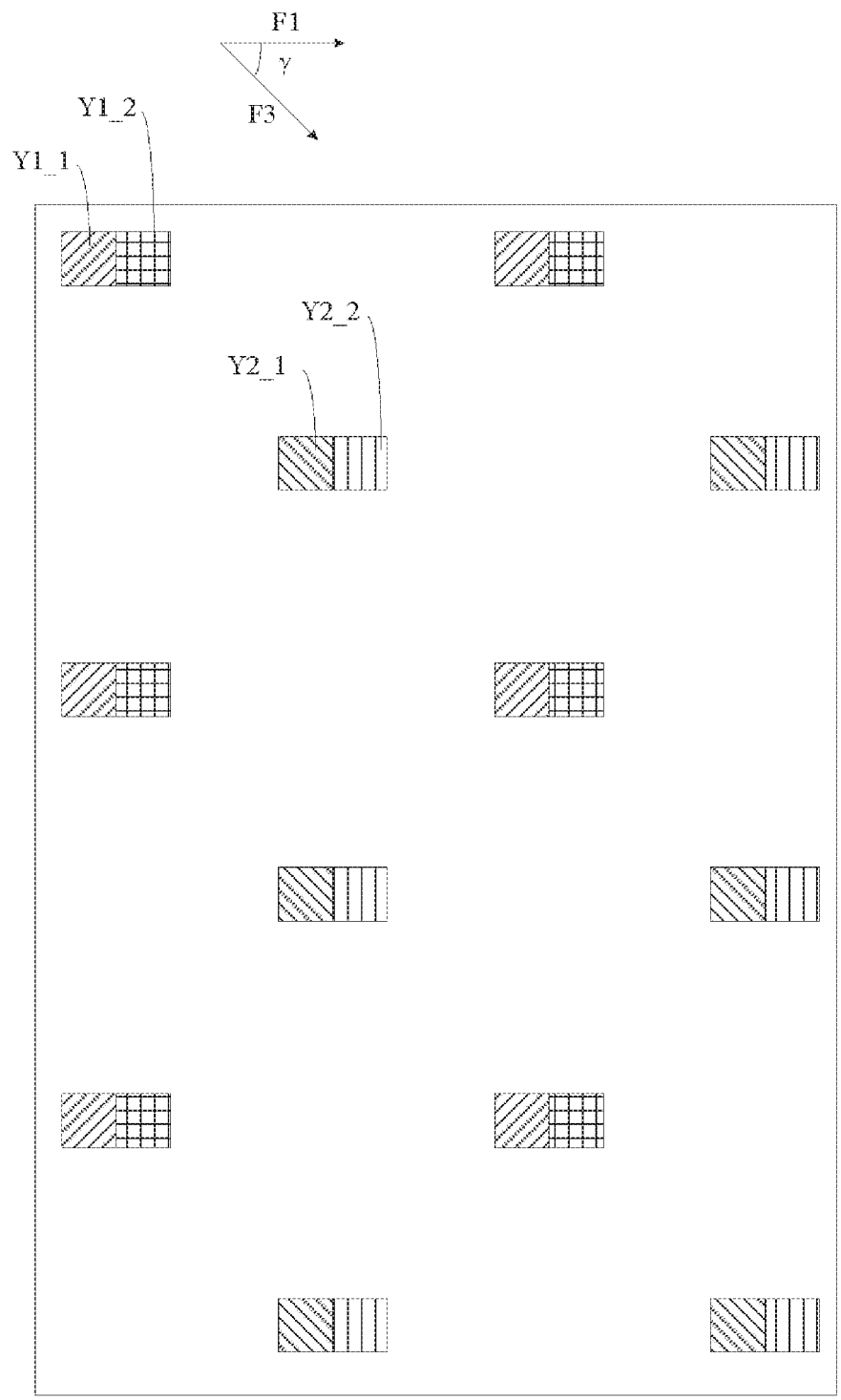
FIG. 20c schematically shows a structural diagram 3 of point light sources according to an embodiment of the present invention.

It should be noted that, in each fingerprint acquisition cycle, point light sources emitting light in an n-th fingerprint acquisition frame are point light sources having a same light emitting time slot in a lighting order, in which n is an integer greater than or equal to 1 and less than or equal to N. In an embodiment of the present invention, the patterns composed by the point light sources emitting light in each fingerprint acquisition frames are same. In this way, multiple point light sources in each fingerprint acquisition frame can move wholly. For example, taking a first fingerprint acquisition cycle and a second fingerprint acquisition cycle and each fingerprint acquisition cycle comprising four fingerprint acquisition frames (namely, first to fourth fingerprint acquisition frames) as an example, as shown in FIG. 20a, Y1_1 represents point light sources which emit light simultaneously in the first fingerprint acquisition frame in the first fingerprint acquisition cycle. Y2_1 represents point light sources which emit light simultaneously in the second fingerprint acquisition frame in the first fingerprint acquisition cycle. Y3_1 represents point light sources which emit light simultaneously in the third fingerprint acquisition frame in the first fingerprint acquisition cycle. Y4_1 represents point light sources which emit light simultaneously in the fourth fingerprint acquisition frame in the first fingerprint acquisition cycle. Y1_2 represents point light sources which emit light simultaneously in the first fingerprint acquisition frame in the second fingerprint acquisition cycle. Y2_2 represents point light sources which emit light simultaneously in the second fingerprint acquisition frame in the second fingerprint acquisition cycle. Y3_2 represents point light sources which emit light simultaneously in the third fingerprint acquisition frame in the second fingerprint acquisition cycle. Y4_2 represents point light sources which emit light simultaneously in the fourth fingerprint acquisition frame in the second fingerprint acquisition cycle. Here patterns formed by Y1_1, Y2_1, Y3_1, Y4_1, Y1_2, Y2_2, Y3_2 and Y4_2 are same. Or, taking an example that each fingerprint acquisition cycle includes two fingerprint acquisition frames (namely, first to second fingerprint acquisition frames) as an example, as shown in FIG. 20b and FIG. 20c. Y1_1 represents point light sources which emit light simultaneously in the first fingerprint acquisition frame in the first fingerprint acquisition cycle. Y2_1 represents point light sources which emit light simultaneously in the second fingerprint acquisition frame in the first fingerprint acquisition cycle. Y1_2 represents point light sources which emit light simultaneously in the first fingerprint acquisition frame in the second fingerprint acquisition cycle. Y2_2 represents point light sources which emit light simultaneously in the second fingerprint acquisition frame in the second fingerprint acquisition cycle. Here, the patterns formed by Y1_1, Y2_1, Y1_2 and Y2_2 are same.

Further, in an embodiment of the present invention, in a same fingerprint acquisition cycle, overall movement direction of the point light sources emitting light in consecutive N fingerprint acquisition frames may be row direction of the sub-pixels. For example, as shown in FIG. 20a, in a first fingerprint acquisition cycle, point light sources Y1_1 and Y2_1 move along the row direction F1 of the sub-pixels, and point light sources Y3_1 and Y4_1 move along the row direction F1 of the sub-pixels. In a second fingerprint acquisition cycle, and point light sources Y1_2 and Y2_2 move along the row direction F1 of the sub-pixels, point light sources Y3_2 and Y4_2 move along the row direction F1 of the sub-pixels.

In an embodiment of the present invention, in a same fingerprint acquisition cycle, overall movement direction of each point light source emitting light in consecutive N fingerprint acquisition frames may have an angle γ with the row direction of the sub-pixels here, the angle γ is equal to 90 degrees. Namely, the overall movement direction of each point light source in the consecutive N fingerprint acquisition frames is the column direction F2 of the sub-pixels. For example, as shown in FIG. 20b, in a first fingerprint acquisition cycle, point light sources Y1_1 and Y2_1 move along the column direction F2 of the sub-pixels. In a second fingerprint acquisition cycle, point light sources Y1_2 and Y2_2 move along the column direction F2 of the sub-pixels.

In an embodiment of the present invention, in a same fingerprint acquisition cycle, overall moving direction of each point light source in the consecutive N fingerprint acquisition frames may be a direction which has an angle γ with the row direction F3 of the sub-pixels; here, the angle γ is larger than 0° and less than 90°. For example, as shown in FIG. 20c, in a first fingerprint acquisition cycle, point light sources Y1_1 and Y2_1 move along the direction F3. In a second fingerprint acquisition cycle, point light sources Y1_2 and Y2_2 move along the direction F3.

Of course, in an embodiment of the present invention, the above moving directions can also be combined. It needs to be determined by design according to actual application environment. It is not restricted by the examples given here.

Figure 21A:
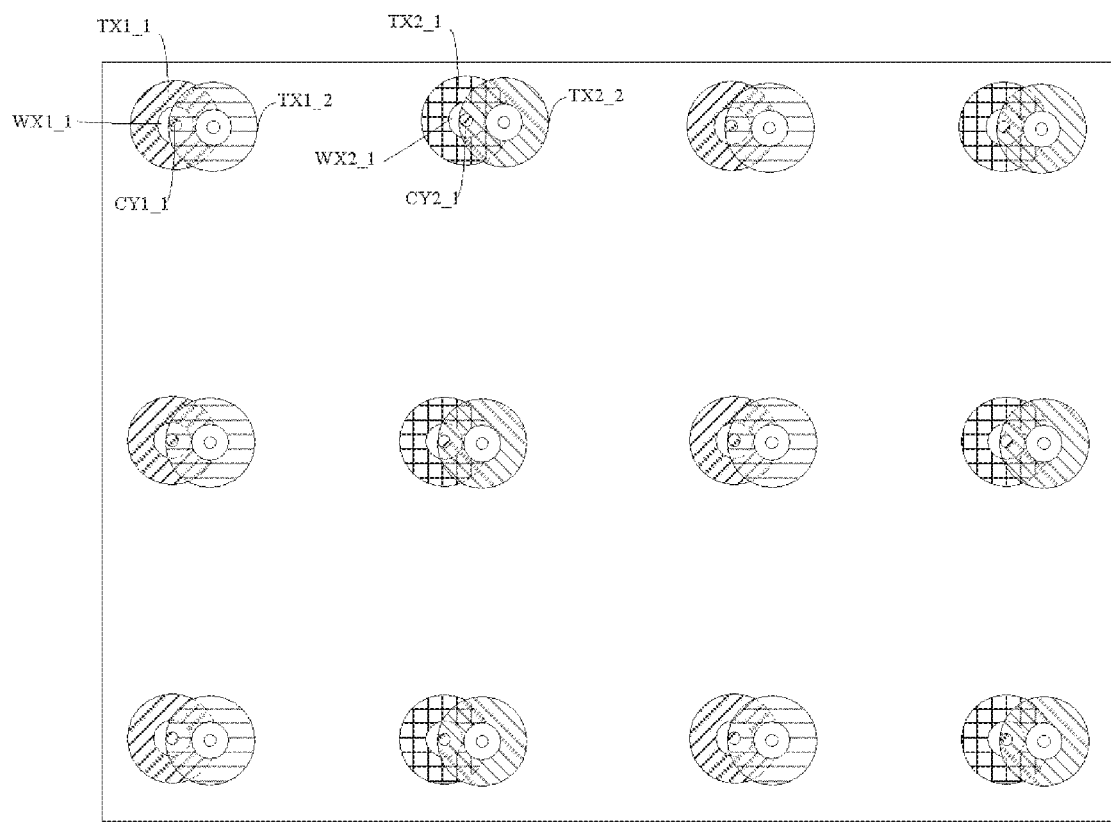
FIG. 21a schematically shows a diagram 1 of imaging zones according to an embodiment of the present invention.

In an embodiment of the present invention, in a same fingerprint acquisition cycle, a valid image zone corresponding to point light sources which emit light in a subsequent fingerprint acquisition frame does not overlap with a valid image zone corresponding to point light sources which emit light in a preceding fingerprint acquisition frame. For example, the valid image zone corresponding to the point light sources which emit light in the subsequent fingerprint acquisition frame and the valid image zone corresponding to the point light sources which emit light in the preceding fingerprint acquisition frame can satisfy condition that their distance is a preset distance, so that the valid image zone corresponding to the point light sources which emit light in the subsequent fingerprint acquisition frame is separated from the valid image zone corresponding to the point light sources which emit light in the preceding fingerprint acquisition frame. Here, the preset distance can be size of at least one sub-pixel, or can also be other distance. It needs to be determined by design according to actual application environment. No limit is made here. For example: a first fingerprint acquisition cycle and a second fingerprint acquisition cycle, and each fingerprint acquisition cycle includes two fingerprint acquisition frames (namely, a first fingerprint acquisition frame and a second fingerprint acquisition frame), as shown in FIG. 21a. TX1_1 represents a valid image zone corresponding to a point light source which emits light in the first fingerprint acquisition frame of the first fingerprint acquisition cycle. TX2_1 represents a valid image zone corresponding to a point light source which emits light in the second fingerprint acquisition frame in the first fingerprint acquisition cycle. TX1_2 represents a valid image zone corresponding to a point light source which emits light in the first fingerprint acquisition frame in the second fingerprint acquisition cycle. TX2_2 represents a valid image zone corresponding to a point light source which emits light in the second fingerprint acquisition frame in the second fingerprint acquisition cycle. Here, in the first fingerprint acquisition cycle, the valid image zone TX2_1 corresponding to the point light source which emits light in a subsequent fingerprint acquisition frame (namely, the second fingerprint acquisition frame) is separated from the valid image zone TX1_1 corresponding to the point light source which emits light in a preceding fingerprint acquisition frame (namely, the first fingerprint acquisition frame) by a certain distance. In the second fingerprint acquisition cycle, the valid image zone TX2_2 corresponding to the point light source which emits light in the a subsequent fingerprint acquisition frame (namely, the second fingerprint acquisition frame) is separated from the valid image zones TX1_2 corresponding to the point light source which emits light in a preceding fingerprint acquisition frame (namely, the first fingerprint acquisition frame) by a certain distance.

Figure 21B:
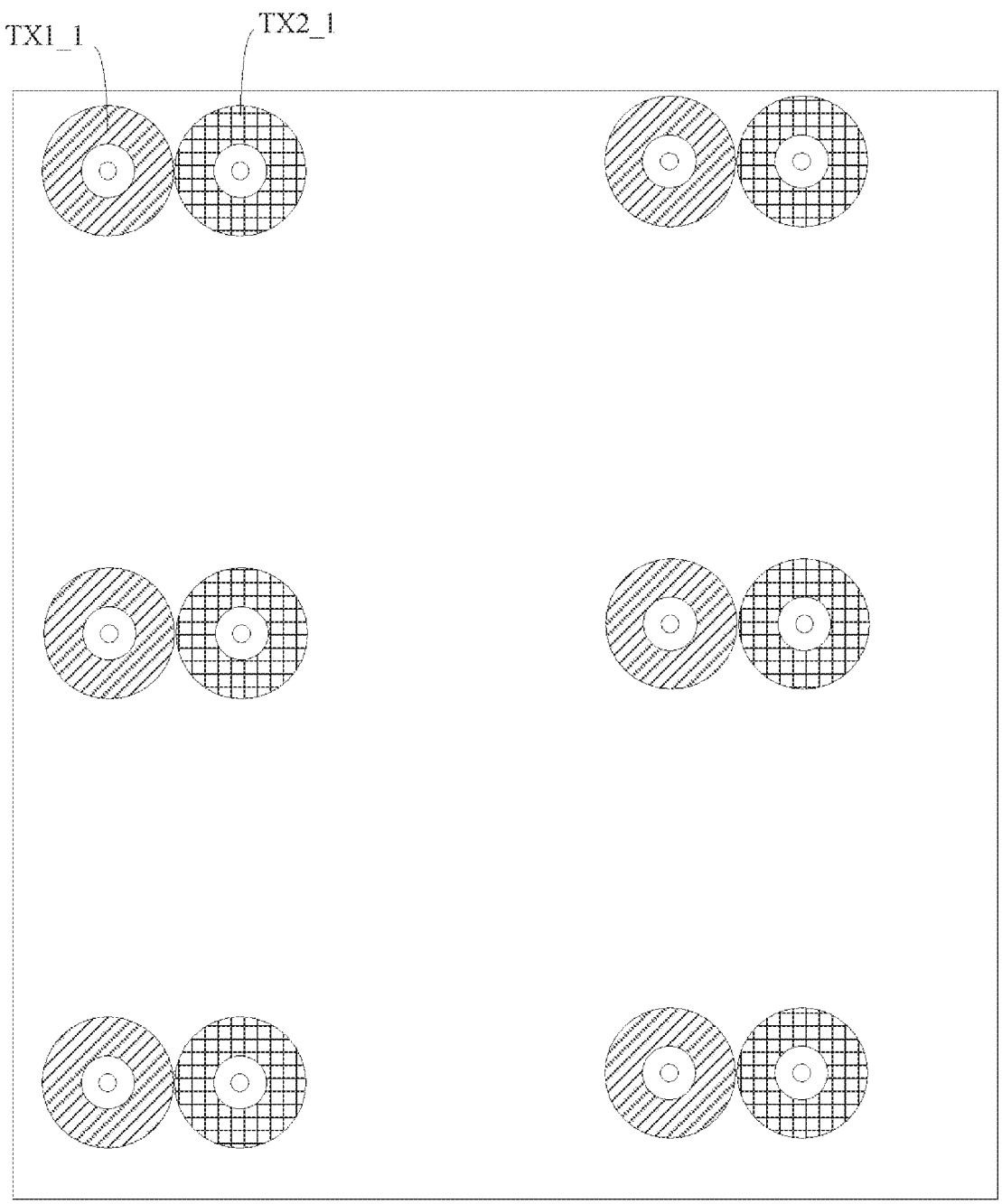
FIG. 21b schematically shows a diagram 2 of imaging zones according to an embodiment of the present invention.

In another embodiment, a valid image zone corresponding to point light sources which emit light in a subsequent fingerprint acquisition frame may be tangent to a valid image zone corresponding to point light sources which emit light in a preceding fingerprint acquisition frame. For example: a fingerprint acquisition cycle includes two fingerprint acquisition frames (namely, a first fingerprint acquisition frame and a second fingerprint acquisition frame), as shown in FIG. 21b. TX1_1 represents a valid image zone corresponding to a point light source which emits light in the first fingerprint acquisition frame in a first fingerprint acquisition cycle. TX2_1 represents a valid image zone corresponding to a point light source which emits light in the second fingerprint acquisition frame in the first fingerprint acquisition cycle. It can be seen that the valid image zone TX_1 corresponding to the point light source which emits light in a subsequent fingerprint acquisition frame (namely, the second fingerprint acquisition frame) is tangent to the valid image zone TX2_1 corresponding to the point light source which emits light in a preceding fingerprint acquisition frame (namely, the first fingerprint acquisition frame).

Figure 22:
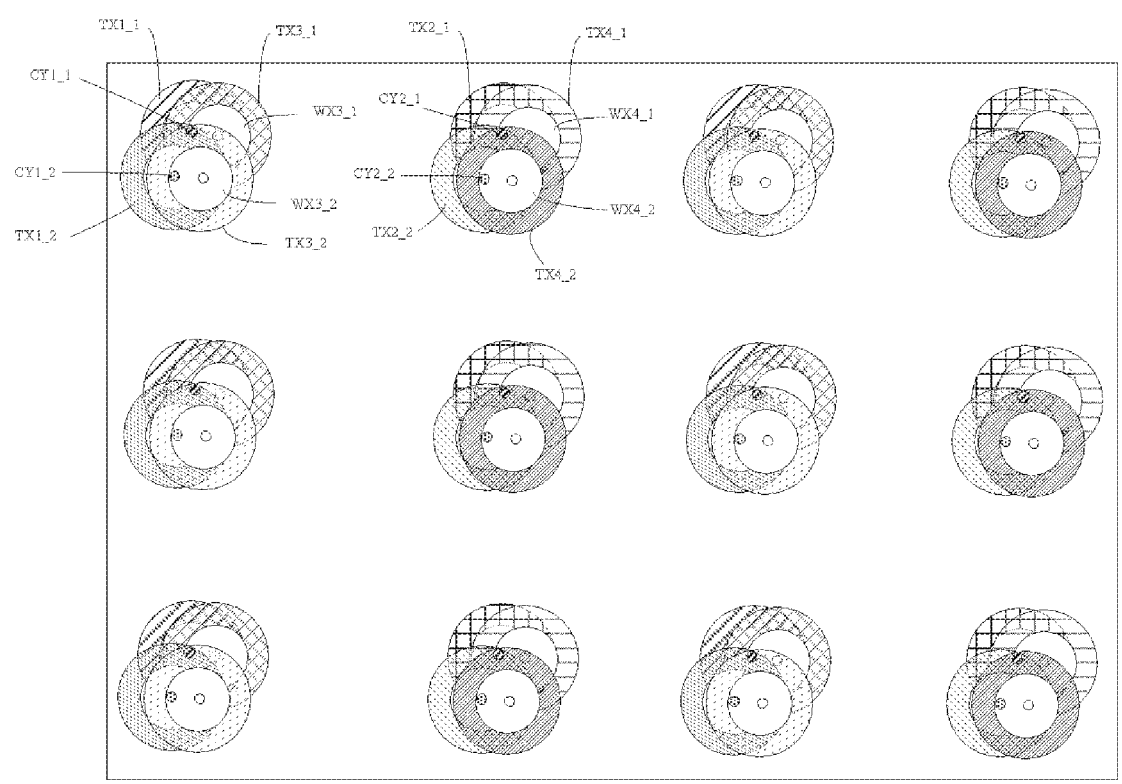
FIG. 22 schematically shows a diagram 3 of imaging zones according to an embodiment of the present invention.

In an embodiment, N can be set to be an integer greater than or equal to 3, so that a fingerprint acquisition cycle at least comprises three fingerprint acquisition frames. In an embodiment of the present invention, in a same fingerprint acquisition cycle, for two fingerprint acquisition frames separated from each other by at least one fingerprint acquisition frame, an invalid image zone corresponding to point light sources which emit light in a subsequent fingerprint acquisition frame covers a residual image zone corresponding to point light sources which emit light in a preceding fingerprint acquisition frame. In particular, for two fingerprint acquisition frames which are separated from each other by one fingerprint acquisition frame, an invalid image zone corresponding to point light sources which emit light in a subsequent fingerprint acquisition frame covers a residual image zone corresponding to point light sources which emit light in a preceding fingerprint acquisition frame. For example, take an example that a fingerprint acquisition includes four fingerprint acquisition frames (namely first to fourth fingerprint acquisition frames), as shown in FIG. 20a and FIG. 22. TX1_1 represents a valid image zone corresponding to each point light source Y1_1 which emits light in the first fingerprint acquisition frame in a first fingerprint acquisition cycle. TX2_1 represents a valid image zone corresponding to each point light source Y2_1 which emits light in the second fingerprint acquisition frame in the first fingerprint acquisition cycle. TX3_1 represents a valid image zone corresponding to each point light source Y3_1 which emits light in the third fingerprint acquisition frame in the first fingerprint acquisition cycle. TX4_1 represents a valid image zone corresponding to each point light source Y4_1 which emits light in the fourth fingerprint acquisition frame in the first fingerprint acquisition cycle. CY1_1 represents a residual image zone corresponding to each point light source Y1_1 which emits light in the first fingerprint acquisition frame in the first fingerprint acquisition cycle. CY2_1 represents a residual image zone corresponding to each point light source Y2_1 which emits light in the second fingerprint acquisition frame in the first fingerprint acquisition cycle. WX3_1 represents an invalid image zone corresponding to each point light source Y3_1 which emits light in the third fingerprint acquisition frame in the first fingerprint acquisition cycle. WX4_1 represents an invalid image zone corresponding to each point light source Y4_1 which emits light in the fourth fingerprint acquisition frame in the first fingerprint acquisition cycle. TX1_2 represents a valid image zone corresponding to each point light source Y1_2 which emits light in the first fingerprint acquisition frame in a second fingerprint acquisition cycle. TX2_2 represents a valid image zone corresponding to each point light source Y2_2 which emits light in the second fingerprint acquisition frame in the second fingerprint acquisition cycle. TX3_2 represents a valid image zone corresponding to each point light source Y3_2 which emits light in the third fingerprint acquisition frame in the second fingerprint acquisition cycle. TX4_2 represents a valid image zone corresponding to each point light source Y4_2 which emits light in the fourth fingerprint acquisition frame in the second fingerprint acquisition cycle. CY1_2 represents a residual image zone corresponding to each point light source Y1_2 which emits light in the first fingerprint acquisition frame in the second fingerprint acquisition cycle. CY2_2 represents a residual image zone corresponding to each point light source Y2_2 which emits light in the second fingerprint acquisition frame in the second fingerprint acquisition cycle. WX3_2 represents an invalid image zone corresponding to each point light source Y3_2 which emits light in the third fingerprint acquisition frame in the second fingerprint acquisition cycle. WX4_2 represents an invalid image zone corresponding to each point light source Y4_2 which emits light in the fourth fingerprint acquisition frame in the second fingerprint acquisition cycle. Here, valid image zones TX1_1-TX4_1, TX1_2-TX4_2, which correspond to each point light source which emits light from first fingerprint acquisition frames to fourth fingerprint acquisition frames in a first fingerprint acquisition cycle and a second fingerprint acquisition cycle, do not overlap with each other. In a first fingerprint acquisition cycle, WX3_1 covers CY1_1, WX4_1 covers CY_2_1. In a second fingerprint acquisition cycle, WX3_2 covers CY1_2, and WX4_2 covers CY2_2.

In an embodiment of the present invention, in two adjacent fingerprint acquisition cycles, a valid image zone corresponding to each point light source which emits light in an n-th fingerprint acquisition frame of a subsequent fingerprint acquisition cycle can overlap with an invalid image zone corresponding to each point light source which emits light in at least one of fingerprint acquisition frames which are from a first to an n-th fingerprint acquisition frame in a preceding fingerprint acquisition cycle. Here, a valid image zone corresponding to each point light source which emits light in an n-th fingerprint acquisition frame in a subsequent fingerprint acquisition cycle can overlap with an invalid image zone corresponding to each point light source which emits light in an n-th fingerprint acquisition frame of a preceding fingerprint acquisition cycle. In this way, electric signal corresponding to fingerprints in the invalid image zones corresponding to each point light source which emits light in the n-th fingerprint acquisition frame in the preceding fingerprint acquisition cycle can be obtained. As shown in FIG. 22, TX1_2 overlaps with an invalid image zone corresponding to each point light source which emits light in the first fingerprint acquisition frame in the first fingerprint acquisition cycle. TX2_2 overlaps with an invalid image zone corresponding to each point light source which emits light in the second fingerprint acquisition frame in the first fingerprint acquisition cycle. TX3_2 overlaps with WX3_1. TX4_2 overlaps with WX4_1. Of course, setting can be done in other ways. No limit is made here.

Further, in an embodiment, a valid image zone corresponding to each point light source which emits light in an n-th fingerprint acquisition frame in a subsequent fingerprint acquisition cycle at least partially covers an invalid image zone corresponding to each point light source which emits light in an n-th fingerprint acquisition frame in a preceding fingerprint acquisition cycle. In this way, electric signal corresponding to fingerprints in the invalid image zones corresponding to each point light sources which emit light in the n-th fingerprint acquisition frame of the preceding fingerprint acquisition cycle can be obtained. For example, as shown in FIG. 21a, WX1_1 represents an invalid image zone corresponding to each point light source which emits light in a first fingerprint acquisition frame in a first fingerprint acquisition cycle. W2_1 represents an invalid image zone corresponding to each point light source which emits light in a second fingerprint acquisition frame in the first fingerprint acquisition cycle. Here, TX1_2 partially covers WX1_1. TX2_2 partially covers WX2_1. Of course, the valid image zone corresponding to each point light source which emits light in the n-th fingerprint acquisition frame in the subsequent fingerprint acquisition cycle may completely cover the invalid image zone corresponding to each point light source which emits light in the n-th fingerprint acquisition frame in the preceding fingerprint acquisition cycle. No limit is made here.

In an embodiment, a valid image zone corresponding to each point light source which emits light in an n-th fingerprint acquisition frame in a subsequent fingerprint acquisition cycle may at least partially cover a residual image zone corresponding to each point light source which emits light in an n-th fingerprint acquisition frame in a preceding fingerprint acquisition cycle. As shown in FIG. 21a, CY1_1 represents a residual image zone corresponding to each point light source which emits light in a first fingerprint acquisition frame in a first fingerprint acquisition cycle. CY2_1 represents a residual image zone corresponding to each point light source which emits light in a second fingerprint acquisition frame in the first fingerprint acquisition cycle. Here, TX1_2 completely covers CY1_1, TX2_2 completely covers CY2_1. Of course, a valid image zone corresponding to each point light source which emits light in an n-th fingerprint acquisition frame in a subsequent fingerprint acquisition cycle may also partially cover a residual image zone corresponding to each point light source which emits light in an n-th fingerprint acquisition frame in a preceding fingerprint acquisition cycle. No limit is made here. In this way, a valid image zone corresponding to point light sources which emit light in a first fingerprint acquisition frame in a subsequent fingerprint acquisition cycle may partially or completely cover a residual image zone corresponding to point light sources which emit light in a first fingerprint acquisition frame in a preceding fingerprint acquisition cycle. In this way, electric signal in the residual image zone which are not obtained in the first fingerprint acquisition frame in the preceding fingerprint acquisition cycle can be obtained. Then, in a second fingerprint acquisition frame, a valid image zone corresponding to point light sources which emit light in the second fingerprint acquisition frame may partially or completely cover a residual image zone corresponding to point light sources which emit light in a second fingerprint acquisition frame in the preceding fingerprint acquisition cycle. In this way, electric signal in the residual image zone which are not obtained in the second fingerprint acquisition frame in the preceding fingerprint acquisition cycle can be obtained. Then, the rest is carried out similarly, until all fingerprint acquisition cycles are completed, and electric signal corresponding to the fingerprints of a finger are all obtained. No redundant description is given here. In addition, as to n-th fingerprint in each fingerprint acquisition cycle, because the sustaining time length of current fingerprint acquisition cycle meets the preset residual image fading period, a residual image of an image sensor which receive light of a residual image zone in a preceding fingerprint acquisition cycle can be regarded already eliminated, and a subsequent fingerprint acquisition cycle starts. Thus, influence of a residual image of an image sensor in an n-th fingerprint acquisition frame on electric signal may be avoided, so that accuracy of electric signal generated by the image sensor is improved. Further, accuracy of fingerprints acquired is improved, effectiveness of fingerprint recognition is improved.

In an embodiment of the present invention, a valid image zone corresponding to each point light source which emits light in an n-th fingerprint acquisition frame in a subsequent fingerprint acquisition cycle may satisfy condition that it does not overlap with a residual image zone corresponding to each point light source which emits light in fingerprint acquisition frames which are from (n+1)th fingerprint acquisition frame to N-th fingerprint acquisition frame in a preceding fingerprint acquisition cycle. Here, a valid image zone corresponding to each point light source which emits light in an n-th fingerprint acquisition frame in a subsequent fingerprint acquisition cycle completely covers or partially covers an invalid image zone corresponding to each point light source which emits light in an n-th fingerprint acquisition frame in a preceding fingerprint acquisition cycle. No limit is made here. Take an example that a fingerprint acquisition cycle includes four fingerprint acquisition frames (namely, first to fourth fingerprint acquisition frames), as shown in FIG. 22. TX1_2 partially covers an invalid image zone corresponding to point light sources which emit light in the first fingerprint acquisition frame in a first fingerprint acquisition cycle. In addition, TX1_2 does not overlap with a residual image zone corresponding to the point light sources which emit light in second to fourth fingerprint acquisition frames in the first fingerprint acquisition cycle. The rest is carried out similarly. No redundant description is given here.

In an embodiment, fingerprint input stage is used for inputting a new fingerprint into the fingerprint recognition apparatus for fingerprint recognition. In addition, every time when a new fingerprint is input, working process of the fingerprint input stage can be carried out. In an embodiment of the present invention, in the fingerprint input stage, after all fingerprint acquisition cycles are completed, the following can be further comprised:

According to each electric signal obtained within each fingerprint acquisition cycle, a complete image of the fingerprints of a finger is determined;

Image characteristics corresponding to multiple fingerprint characteristic points are extracted from the complete image and stored in a fingerprint database. In this way, the fingerprints determined in the fingerprint input stage can be stored in the fingerprint database so as to carry out fingerprint recognition.

Further, in order to achieve fingerprint recognition function, in an embodiment, the driving method may further comprise: fingerprint recognition stage which may comprise at least one fingerprint recognition cycle.

In a current fingerprint recognition cycle, a plurality of point light sources in a finger touching zone are controlled to emit light. In addition, when the point light sources emit light, at least electric signal generated by each image sensor in the finger touching zone is obtained. In an embodiment, electrical signal generated by all image sensors in the fingerprint recognition apparatus may be obtained. In another embodiment, only electric signal generated by each image sensor in the finger touching zone may be obtained, so that time for obtaining electric signal can be shortened. In order to determine the finger touching zone, in an embodiment, at the beginning of a first fingerprint recognition cycle, the following can be further comprised: obtaining a finger touching zone which is touched by a finger in the fingerprint recognition apparatus.

According to electric signal obtained in the fingerprint recognition stage and a fingerprint database, fingerprint recognition is carried out.

Further, in an embodiment of the present invention, according to electric signal obtained in the fingerprint recognition stage and the fingerprint database, fingerprint recognition stage may comprise:

Based on electric signal obtained in a current fingerprint recognition cycle, image characteristics corresponding to fingerprint characteristic points of the current fingerprint is determined;

Determine whether similarity degree between the image characteristics corresponding to the fingerprint characteristic points of the current fingerprint and the image characteristics corresponding to the fingerprint characteristic points in the fingerprint database meets a preset similarity degree threshold value;

If yes, then it is determined that the current fingerprint matches the fingerprint already stored, and a subsequent fingerprint recognition stage may start; here, when determining whether the current fingerprint matches a stored fingerprint, corresponding operations, such as turning on the apparatus, can be carried out.

If not, then it is determined that the current fingerprint does not match the stored fingerprint, and a subsequent fingerprint recognition cycle may start.

When fingerprint recognition is carried out, fingerprint recognition performance can be evaluated through a false rejection rate (FRR) and a false acceptance rate (FAR). In an embodiment, a preset similarity degree threshold value may comprise: FRR<1/50000 and FAR<2%. Of course, different application environments have different requirements for the similarity degree threshold value. Therefore, in a practical application, the preset similarity degree threshold value may be determined according to actual application environment. No limit is made here. In this way, when similarity degree between image characteristics corresponding to the fingerprint characteristic points of the current fingerprint and image characteristics corresponding to the fingerprint characteristic points in the fingerprint database does not meet the preset similarity degree threshold value, it may indicate that the current fingerprint does not match the stored fingerprint, the fingerprint recognition apparatus cannot be turned on right now. In this way, a subsequent fingerprint recognition cycle may start, the fingerprint recognition process is continued. When it is determined that similarity degree between the image characteristics corresponding to the fingerprint characteristic points of the current fingerprint and the image characteristics corresponding to the fingerprint characteristic points in the fingerprint database meets the preset similarity degree threshold value, it can indicate that the current fingerprint matches a stored fingerprint, then the fingerprint recognition apparatus can be turned on, so that the process of more fingerprint acquisition is not carried out. Time for fingerprint recognition can be shortened. User experience for fingerprint recognition can be improved.

In an embodiment of the present invention, a fingerprint recognition cycle can be divided into consecutive fingerprint recognition frames that include at least one fingerprint recognition frame. In various embodiments, the fingerprint recognition cycle may be divided into one, two, three, four or six consecutive fingerprint recognition frames. Of course, different application environments have different requirements on the number of the fingerprint recognition frames. Therefore, the number of the fingerprint recognition frames can be determined by design according to actual application environment. It is not restricted by the examples given here.

In an embodiment of the present invention, in a current fingerprint recognition cycle, at most part of the point light sources in a finger touching zone may be controlled to emit light. The process may comprise: in each fingerprint recognition frame in the current fingerprint recognition cycle, respectively control a plurality of point light sources in the finger touching zone to emit light, and electric signal generated by each image sensor in the finger touching zone is obtained in each fingerprint recognition frame. That is, in a same fingerprint recognition cycle, point light sources controlled to emit light in different fingerprint recognition frames are different. Further, point light sources controlled to emit light in different fingerprint recognition cycles are different. That is, point light sources controlled to emit light in each fingerprint recognition frame are different. In this way, obtaining different fingerprint electrical signals can be realized.

Figure 23:
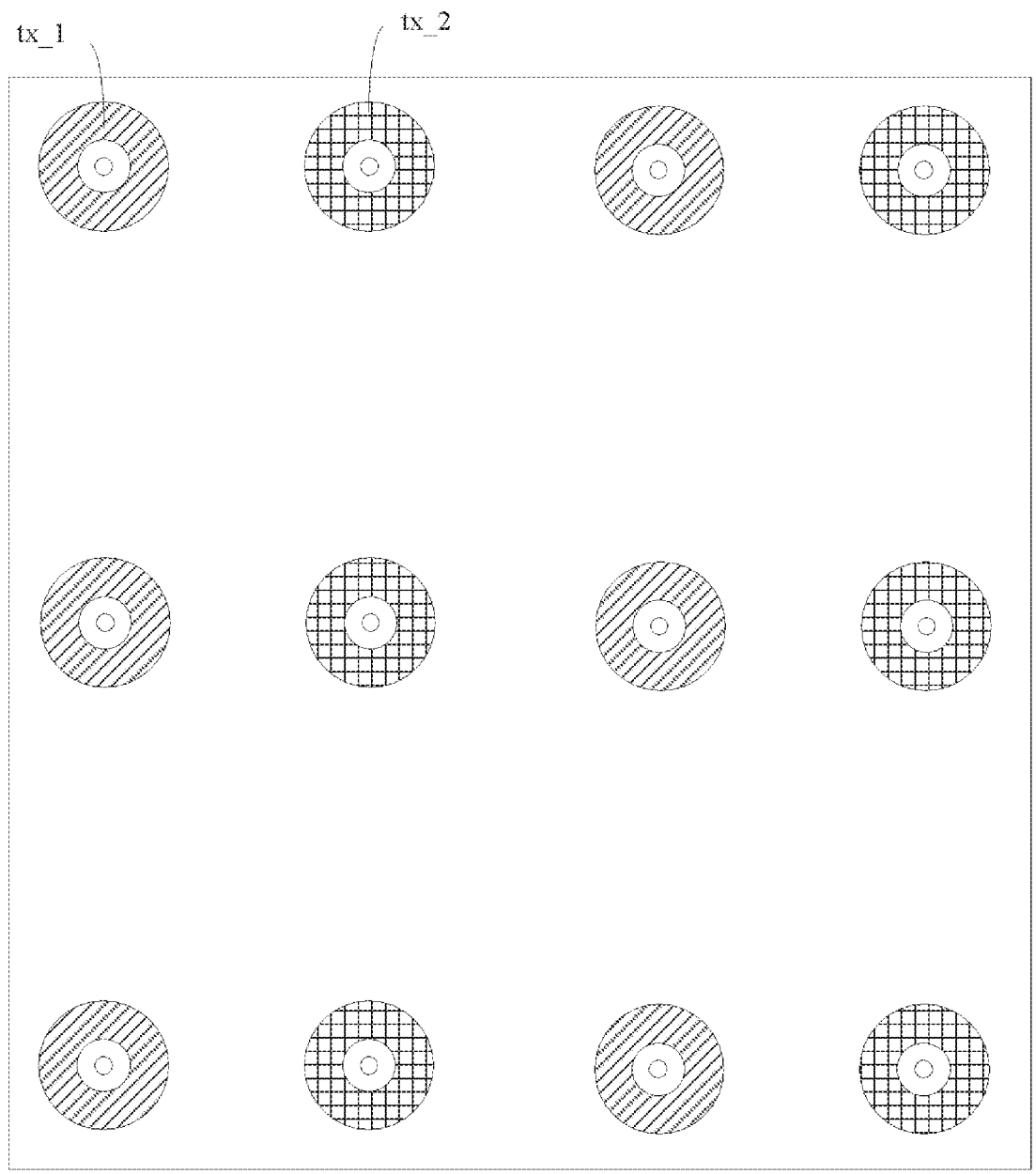
FIG. 23 schematically shows a diagram 4 of imaging zones according to an embodiment of the present invention.

In an embodiment, a fingerprint recognition cycle can be divided into at least two consecutive fingerprint recognition frames. In an embodiment of the present invention, in a same fingerprint recognition cycle, a valid image zone corresponding to point light sources which emit light in a preceding fingerprint recognition frame meets the condition that it doesn't overlap with a valid image zone corresponding to point light sources which emit light in a subsequent fingerprint recognition frame. In an embodiment, in a same fingerprint recognition cycle, a valid image zone corresponding to point light sources which emit light in a preceding fingerprint recognition frame is separated from a valid image zone corresponding to point light sources Which emit light in a subsequent fingerprint recognition frame by a certain distance. For example, a fingerprint recognition cycle is divided into two consecutive fingerprint recognition frames (namely a first fingerprint recognition frame and a second fingerprint recognition frame), as shown in FIG. 23. tx_1 represents a valid image zone corresponding to each point light source which emits light in the first fingerprint recognition frame. tx_2 represents a valid image zone corresponding to each point light source which emits light in the second fingerprint recognition frame. Here, tx_1 and tx_2 are separated by a certain distance. In another embodiment, in a same fingerprint recognition cycle, a valid image zone corresponding to point light sources which emit light in a preceding fingerprint recognition frame satisfies the condition that it is tangent to a valid image zone corresponding to point light sources which emit light in a subsequent fingerprint recognition frame. It is not restricted by the examples given here.

In an embodiment, a plurality of capacitive touch control electrodes located on a substrate are further arranged in a fingerprint recognition apparatus. In an embodiment of the present invention, obtaining a finger touching zone touched by a finger in a fingerprint recognition apparatus may comprise:

obtaining a change of capacitance value corresponding to each capacitive touch control electrode in the fingerprint recognition apparatus; and determining the finger touching zone based on the change of the capacitance value.

Further, in an embodiment, the fingerprint recognition apparatus can also be used as a display apparatus to display an image. In an embodiment of the present invention, the driving method can further comprise a display stage. In the display stage, the fingerprint recognition apparatus can be driven to carry out image display. Further, the fingerprint touch zone can be a zone touched by a finger in a display zone of the fingerprint recognition apparatus. In fingerprint input stage and fingerprint recognition stage, sub-pixels in the finger touching zone may be used as point light sources to emit light, so that fingerprint acquisition is carried out. Pixel units in the display zone except the finger touching zone can be used for image display.

Further, in an embodiment of the present invention, as shown in FIG. 20a to FIG. 20c, as to multiple point light sources which emit light simultaneously, any two point light sources can be separated by at least one sub-pixel. In an embodiment, any two point light sources can be separated by one sub-pixel. Or, any two point light sources can be separated by all sub-pixels in a pixel unit. Or, any two point light sources can be separated by all sub-pixels in a plurality of pixel units.

Figure 24:
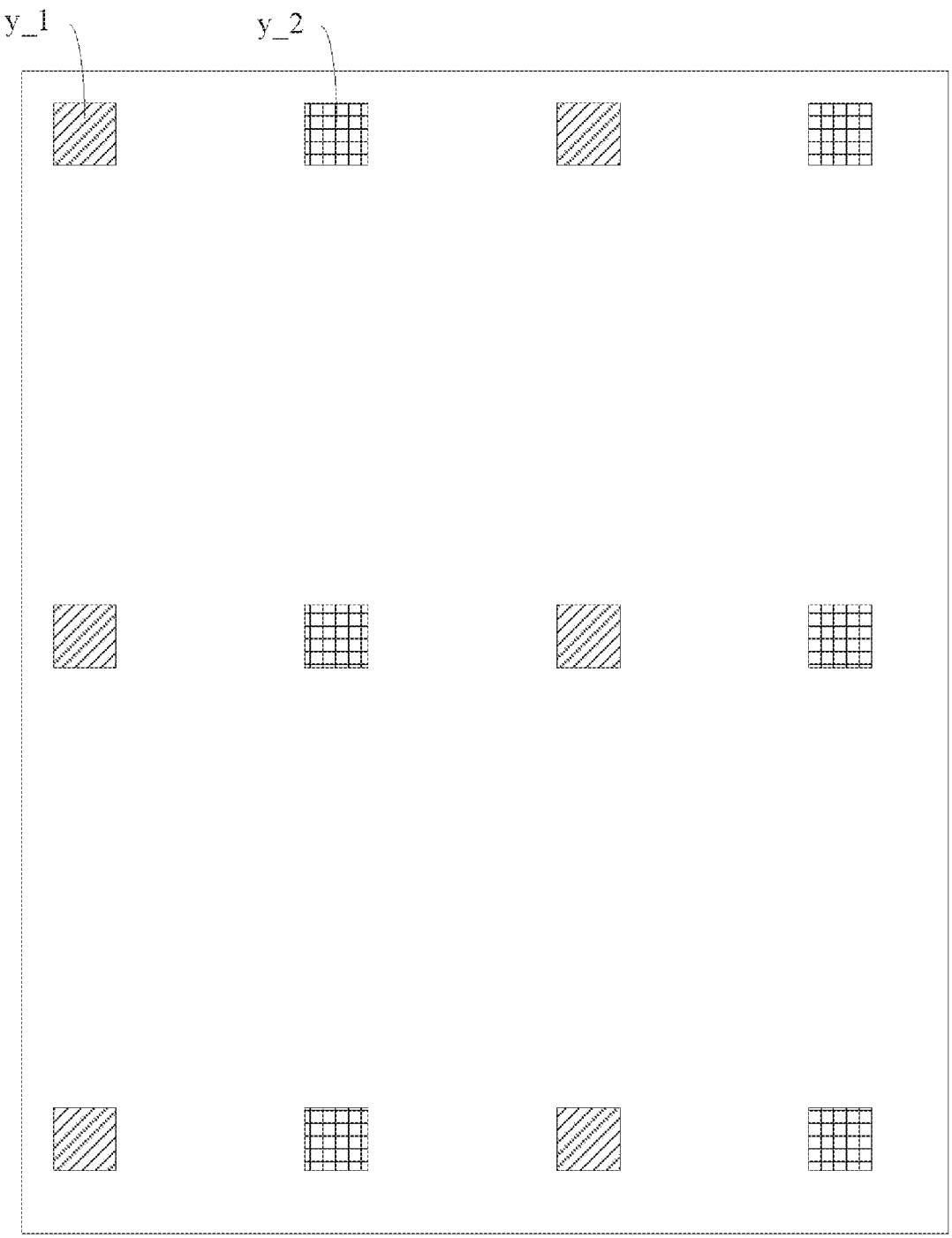
FIG. 24 schematically shows a structural diagram 4 of point light sources according to an embodiment of the present invention.

Because a fingerprint image formed on an image sensor is an amplified image, when multiple point light sources are relatively close, a same image sensor can receive light emitted by the multiple point light sources and reflected by an interface, so that precision of fingerprint acquisition is influenced. In an embodiment, as to multiple point light sources which emit light simultaneously, the number of the sub-pixels separating any two adjacent point light sources which emit light simultaneously can satisfy the condition that the valid image zones corresponding to the two point light sources do not overlap with each other. Here, the number of sub-pixels separating any two adjacent point light sources which emit light simultaneously satisfies condition that the valid image zones corresponding to the two point light sources are tangent to each other. Or, the number of the sub-pixels separating any two point light sources satisfies condition that the valid image zones corresponding to the two point light sources are separated by a certain distance. In an embodiment, as shown in FIG. 23 and FIG. 24, y_1 represents each point light source which emits light in a first fingerprint recognition frame. y_2 represents each point light source which emits light in a second fingerprint recognition frame. tx_1 represents a valid image zone corresponding to each point light source y_1 which emits light in the first fingerprint recognition frame. tx_2 represents a valid image zone corresponding to each point light source y_2 which emits light in the second fingerprint recognition frame. Here, through setting the number of sub-pixels separating any two adjacent point light sources which emit light, the condition that the valid image zones corresponding to the two point light sources are separated by a certain distance is satisfied. Of course, in practical application, the above number of the sub-pixels separating any two adjacent point light sources which emit light simultaneously, can be determined by design according to actual application environment. It is not restricted by the examples given here.

In an embodiment, as shown in FIG. 24, a plurality of point light source which emit light simultaneously may be arranged in an array. For example, all point light sources y_1 are arranged in an array, all point light source y_2 are arranged in an array.

Figure 25:
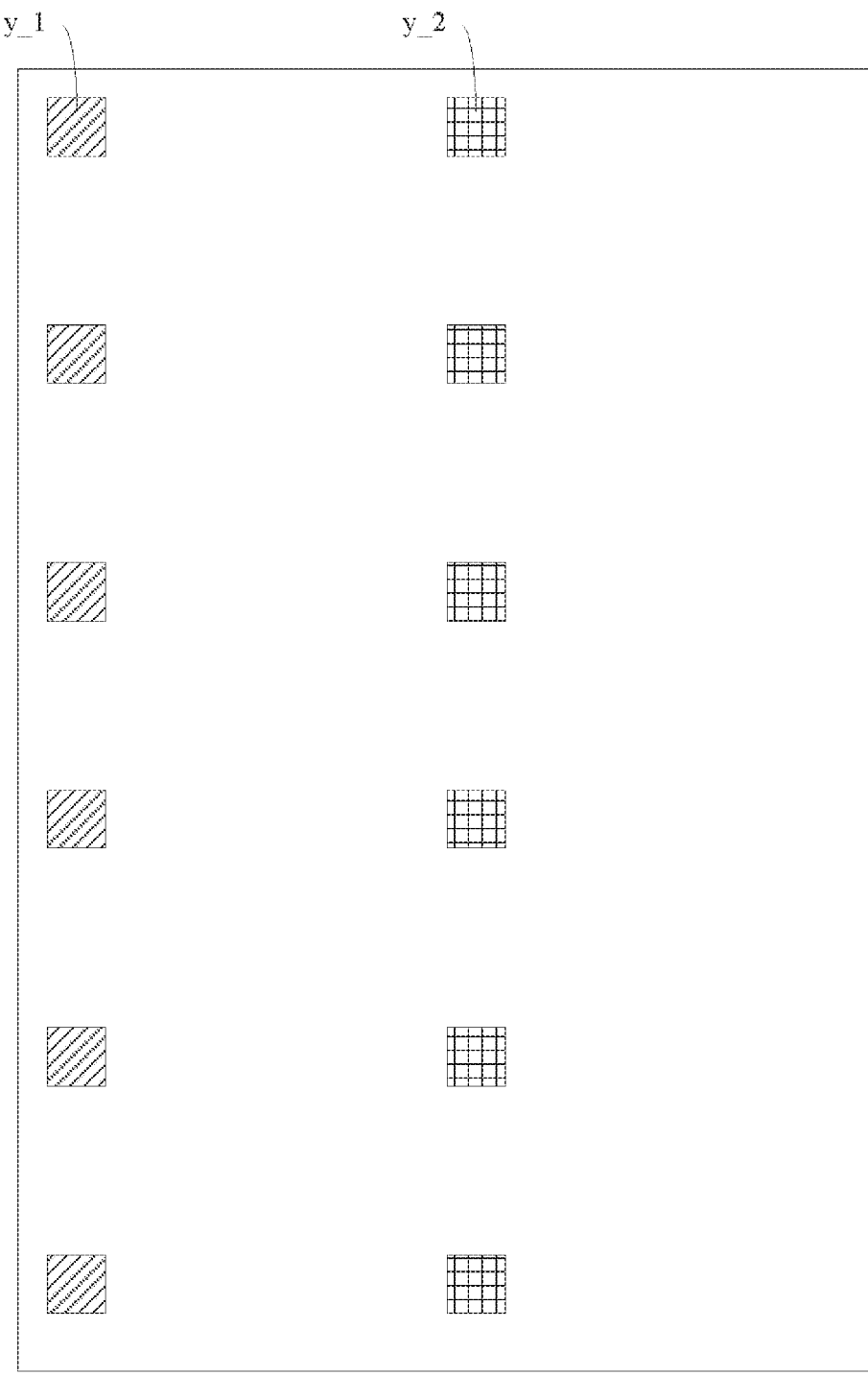
FIG. 25 schematically shows a structural diagram 5 of point light sources according to an embodiment of the present invention.

In another embodiment, as shown in FIG. 25, at least two point light sources may form a point light source group. A plurality of point light sources which emit light simultaneously can be divided into a plurality of point light source groups. In one point light source group, the centers of the zones where the point light sources are located are connected in sequence to form a strip shape. For example, all point light source y_1 form a strip shape, all point light source y_2 form a strip shape.

Figure 26:
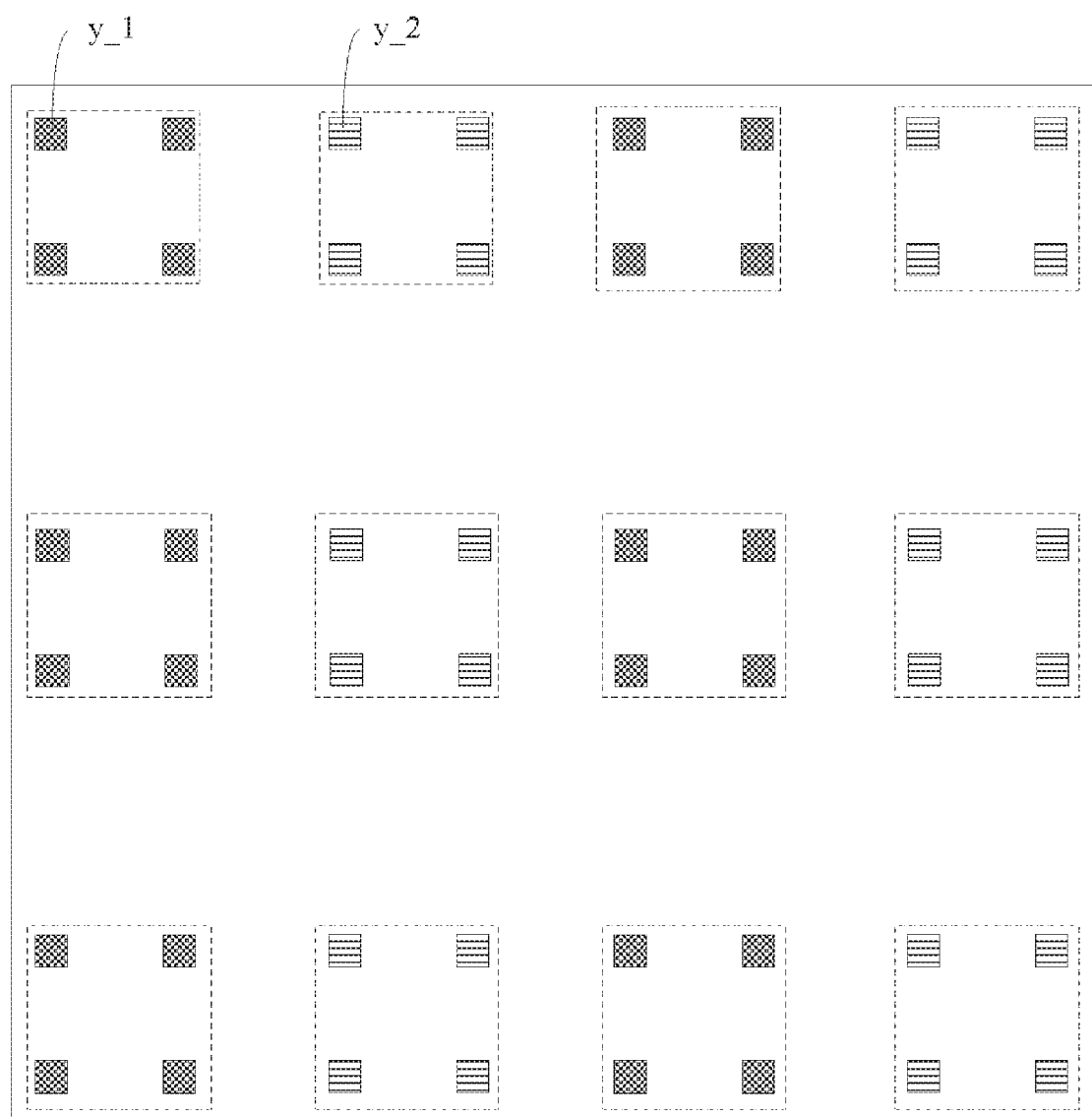
FIG. 26 schematically shows a structural diagram 6 of point light sources according to an embodiment of the present invention.
Figure 27:
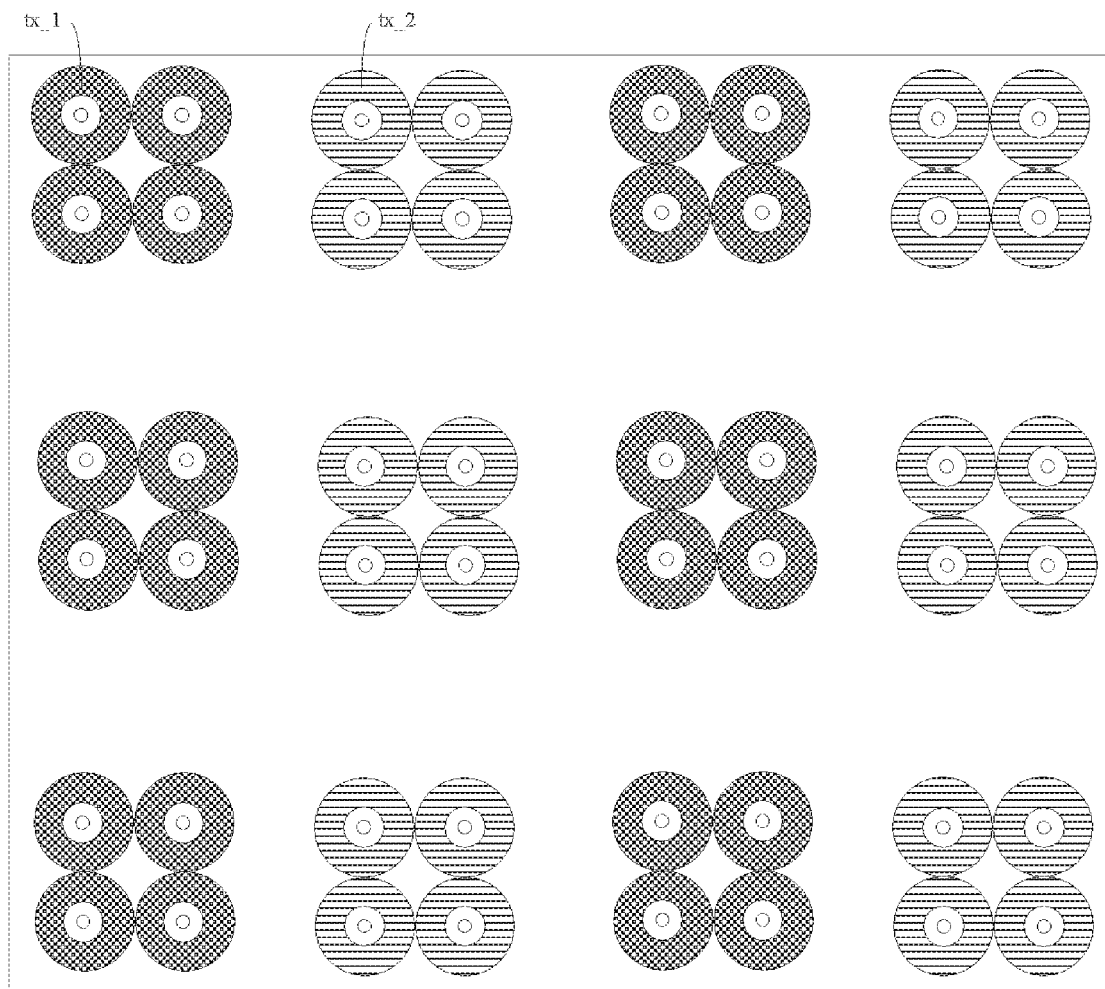
FIG. 27 schematically shows a diagram 5 of imaging zones according to an embodiment of the present invention.

Or, as shown in FIG. 26, at least three point light sources may form a point light source group. A plurality of point light sources which emit light simultaneously are divided into a plurality of point light source groups. In one point light source group, the centers of the zones where the point light sources are located are connected in sequence to form a closed graph. Further, the closed graph can be set as a regular polygon or a circle. Here, the regular polygon can be a regular quadrilateral, a regular pentagon, a regular hexagon, a regular heptagon, or a regular octagon, etc. No limit is made here. For example, as shown in FIG. 26, four point light sources y_1 form a square, four point light sources y_2 form a square. Further, as shown in FIG. 26 and FIG. 27, y_1 represents each point light source which emits light in a first fingerprint recognition frame represents each point light source which emits light in a second fingerprint recognition frame. tx_1 represents a valid image zone corresponding to each point light source y_1 which emits light in the first fingerprint recognition frame. tx_2 represents a valid image zone corresponding to each point light source y_2 which emits light in the second fingerprint recognition frame. In one point light source group, the valid image zones corresponding to two adjacent point light sources can satisfy the condition that they are tangent to each other.

Figure 28A:
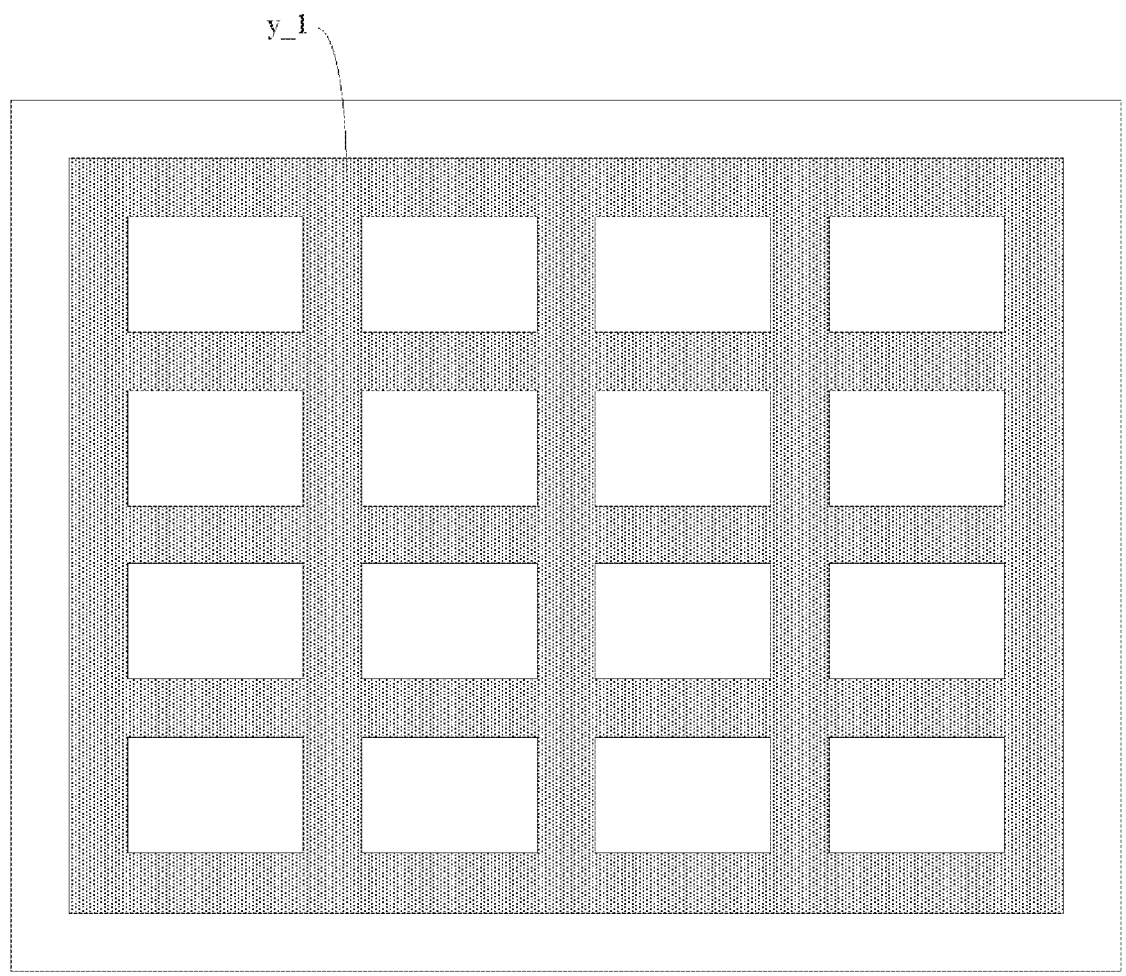
FIG. 28a schematically shows a structural diagram 7 of point light sources according to an embodiment of the present invention.
Figure 28B:
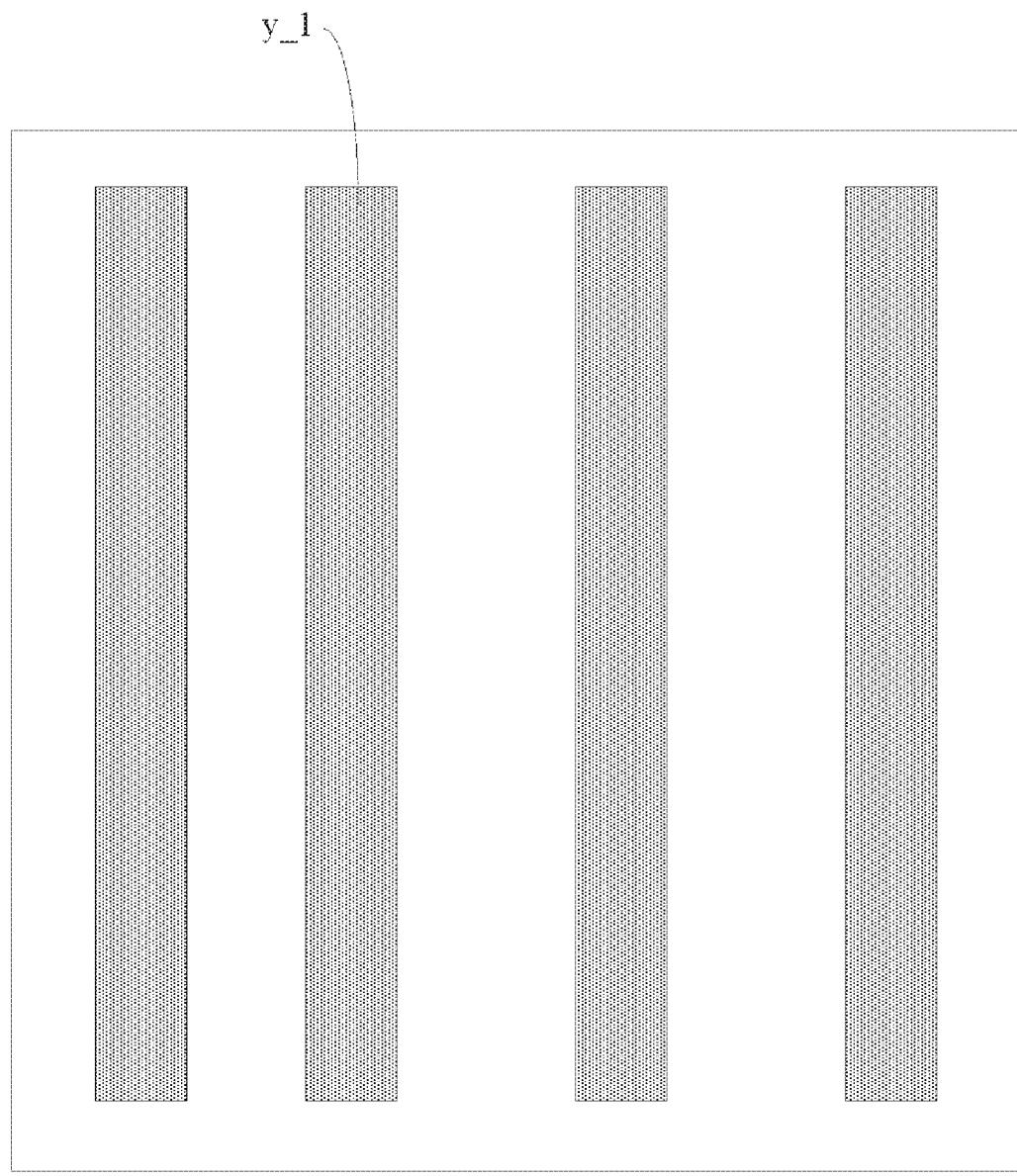
FIG. 28b schematically shows a structural diagram 8 of point light sources according to an embodiment of the present invention.

In an embodiment, as shown in FIG. 28a, a plurality of point light sources y_1 which emit light simultaneously can form a grid pattern. Here, the grid pattern (namely, a shadow area in FIG. 28a) may include a plurality of point light sources which form a line shape. Of course, in various embodiments, the grid pattern can be determined by design according to actual application environment. No limit is made here. Further, the grid patterns may also include a polygon or a circle. Here, the polygon can be a regular quadrilateral, a regular pentagon, a regular hexagon, a regular heptagon, or a regular octagon, etc. No limit is made here. Or, as shown in FIG. 28b, a plurality of point light sources y_1 which emit light simultaneously can form a bar pattern. Of course, a plurality of point light sources which emit light simultaneously can also form a grid pattern and a bar pattern. No limit is made here.

It should be noted that the above setting mode of point light sources is suitable for a fingerprint acquisition in at least one of fingerprint input stage and fingerprint recognition stage. In addition, different application environments have different requirements on valid image zones, invalid image zones and residual image zones. Therefore, embodiments of point light sources can be designed according to above condition and actual application environment. No limit is made here.

One driving method according to an embodiment is described with reference to FIG. 20a, FIG. 22, FIG. 26 and FIG. 27. The driving method according to an embodiment may comprise the following steps:

(1) in a first fingerprint acquisition frame in a first fingerprint acquisition cycle F1_1 in a fingerprint input stage, obtaining information of change of capacitance value corresponding to each capacitive touch control electrode in a fingerprint recognition apparatus; according to the information of change of the capacitance value, after the finger touching zone is determined, controlling each point light source Y1_1 to emit light simultaneously, and obtaining electrical signal generated by each image sensor in the finger touching zone.

(2) in a second fingerprint acquisition frame in a first fingerprint acquisition cycle F2_1, controlling each point light source Y2_1 to emit light simultaneously, and obtaining electrical signal generated by each image sensor in the finger touching zone.

(3) in a third fingerprint acquisition frame in a first fingerprint acquisition cycle F3_1, controlling each point light source Y3_1 to emit light simultaneously, and obtaining electrical signal generated by each image sensor in the finger touching zone.

(4) in a fourth fingerprint acquisition frame in a first fingerprint acquisition cycle F4_1, controlling each point light source Y4_1 to emit light simultaneously, and obtaining electric signal generated by each image sensor in the finger touching zone. Then, the rest is carried out in a way similar to step (1)-(4), until when the sustaining time length of the current fingerprint acquisition cycle meets the preset residual image fading period. The residual images on image sensors which work in a first fingerprint acquisition frame F1_1 can be regarded already eliminated. Thereafter, a subsequent fingerprint acquisition cycle may start, namely, a second fingerprint acquisition cycle.

(5) in a first fingerprint acquisition frame F1_2 of a second fingerprint acquisition cycle, controlling each point light source Y1_2 to emit light simultaneously, and obtaining electric signal generated by each image sensor in the finger touching zone. In this way, electric signal of image sensors corresponding to a residual image zone in a first fingerprint acquisition frame F1_1 can be obtained. Thus, based on the obtained electric signal, the missing part of the fingerprint image in the first fingerprint acquisition frame F1_1 is made up.

(6) in a second fingerprint acquisition frame F1_2 in a second fingerprint acquisition cycle, controlling each point light source Y2_2 to emit light simultaneously, and obtaining electric signal generated by each image sensor in the finger touching zone. In this way, the missing part in the fingerprint image obtained in a second fingerprint acquisition frame F2_1 can be partially made up.

(7) in a third fingerprint acquisition frame F3_2 in a second fingerprint acquisition cycle, controlling each point light source Y3_2 to emit light simultaneously, and obtaining electric signal generated by each image sensor in the finger touching zone. In this way, a missing part in the fingerprint image obtained in a third fingerprint acquisition frame F3_1 can be made up.

(8) in a fourth fingerprint acquisition frame in a second fingerprint acquisition cycle F4_2, controlling each point light source Y4_2 to emit light simultaneously, and obtaining electric signal generated by each image sensor in the finger touching zone. In this way, a missing part in the fingerprint image obtained in a fourth fingerprint acquisition frame F4_1 can be made up.

Then, the rest is carried out in a way similar to step (1)-(8), until all fingerprint acquisition cycles are completed, so that electric signals corresponding to the fingerprints of a finger are all obtained.

(9) based on the electric signals obtained in the fingerprint acquisition cycles, a complete image of the fingerprints of the finger is determined. For example, a complete image of the fingerprints of the finger may be determined by using a stitching method.

(10) extracting image characteristics corresponding to a plurality of fingerprint characteristic points from a complete image and storing them into a fingerprint database.

(11) in a fingerprint recognition stage, in a fingerprint recognition frame SZ_1 in a first fingerprint recognition cycle, obtaining information of change of capacitance value corresponding to each capacitive touch control electrode in a fingerprint recognition apparatus; based on the information of change of the capacitance value, after the finger touching zone is determined, each point light source y_1 is controlled to emit light simultaneously, and obtaining electrical signal generated by each image sensor in the finger touching zone.

(12) then, entering into a fingerprint recognition frame SZ_2. In the fingerprint recognition frame SZ_2, controlling each point light source Y_2 to emit light simultaneously, and obtaining electrical signal generated by each image sensor in the finger touching zone.

(13) based on electric signals obtained in the fingerprint recognition frames SZ_1 and SZ_2, determining image characteristics corresponding to fingerprint characteristic points of the current fingerprint.

(14) determining whether similarity degree between image characteristics corresponding to fingerprint characteristic points in a first fingerprint recognition cycle and image characteristics corresponding to fingerprint characteristic points stored in the fingerprint database meets a preset similarity degree threshold value. If yes, then, step (15) is executed; if not, then step (16) is executed.

(15) it is determined that the current fingerprint matches the stored fingerprint, then, the fingerprint recognition apparatus can be turned on and a subsequent fingerprint recognition stage may start.

(16) It is determined that the current fingerprint does not match the stored fingerprint. Then, the fingerprint recognition apparatus cannot be turned on. A subsequent fingerprint recognition cycle is entered into to carry out fingerprint acquisition again, until it is determined that the current fingerprint matches the stored fingerprint, or until the fingerprint recognition stage is ended.

Figure 29:
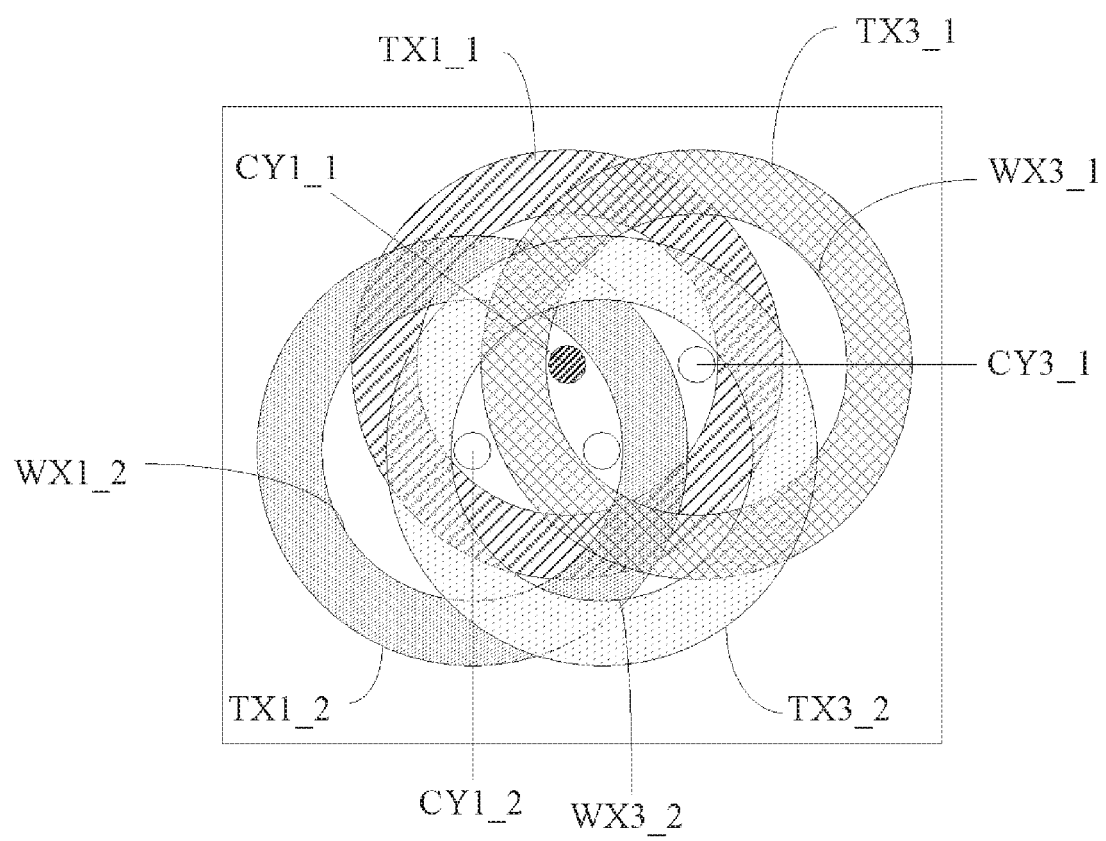
FIG. 29 schematically shows a diagram 6 of imaging zones according to an embodiment of the present invention.

A structural diagram of a display panel corresponding to another embodiment is shown in FIG. 20a and FIG. 29, with variation different from the fingerprint acquisition cycle in the previous embodiment. Only difference between this embodiment and the previous embodiment is described below. The same part is not redundantly described here.

In an embodiment of the present invention, an invalid image zone corresponding to each point light source in an n-th fingerprint acquisition frame in a subsequent fingerprint acquisition cycle can cover a residual image zone corresponding to each point light source in an n-th fingerprint acquisition frame in a preceding fingerprint acquisition cycle. Thus, influence of the residual image zone on accuracy of fingerprints acquired can be further avoided.

Take an example that a fingerprint acquisition cycle includes four fingerprint acquisition frames (namely, first to fourth fingerprint acquisition frame), as shown in FIG. 20a and FIG. 29. Here, TX1_1 represents a valid image zone corresponding to each point light source Y1_1 which emits light in the first fingerprint acquisition frame in a first fingerprint acquisition cycle. TX3_1 represents a valid image zone corresponding to each point light source Y3_1 which emits light in the third fingerprint acquisition frame in the first fingerprint acquisition cycle. CY1_1 represents a residual image zone corresponding to each point light source Y1_1 which emits light in the first fingerprint acquisition frame in the first fingerprint acquisition cycle. WX3_1 represents an invalid image zone corresponding to each point light source Y3_1 which emits light in the third fingerprint acquisition frame in the first fingerprint acquisition cycle. CY3_1 represents a residual image zone corresponding to each point light source Y3_1 which emits light in the third fingerprint acquisition frame in the first fingerprint acquisition cycle. TX1_2 represents a valid image zone corresponding to each point light source Y1_2 which emits light in the first fingerprint acquisition frame in a second fingerprint acquisition cycle. TX3_2 represents a valid image zone corresponding to each point light source Y3_2 which emits light in the third fingerprint acquisition frame in the second fingerprint acquisition cycle. WX1_2 represents an invalid image zone corresponding to each point light source Y1_2 which emits light in the first fingerprint acquisition frame in the second fingerprint acquisition cycle. CY1_2 represents a residual image zone corresponding to each point light source Y1_2 which emits light in the first fingerprint acquisition frame in the second fingerprint acquisition cycle. WX3_2 represents an invalid image zone corresponding to each point light source Y3_2 which emits light in the third fingerprint acquisition frame in the second fingerprint acquisition cycle. Here, WX1_2 covers C1_1. WX3_2 covers CY3_1. Further. WX3_1 covers CY1_1. WX3_2 covers CY1_2.

Figure 30:
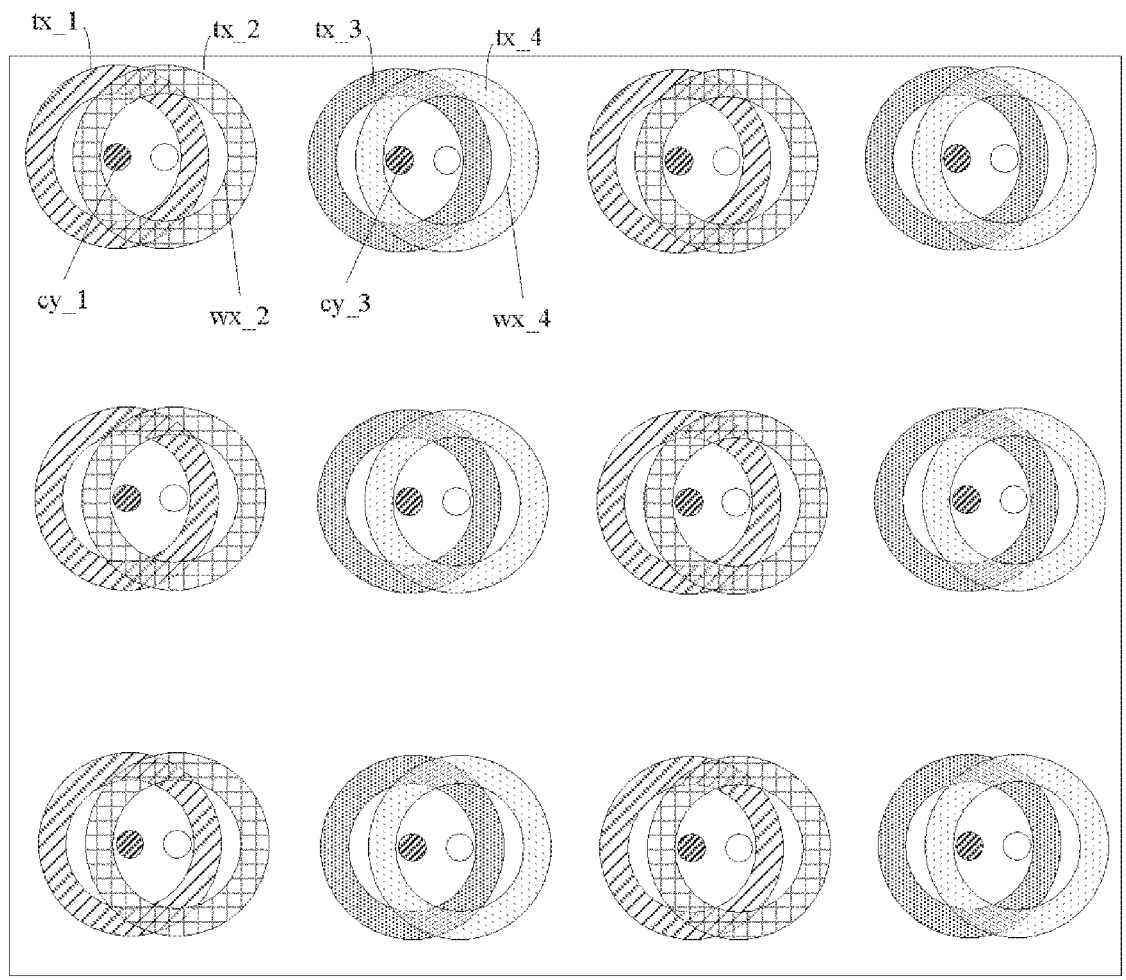
FIG. 30 schematically shows a diagram 7 of imaging zones according to an embodiment of the present invention.

A structural diagram of a display panel corresponding to another embodiment is shown in FIG. 30, with variation for the implementation manner of the fingerprint recognition cycle in the previous embodiment. Only difference between this embodiment and the previous embodiment is described below. The same part is not redundantly described here.

In an embodiment of the present invention, a fingerprint recognition cycle can be divided into at least two consecutive fingerprint recognition frames. Here, two adjacent fingerprint recognition frames may form a recognition frame group. At least two consecutive fingerprint recognition frames may be divided into X consecutive recognition frame groups; here, in a same recognition frame group, an invalid image zone corresponding to point light sources which emit light in a subsequent fingerprint recognition frame covers a residual image zone corresponding to point light sources which emit light in a preceding fingerprint recognition frame. X is an integer larger than or equal to 1.

Further, in an embodiment of the present invention, in one fingerprint recognition cycle, a valid image zone corresponding to each point light source which emits light in a subsequent recognition frame group satisfies the condition that it does not overlap with a valid image zone corresponding to each point light source which emits light in a preceding recognition frame group.

For example, a fingerprint recognition cycle can be divided into four consecutive fingerprint recognition frames, namely a first fingerprint recognition frame to a fourth fingerprint recognition frame. In this way, the first fingerprint recognition frame and the second fingerprint recognition frame are one recognition frame group. The third fingerprint recognition frame and the fourth fingerprint recognition frame are another recognition frame group. As shown in FIG. 30, tx_1 represents a valid image zone corresponding to each point light source which emits light in the first fingerprint recognition frame. tx_2 represents a valid image zone corresponding to each point light source which emits light in the second fingerprint recognition frame. tx_3 represents a valid image zone corresponding to each point light source which emits light in the third fingerprint recognition frame. tx_4 represents a valid image zone corresponding to each point light source which emits light in the fourth fingerprint recognition frame. cy_1 represents a residual image zone corresponding to each point light source which emits light in the first fingerprint recognition frame. wx_2 represents an invalid image zone corresponding to each point light source which emits light in the second fingerprint recognition frame. cy_3 represents a residual image zone corresponding to each point light source which emits light in the third fingerprint recognition frame. wx_4 represents an invalid image zone corresponding to each point light source in the fourth fingerprint recognition frame. Here, wx_2 covers cy_1. wx_4 covers cy_3. Neither tx_1 nor tx_2 has overlap with tx_3 or tx_4.

Figure 31:
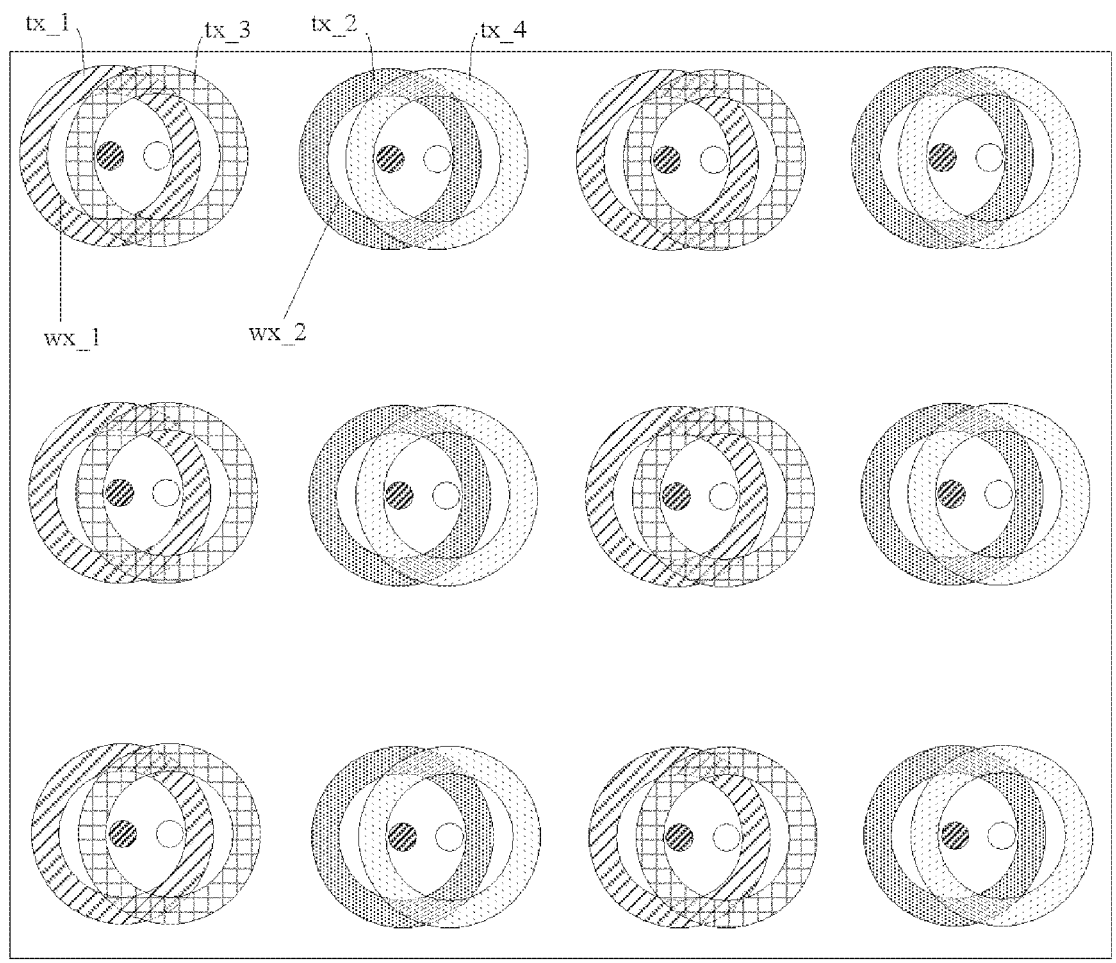
FIG. 31 schematically shows a diagram 8 of imaging zones according to an embodiment of the present invention.

A structural diagram of a display panel corresponding to another embodiment is shown in FIG. 31, with variation for the implementation manner of the fingerprint recognition cycle in the previous embodiment. Only difference between this embodiment and the previous embodiment is described below. The same part is not redundantly described here.

In an embodiment, a fingerprint recognition cycle is divided into at least three consecutive fingerprint recognition frames. In an embodiment of the present invention, in a same fingerprint recognition cycle, as to two fingerprint recognition frames which are separated by at least one fingerprint recognition frame, a valid image zone corresponding to point light sources which emit light in a subsequent fingerprint recognition frame at least partially covers an invalid image zone corresponding to point light sources which emit light in a preceding fingerprint recognition frame. Here, a fingerprint recognition cycle can be divided into four consecutive fingerprint recognition frames, namely a first fingerprint recognition frame to a fourth fingerprint recognition frame. As shown in FIG. 31, tx_1 represents a valid image zone corresponding to each point light source which emits light in the first fingerprint recognition frame. tx_2 represents a valid image zone corresponding to each point light source which emits light in the second fingerprint recognition frame. tx_3 represents a valid image zone corresponding to each point light source which emits light in the third fingerprint recognition frame. tx_4 represents a valid image zone corresponding to each point light source which emits light in the fourth fingerprint recognition frame. wx_1 represents an invalid image zone corresponding to each point light source which emits light in the first fingerprint recognition frame. wx_2 represents an invalid image zone corresponding to each point light source which emits light in the second fingerprint recognition frame. Here, the first fingerprint recognition frame and the third fingerprint recognition frame are separated by one fingerprint recognition frame. The second fingerprint recognition frame and the fourth fingerprint recognition frame are separated by one fingerprint recognition frame. tx_3 partially covers wx_1, tx_4 partially covers wx_2. Of course, a valid image zone corresponding to point light sources which emit light in a subsequent fingerprint recognition frame can cover an invalid image zone corresponding to point light sources which emit light in a preceding fingerprint recognition frame. No limit is made here.

Figure 32:
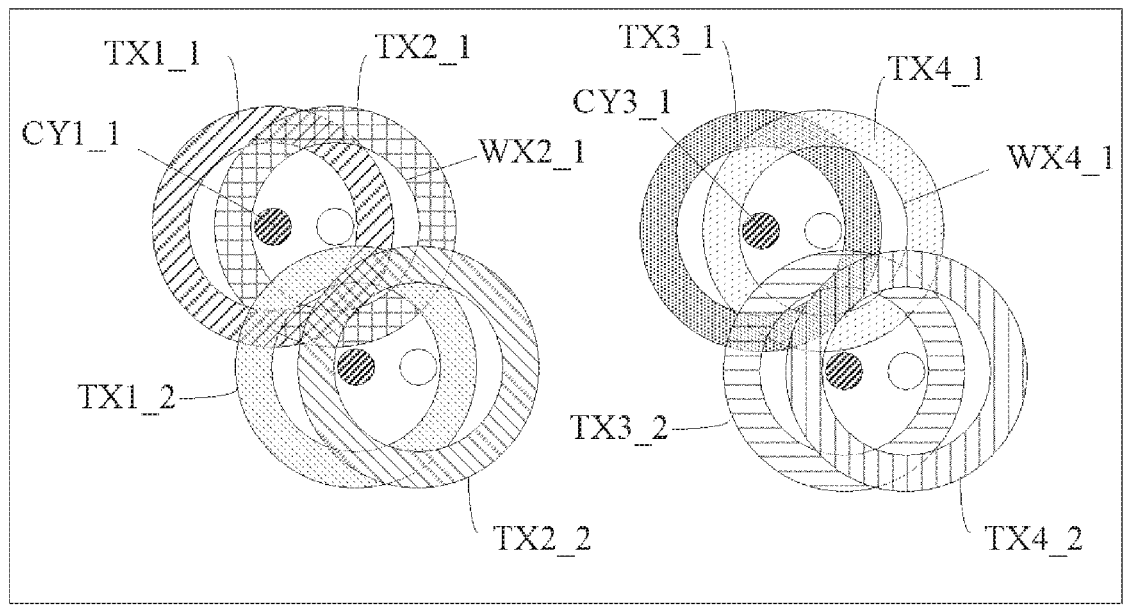
FIG. 32 schematically shows a diagram 9 of imaging zones according to an embodiment of the present invention.

A structural diagram of a display panel corresponding to another embodiment is shown in FIG. 32, with variation for the implementation manner of the fingerprint acquisition cycle in the previous embodiment. Only difference between the embodiment and the previous embodiment is described below. The same part is not redundantly described here.

In an embodiment, each fingerprint acquisition cycle includes: N consecutive fingerprint acquisition frames. In an embodiment of the present invention, two adjacent fingerprint acquisition frames are taken as an acquisition frame group. N fingerprint acquisition frames are divided into M consecutive acquisition frame groups; here, in at least one acquisition frame group, an invalid image zone corresponding to point light sources which emit light in a subsequent fingerprint acquisition frame covers a residual image zone corresponding to point light sources which emit light in a preceding fingerprint acquisition frame; in addition, a valid image zone corresponding to each point light source which emits light in an (m+1)th acquisition frame group satisfies the condition that it does not overlap with a valid image zone corresponding to each point light source which emits light in an m-th acquisition frame group; M is an integer greater than 1. m is an integer greater than or equal to 1 and less than or equal to M−1. Here, in each acquisition frame group, an invalid image zone corresponding to point light sources which emit light in a subsequent fingerprint acquisition frame can cover a residual image zone corresponding to the point light sources which emit light in a preceding fingerprint acquisition frame. No limit is made here.

Take an example that each fingerprint acquisition cycle includes four consecutive fingerprint acquisition frames (namely, a first to a fourth fingerprint acquisition frame). The first fingerprint acquisition frame and the second fingerprint acquisition frame are a first acquisition frame group. The third fingerprint acquisition frame and the fourth fingerprint acquisition frame are a second acquisition frame group. As shown in FIG. 32, TX1_1 represents a valid image zone corresponding to a point light source which emits light in the first fingerprint acquisition frame in a first fingerprint acquisition cycle. TX2_1 represents a valid image zone corresponding to a point light source which emits light in the second fingerprint acquisition frame in the first fingerprint acquisition cycle. TX3_1 represents a valid image zone corresponding to a point light source which emits light in the third fingerprint acquisition frame in the first fingerprint acquisition cycle. TX4_1 represents a valid image zone corresponding to a point light source which emits light in the fourth fingerprint acquisition frame in the first fingerprint acquisition cycle. TX1_2 represents a valid image zone corresponding to a point light source which emits light in the first fingerprint acquisition frame in a second fingerprint acquisition cycle. TX2_2 represents a valid image zone corresponding to a point light source which emits light in the second fingerprint acquisition frame in the second fingerprint acquisition cycle. TX3_2 represents a valid image zone corresponding to a point light source which emits light in the third fingerprint acquisition frame in the second fingerprint acquisition cycle. TX4_2 represents a valid image zone corresponding to a point light source which emits light in the fourth fingerprint acquisition frame in the second fingerprint acquisition cycle. CY1_1 represents a residual image zone corresponding to a point light source which emits light in the first fingerprint acquisition frame in the first fingerprint acquisition cycle. CY3_1 represents a residual image zone corresponding to a point light source which emits light in the third fingerprint acquisition frame in the first fingerprint acquisition cycle. WX2_1 represents an invalid image zone corresponding to a point light source which emits light in the second fingerprint acquisition frame in the first fingerprint acquisition cycle. WX4_1 represents an invalid image zone corresponding to a point light source which emits light in the fourth fingerprint acquisition frame in the first fingerprint acquisition cycle. Here, WX2_1 covers CY1_1. WX4_1 covers CY3_1. Both TX1_1 and TX2_1 have no overlap with TX3_1 and TX4_1. Both TX1_2 and TX2_2 have no overlap with TX3_2 and TX4_2.

Further, in an embodiment of the present invention, for a preceding fingerprint acquisition frame in an m-th acquisition frame group of a subsequent fingerprint acquisition cycle and a subsequent fingerprint acquisition frame in an m-th acquisition frame group of a preceding fingerprint acquisition cycle, a valid image zone corresponding to a point light source which emits light in a preceding fingerprint acquisition frame at least partially covers an invalid image zone corresponding to a point light source which emits light in a subsequent fingerprint acquisition frame. With reference to FIG. 32, when m=1, a preceding fingerprint acquisition frame in a first acquisition frame group of a subsequent fingerprint acquisition cycle is a first fingerprint acquisition frame of a second fingerprint acquisition cycle. A valid image zone corresponding to a point light source which emits light in that fingerprint acquisition frame is TX1_2. A subsequent fingerprint acquisition frame in a first acquisition frame group of a preceding fingerprint acquisition cycle is a second fingerprint acquisition frame of a first fingerprint acquisition cycle. An invalid image zone corresponding to a point light source which emits light in that fingerprint acquisition frame is WX2_1. Here, TX1_2 partially covers WX2_1. For same reason, when m=2, TX3_2 partially covers WX4_1.

Figure 33:
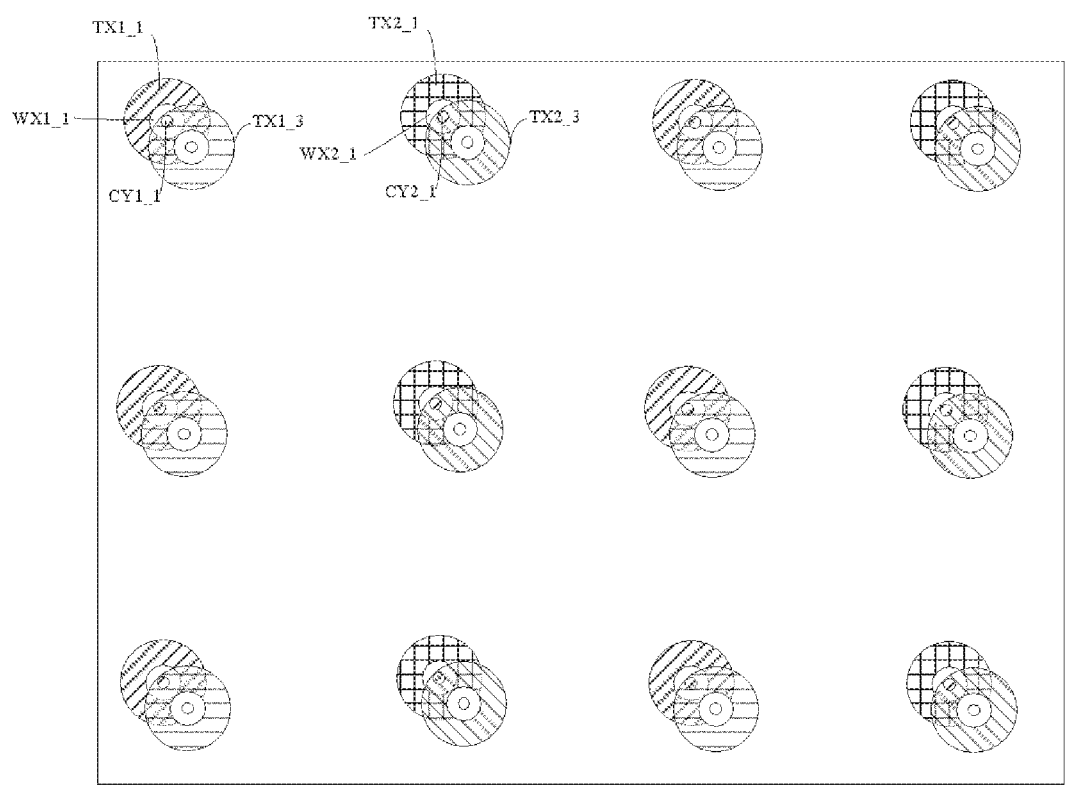
FIG. 33 schematically shows a diagram 10 of imaging zones according to an embodiment of the present invention.
Figure 34:
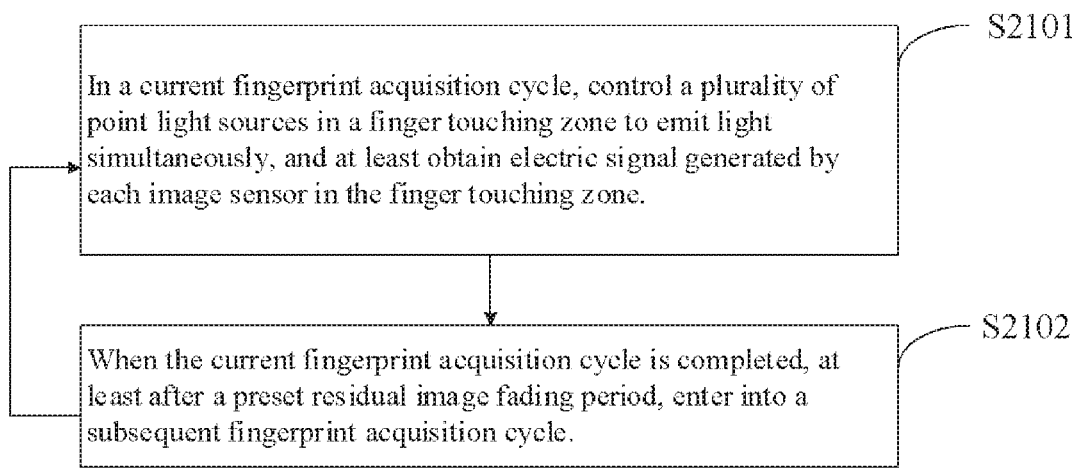
FIG. 34 is a flowchart 2 of a driving method according to an embodiment of the present invention.

A structural schematic diagram of a display panel corresponding to another embodiment is shown in FIG. 33 and FIG. 34, with variation for the implementation manner of the fingerprint acquisition cycle in the previous embodiment. Only difference between the present embodiment and the previous embodiment is described below. The same part is not redundantly described here.

In an embodiment of the present invention, for two fingerprint acquisition cycles which are separated by at least one fingerprint acquisition cycle, a valid image zone corresponding to point light sources which emit light in an n-th fingerprint acquisition frame in a subsequent fingerprint acquisition cycle overlaps with an invalid image zone corresponding to point light sources which emit light in at least one of fingerprint acquisition frames which are from the first to n-th fingerprint acquisition frame of a preceding fingerprint acquisition cycle. Here, a valid image zone corresponding to point light sources which emit light in an n-th fingerprint acquisition frame in a subsequent fingerprint acquisition cycle overlaps with an invalid image zone corresponding to point light sources which emit light in an n-th fingerprint acquisition frame in a preceding fingerprint acquisition cycle. Taking first to third fingerprint acquisition cycles as an example, a valid image zone corresponding to a point light source which emits light in an n-th fingerprint acquisition frame in the third fingerprint acquisition cycle can overlap with an invalid image zone corresponding to a point light source which emits light in an n-th fingerprint acquisition frame in the first fingerprint acquisition cycle. As shown in FIG. 33, TX1_1 represents a valid image zone corresponding to a point light source which emits light in the first fingerprint acquisition frame in the first fingerprint acquisition cycle. TX2_1 represents a valid image zone corresponding to a point light source which emits light in the second fingerprint acquisition frame in the first fingerprint acquisition cycle. TX1_3 represents a valid image zone corresponding to a point light source which emits light in the first fingerprint acquisition frame in the third fingerprint acquisition cycle. TX2_3 represents a valid image zone corresponding to a point light source which emits light in the second fingerprint acquisition frame in the third fingerprint acquisition cycle. WX1_1 represents an invalid image zone corresponding to a point light source which emits light in the first fingerprint acquisition frame in the first fingerprint acquisition cycle. WX2_1 represents an invalid image zone corresponding to a point light source which emits light in the second fingerprint acquisition frame in the first fingerprint acquisition cycle. Here, TX 1_3 partially covers WX1_1. TX2_3 partially covers WX2_1. Of course, other manners can also be used for setting. No limit is made here.

In an embodiment, a valid image zone corresponding to a point light source which emits light in an n-th fingerprint acquisition frame of a subsequent fingerprint acquisition cycle can at least partially cover a residual image corresponding to a point light source which emits light in an n-th fingerprint acquisition frame of a preceding fingerprint acquisition cycle. As shown in FIG. 33, CY1_1 represents a residual image zone corresponding to a point light source which emits light in a first fingerprint acquisition frame in a first fingerprint acquisition cycle. CY2_1 represents a residual image zone corresponding to a point light source which emits light in a second fingerprint acquisition frame in the first fingerprint acquisition cycle. Here, TX1_3 completely covers CY1_1. TX2_3 completely covers CY2_1. Of course, a valid image zone corresponding to a point light source which emits light in an n-th fingerprint acquisition frame of a subsequent fingerprint acquisition cycle can also partially cover a residual image zone corresponding to a point light source which emits light in an n-th fingerprint acquisition frame of a preceding fingerprint acquisition cycle. No limit is made here.

Figure 35:
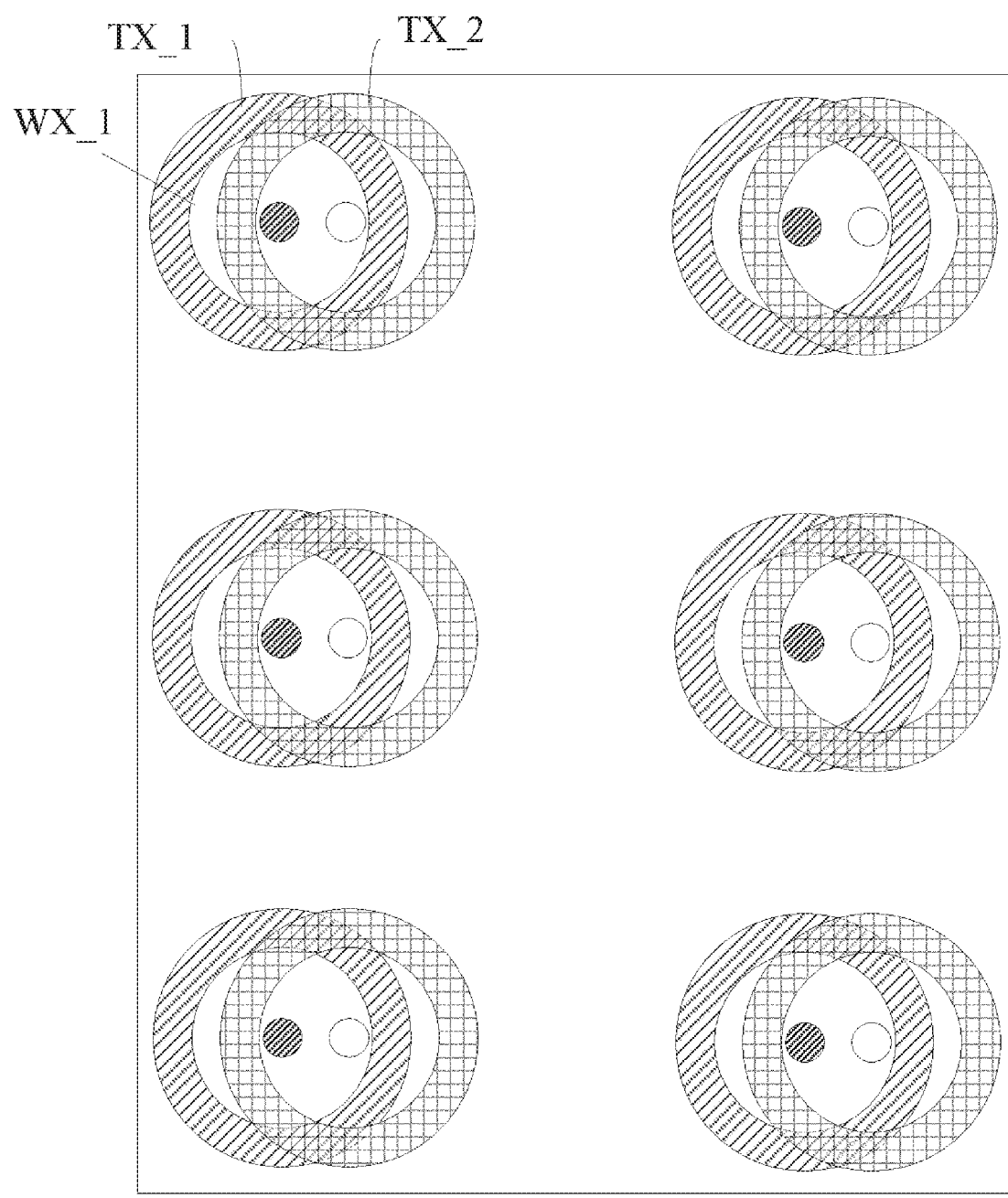
FIG. 35 schematically shows a diagram 11 of imaging zones according to an embodiment of the present invention.

A structural diagram of a display panel corresponding to another embodiment is shown in FIG. 34 and FIG. 35, with variation for the implementation manner of the fingerprint acquisition cycle in the previous embodiment. Only difference between the embodiment and the previous embodiment is described below. The same part is not redundantly described here.

In an embodiment of the present invention, as shown in FIG. 34, point light sources with a same light emitting sequence in two adjacent fingerprint acquisition cycles are controlled to emit light separated by at least a time interval of a preset residual image fading period, so that the time difference between the time when light of a valid image zone received and the time when light of a residual image zone received by a same image sensor in two adjacent fingerprint acquisition cycles is at least the preset residual image fading period. In an embodiment, the process may comprise the following steps:

S2101: in a current fingerprint acquisition cycle, controlling a plurality of point light sources in a finger touching zone to emit light simultaneously, and at least obtaining electric signal generated by each image sensor in the finger touching zone. In an embodiment, electric signal generated by all image sensors in the fingerprint recognition apparatus can be obtained. Or, only electric signal generated by each image sensor in the finger touching zone can be obtained, so that acquisition time of electric signal can be shortened. In order to determine the finger touching zone, in an embodiment, at beginning of a first fingerprint acquisition cycle may include: obtaining the finger touching zone which is touched by a finger in a fingerprint recognition apparatus. Here, in an embodiment, image sensors can be driven according to regions, so as to better obtain electrical signal of image sensors in the finger touching zone.

S2102: when a current fingerprint acquisition cycle is completed, at least after a preset residual image fading period, enter a subsequent fingerprint acquisition cycle; here, point light sources which emit light in the current fingerprint acquisition cycle and in the subsequent fingerprint acquisition cycle are different.

In an embodiment, in the current fingerprint acquisition cycle, a plurality of point light sources in a finger touching zone are controlled to emit light simultaneously. The light is reflected by action of an interface touched by a finger, to be incident on image sensors. Electric signal generated by each image sensor in the finger touching zone can be obtained through acquisition. When the current fingerprint acquisition cycle is completed, through waiting for the preset residual image fading period, a residual image on an image sensor which receives light when point light sources emit light in the current fingerprint acquisition cycle can be regarded as already eliminated, so that a subsequent fingerprint acquisition cycle may start. Therefore, influence of the residual image of the image sensor on electric signal can be avoided. Thus, accuracy of electric signal generated by the image sensor is improved. Further, accuracy of fingerprints acquired is improved, and effectiveness of fingerprint recognition is improved.

In an embodiment, patterns composed of point light sources which emit light in each fingerprint acquisition frame are same. In an embodiment of the present invention, as shown in FIG. 35, a valid image zone corresponding to each point light source which emits light in a subsequent fingerprint acquisition cycle at least partially covers an invalid image zone corresponding to each point light source which emits light in a preceding fingerprint acquisition cycle. Here, as shown in FIG. 35, TX_1 represents a valid image zone corresponding to each point light source which emits light in a first fingerprint acquisition cycle (namely, a preceding fingerprint acquisition cycle). WX_1 represents an invalid image zone corresponding to each point light source which emits light in the first fingerprint acquisition cycle (namely, the preceding fingerprint acquisition cycle). TX_2 represents a valid image zone corresponding to each point light source which emits light in a second fingerprint acquisition cycle (namely, a subsequent fingerprint acquisition cycle). Here, TX_2 partially covers WX_1. Of course, a valid image zone corresponding to each point light source which emits light in the subsequent fingerprint acquisition cycle can completely cover an invalid image zone corresponding to each point light source which emits light in the preceding fingerprint acquisition cycle. No limit is made here.

Of course, in the embodiment, valid image zones corresponding to point light sources which emit light in two adjacent fingerprint acquisition cycles can also satisfy the condition that they do not overlap with each other. No limit is made here.

A driving method according to an embodiment of the present invention is described with reference to FIG. 35, FIG. 26 and FIG. 27. The driving method according to the embodiment of the present invention may comprise the following steps:

(1) In a first fingerprint acquisition cycle in fingerprint input stage, obtain information of change of capacitance value corresponding to each capacitive touch control electrode in a fingerprint recognition apparatus. According to the information of change of the capacitance value, after a finger touching zone is determined, control each point light source to emit light simultaneously, and obtain electric signal generated by each image sensor in the finger touching zone. Here, a valid image zone corresponding to point light sources which emit light in the fingerprint acquisition cycle Z_1 is TX_1.

(2) When the fingerprint acquisition cycle Z_1 is completed, enter a subsequent fingerprint acquisition cycle Z_2 after a preset residual image fading period. In the subsequent fingerprint acquisition cycle Z_2, control each point light source to emit light simultaneously, and obtain electric signal generated by each image sensor in the finger touching zone. Here, a valid image zone corresponding to point light sources which emit light in the fingerprint acquisition cycle Z_2 is TX_2. Thus, a missing part in the fingerprint image obtained in the fingerprint acquisition cycle Z_1 can be made up.

Then, the rest is carried out in a way similar to step (1)-(2). Point light sources can move along a row direction F1, until all fingerprint acquisition cycles are completed, so that all electric signals corresponding to the fingerprints of a finger are obtained.

(4) Based on electric signals obtained in each fingerprint acquisition cycle, determine a complete image of the fingerprints of the finger. In an embodiment, the complete image of the fingerprints of the finger is determined by using a stitching method.

(5) Extract image characteristics corresponding to multiple fingerprint characteristic points from the complete image and store the image characteristics to a fingerprint database.

(6) In fingerprint recognition stage, in a first fingerprint recognition frame SZ_1 of a first fingerprint recognition cycle, obtain information of change of capacitance value corresponding to each capacitive touch control electrode in the fingerprint recognition apparatus. According to the information of change of the capacitance value, after the finger touching zone is determined, control each point light source y_1 to emit light simultaneously, and obtain electrical signals generated by each image sensor in the finger touching zone.

(7) Then, enter a fingerprint recognition frame SZ_2. In the fingerprint recognition frame SZ_2, control each point light source y_2 to emit light simultaneously, and obtain electrical signal generated by each image sensor in the finger touching zone.

(8) Based on electric signal obtained in fingerprint frames SZ_1-SZ_2 of a first fingerprint recognition cycle, determine image characteristics corresponding to the fingerprint characteristic points of the current fingerprint.

(9) Determine whether similarity degree between image characteristics corresponding to fingerprint characteristic points of the first fingerprint recognition cycle and image characteristics corresponding to fingerprint characteristic points stored in the fingerprint database in step (1)-(5) meets a preset similarity degree threshold value. If yes, then step (10) is executed; if not, step (11) is executed.

(10) The current fingerprint is determined to match a stored fingerprint. Then, turn on the fingerprint recognition apparatus, and enter a subsequent fingerprint recognition stage.

(11) The current fingerprint is determined not to match any stored fingerprint. Then, the fingerprint recognition apparatus cannot be turned on, and enter into a subsequent fingerprint recognition cycle to carry out fingerprint acquisition again, until the current fingerprint is determined to match a stored fingerprint, or the fingerprint recognition stage is ended.

An embodiment of the present invention further provides a fingerprint recognition device, comprising a fingerprint recognition apparatus and a driving circuitry. Here, as shown in FIG. 14, the fingerprint recognition apparatus may comprise a substrate 100, a plurality of pixel units 110 located at a side of the substrate 100, and a plurality of image sensors 120 located at a side of the substrate 100 facing the pixel units 110; here, the image sensors 120 are used for receiving light reflected by an interface. Each pixel unit 110 comprises a plurality of sub-pixels 111.

In addition, in a fingerprint input stage, the driving circuitry is configured to control point light sources with a same light emitting sequence in two adjacent fingerprint acquisition cycles to emit light with an interval which is a preset residual image fading period, so that a valid image zone corresponding to point light sources with a same light emitting sequence in a subsequent fingerprint acquisition cycle overlaps with a corresponding residual image zone in a preceding fingerprint acquisition cycle; here, each point light source comprises at least one sub-pixel. When a point light source emits light, a plane where the interface touched by a finger is located has a light transmission zone and a total-reflection zone which surrounds the light transmission zone. After been reflected by an interface, light in the total reflection zone forms an annular image zone on the plane where image sensors are located. The valid image zone surrounds an invalid image zone. The invalid image zone has a residual image zone.

The fingerprint recognition device according to an embodiment, through the driving circuitry, control point light sources with a same light emitting sequence in two adjacent fingerprint acquisition cycles to emit light with an interval which is the preset residual image fading period, so that, a residual image, which is generated after an image sensor in the residual image zone corresponding to point light sources with a same light emitting sequence in a preceding fingerprint acquisition cycle receives light, can dissipate into an error-acceptable range after the preset residual image fading period, so that for the image sensor, the residual image can be regarded as already faded in a subsequent fingerprint acquisition cycle. In this way, a valid image zone corresponding to point light sources with a same light emitting sequence in the subsequent fingerprint acquisition cycle can overlap with a residual image zone corresponding to point light sources with a same light emitting sequence in a preceding fingerprint acquisition cycle, so that a missing part in the preceding fingerprint acquisition cycle is obtained, so that in each fingerprint acquisition cycle, accuracy of electric signal of image sensors in a valid image zone corresponding to point light sources with a same light emitting sequence is improved. Further, accuracy of fingerprints acquired is improved, effectiveness of fingerprint recognition is improved.

In an embodiment, as shown in FIG. 14 and FIG. 18, the image sensors 120 may be located at a side of the substrate 100 opposite the sub-pixel electroluminescent diode 112. Further, in an embodiment, the fingerprint recognition apparatus may further comprise: a support substrate 300 attached to a side of the substrate 100 opposite the sub-pixel 111. Here, the image sensor 120 is arranged on a surface of the support substrate 300 facing the substrate 100. In an embodiment, adhesive is arranged between the support substrate 300 and the substrate 100, so that the support substrate 300 and the substrate 100 can be fitted tightly through the adhesive. Here, the support substrate 300 can be a glass substrate, therefore, photoelectric diodes can be arranged in a large area relative to silicon substrate.

In an embodiment, a photodiode may comprise: a photosensitive diode made of organic photosensitive material, or a PIN diode. Here, an intrinsic layer in the PIN diode can use a-Si, a characteristic layer can use a-Si doped with P or B. Further, in order to prevent external light from affecting the photodiode through transmitting through the support substrate 300, a light-shielding layer can also be arranged between the photodiode and the support substrate. In addition, the orthographic projection of the light-shielding layer on the support substrate covers with the orthographic projection of the photodiode on the support substrate.

In an embodiment, a thin film packaging layer, a touch capacitive electrode layer, a polarizer and a protective glass are sequentially arranged at a side of the electroluminescent diode opposite the substrate 100.

In an embodiment, the fingerprint recognition apparatus can be set as a display apparatus. In this way, the fingerprint recognition apparatus can further have function of display. Further, in a display stage, the drive circuitry can be configured to drive the fingerprint recognition apparatus to display an image. In an embodiment, the display apparatus can be any products or component which has function of display such as: a mobile phone, a tablet computer, a television, a monitor, a notebook computer, a digital photo frame, a navigator, etc. Other components which are indispensable to the display apparatus, as should understood by an ordinary technical person with skill in the art, are not redundantly described here, and also should not be regarded as limit for the present invention.

In an embodiment, the driving circuitry may also implement the steps of any above driving methods according to embodiments of the present invention. No redundant description is given here.

Based on the same inventive concept, an embodiment of the present invention further provides a computer readable storage medium on which a computer program is stored. When the program is executed by a processor, the steps of any one of above driving methods according to embodiments of the present invention are realized. In an embodiment, the present invention can adopt a form of a computer program product implemented on one or more computer readable storage medium that stores a computer usable program code. The computer readable storage medium can be implemented in any type of volatile or non-volatile memory device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or optical disk. The processor may be a central processing unit (CPU) or a field programmable logic array (FPGA) or a microcontroller (MCU) or a digital signal processor (DSP) or a programmable logic device (PLD) or an application specific integrated circuit (ASIC) having data processing capabilities and/or program execution capabilities. When the processor executes the program, the steps of any one of the above driving methods according to embodiments of the present invention are realized.

Based on the same inventive concept, an embodiment of the present invention further provides a computer apparatus comprising a memory, a processor and a computer program which is stored in the memory and can run on the processor.

The driving method of the fingerprint recognition apparatus, the fingerprint recognition device, the computer readable storage medium and computer device according to embodiments of the present invention, through fingerprint input stage, control the interval between the time when light of a residual image zone received and the time when light of a valid image zone received by a same image sensor to be at least a preset residual image fading period. In this way, a residual image generated after the image sensor receiving light of the residual image zone, can dissipate into an error-acceptable range after the preset residual image fading period. Therefore, when the image sensor receives light in a valid image zone, the residual image can be regarded as already eliminated, so that accuracy of electric signal generated by the image sensor is improved. Further, accuracy of fingerprints acquired is improved, and effectiveness of fingerprint recognition is improved.

In some embodiments, the method includes driving a first subset of a plurality of light sources located on an apparatus to turn on; capturing a first fingerprint acquisition frame using a plurality of image sensors on the apparatus, wherein, for each light source of the plurality of light sources being turned on, light reflected from a finger touching interface forms a valid image zone and an invalid image zone, and the first fingerprint acquisition frame includes a first set of valid image zones and a first set of invalid image zones generated by the first subset of the plurality of light sources being turned on; driving a second subset of the plurality of light sources to turn on, the second subset of the plurality of light sources having no overlap with the first subset of the plurality of light sources; and capturing a second fingerprint acquisition frame using the plurality of image sensors, wherein the second fingerprint acquisition frame includes a second set of valid image zones and a second set of invalid image zones generated by the second subset of the plurality of light sources being turned on, and the second set of valid image zones at least partially covers areas of the finger touching interface different from the first set of valid image zones.

Optionally, each invalid image zone further includes a residual image zone that contains a residual image after a fingerprint acquisition frame has been captured, at least one of the plurality of image sensors is positioned in a residual image zone of the first fingerprint acquisition frame and in a valid image zone of the second fingerprint acquisition frame, and the second fingerprint acquisition frame is captured at least a preset residual image fading period later after the first fingerprint acquisition frame is captured.

Optionally, the first fingerprint acquisition frame is captured during a first fingerprint acquisition cycle and the second fingerprint acquisition frame is captured in a second fingerprint acquisition cycle that is after the first fingerprint acquisition cycle; the first and second subsets of the plurality of light sources are turned on at a same time slot during their respective fingerprint acquisition cycles.

Optionally, the first and second fingerprint acquisition cycles are part of a plurality of fingerprint acquisition cycles, each of the plurality of fingerprint acquisition cycles includes obtaining N fingerprint acquisition frames with N being an integer larger than one, obtaining each of the N fingerprint acquisition frames includes driving different subsets of the plurality of light sources within a finger touching zone to turn on simultaneously and obtaining electrical signals from at least some image sensors of the plurality of image sensors located in the finger touching zone, the valid image zones of any one of the N fingerprint acquisition frames do not overlap with the residual image zones of any other one of the N fingerprint acquisition frames, and a subsequent fingerprint acquisition cycle starts after a preceding fingerprint acquisition cycle has lasted the preset residual image fading period.

Optionally, the second fingerprint acquisition frame is an n-th fingerprint acquisition frame during the second fingerprint acquisition cycle, and the first fingerprint acquisition frame is one of first to n-th fingerprint acquisition frames during the first fingerprint acquisition cycle, n is a positive integer less than or equal to N.

Optionally, the second fingerprint acquisition frame has at least one valid image zone at least partially overlap with one residual image zone of an n-th fingerprint acquisition frame during a preceding fingerprint acquisition cycle.

Optionally, the second fingerprint acquisition frame has at least one invalid image zone at least partially overlap with one residual image zone of an n-th fingerprint acquisition frame during a preceding fingerprint acquisition cycle.

Optionally, the apparatus is a display panel, the plurality of light sources are sub-pixels of the display panel and the finger touching interface is a cover glass of the display panel.

Optionally, the method further includes sequentially driving different subsets of the plurality of light sources to turn on and capturing different fingerprint acquisition frames using the plurality of image sensors; combining all captured fingerprint acquisition frames to obtain a fingerprint image; extracting a first set of fingerprint characteristics from the fingerprint image; and storing the first set of fingerprint characteristics extracted from the fingerprint image to a fingerprint database.

Optionally, the method further includes capturing one or more fingerprint acquisition frames; obtaining a second set of fingerprint characteristics from the one or more fingerprint acquisition frames; and comparing the second set of fingerprint characteristics with the first set of fingerprint characteristics stored in the fingerprint database to determine whether there is a fingerprint match.

Optionally, at least one of the one or more fingerprint acquisition frames has valid image zones overlapping with invalid image zones in another one of the one or more fingerprint acquisition frames.

Optionally, the method further includes obtaining a set of fingerprint characteristics from the first and second fingerprint acquisition frames; and comparing the set of fingerprint characteristics with fingerprint characteristics stored in a fingerprint database.

Optionally, the method further includes determining a finger touching zone on the apparatus, wherein the apparatus comprises a plurality of capacitive touch control electrodes configured to change their respective capacitance values in response to pressure on the finger touching interface, the plurality of light sources are located within the finger touching zone.

In some embodiments, the computer program product includes a non-transitory computer readable medium having instructions recorded thereon, the instructions executed by a processor implementing a method described herein.

In some embodiments, the apparatus includes a cover glass; a plurality of light sources configured to shine their light on the cover glass when turned on; a plurality of image sensors configured to capture light reflected from the cover glass; and control circuitry configured to drive a first subset of the plurality of light sources to turn on; capture a first fingerprint acquisition frame using at least a subset of the plurality of image sensors, wherein, for each light source being turned on, light reflected from the cover glass forms a valid image zone and an invalid image zone, and the first fingerprint acquisition frame includes a first set of valid image zones and a first set of invalid image zones generated by the first subset of the plurality of light sources being turned on; and perform fingerprint recognition using the first fingerprint acquisition frame.

Optionally, the apparatus further includes a substrate and a support substrate, wherein the plurality of light sources are a plurality of sub-pixels located on the substrate and the plurality of image sensors are located on the support substrate, and the support substrate is glued to the substrate.

Optionally, the control circuitry is further configured to drive a second subset of the plurality of light sources to turn on, the second subset of the plurality of light sources does no overlap with the first subset of the plurality of light sources; and capture a second fingerprint acquisition frame using at least the subset of the plurality of image sensors, wherein the second fingerprint acquisition frame includes a second set of valid image zones and a second set of invalid image zones generated by the second subset of the plurality of light sources being turned on, and the second set of valid image zones at least partially cover areas of the cover glass different from the first set of valid image zones.

Optionally, the apparatus further includes combining the first and second fingerprint acquisition frames for the fingerprint recognition.

Optionally, each of the plurality of light sources is a point light source and the first subset of light sources form a repeated pattern of rectangles, polygons with more than four sides or circles.

Optionally, each of the valid image zone is formed by light reflected from a total reflection zone of one of the plurality of light sources on the cover glass.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A photo-sensing detection apparatus, comprising a counter substrate; an array substrate facing the counter substrate; and a fingerprint sensing driver;
wherein the array substrate comprises:
a plurality of light sources configured to emit light toward the counter substrate, at least a portion of the light being totally reflected by a surface of the counter substrate away from the array substrate; and
a photosensor configured to detect the at least the portion of the light being totally reflected by the surface of the counter substrate away from the array substrate;
wherein the photo-sensing detection apparatus is configured to be operated in a time-division mode comprising a plurality of time-sequential photo-sensing modes; and
the fingerprint sensing driver is configured to detect a fingerprint information by integrating signals detected in the plurality of time-sequential photo-sensing modes.

2. The photo-sensing detection apparatus of claim 1, wherein, in a respective one of the plurality of time-sequential photo-sensing modes, a plurality of light emitting blocks spaced apart are configured to emit light, which is respectively reflected by a plurality of touch sub-regions in the surface of the counter substrate away from the array substrate;
wherein the plurality of touch sub-regions are spaced apart from each other.

3. The photo-sensing detection apparatus of claim 2, wherein, in a respective one of the plurality of time-sequential photo-sensing modes, light respectively reflected by the plurality of touch sub-regions in the surface of the counter substrate away from the array substrate is respectively detected by a plurality of sensing sub-regions in the photosensor; and
the plurality of sensing sub-regions in the photosensor are substantially non-overlapping.

4. The photo-sensing detection apparatus of claim 3, wherein adjacent sensing sub-regions of the plurality of sensing sub-regions abut each other.

5. The photo-sensing detection apparatus of claim 1, wherein the plurality of time-sequential photo-sensing modes comprise a first mode and a second mode;
a plurality of first light emitting blocks spaced apart are configured to emit light in the first mode, which is respectively reflected by a plurality of first touch sub-regions in the surface of the counter substrate away from the array substrate;
a plurality of second light emitting blocks spaced apart are configured to emit light in the second mode, which is respectively reflected by a plurality of second touch sub-regions in the surface of the counter substrate away from the array substrate;
the plurality of first touch sub-regions are spaced apart from each other; and
the plurality of second touch sub-regions are spaced apart from each other.

6. The photo-sensing detection apparatus of claim 5, wherein light respectively reflected by the plurality of first touch sub-regions in the surface of the counter substrate away from the array substrate is respectively detected by a plurality of first sensing sub-regions in a first sensing region in the photosensor;
light respectively reflected by the plurality of second touch sub-regions in the surface of the counter substrate away from the array substrate is respectively detected by a plurality of second sensing sub-regions in a second sensing region in the photosensor;
the first sensing region and the second sensing region are partially overlapping;
the plurality of first sensing sub-regions are substantially non-overlapping; and
the plurality of second sensing sub-regions are substantially non-overlapping.

7. The photo-sensing detection apparatus of claim 5, wherein a total number of the plurality of first light emitting blocks and a total number of the plurality of second light emitting blocks are substantially same.

8. The photo-sensing detection apparatus of claim 5, wherein positions of the plurality of first light emitting blocks and positions of the plurality of second light emitting blocks are related by a translational displacement.

9. The photo-sensing detection apparatus of claim 1, wherein, in a respective one of the plurality of time-sequential photo-sensing modes, a plurality of light emitting blocks are configured to emit light; and
the plurality of light emitting blocks have a substantially same size.

10. The photo-sensing detection apparatus of claim 9, wherein the substantially same size is a size optimized for achieving a maximum value of a contrast value;
wherein the contrast value is defined by $$\frac{|Sr - Sv|}{|Sr + Sv|};$$

wherein Sr stands for signals corresponding to ridges of a fingerprint; and
Sv stands for signals corresponding to valleys of the fingerprint.

11. The photo-sensing detection apparatus of claim 9, wherein a respective one of the plurality of light emitting blocks comprises a (9 subpixel×9 subpixel) block.

12. A display apparatus, comprising the photo-sensing detection apparatus of claim 1;
wherein the display apparatus is operated in a time-division mode comprising a display mode and a fingerprint sensing mode;
the display apparatus is configured to display an image in the display mode; and
the photo-sensing detection apparatus is configured to detect a fingerprint in the fingerprint sensing mode.

13. The display apparatus of claim 12, wherein the display apparatus is substantially absent of any vacuum space at least in a display area of the display apparatus and between the array substrate and the counter substrate.

14. The display apparatus of claim 13, further comprising an optical clear resin layer substantially throughout the display area and a peripheral area of the display apparatus.

15. The display apparatus of claim 14, wherein the optical clear resin layer comprises an optically clear adhesive.

16. The display apparatus of claim 13, further comprising an optical clear resin layer substantially throughout a peripheral area of the display apparatus and a medium layer substantially throughout the display area of the display apparatus.

17. The display apparatus of claim 16, wherein the medium layer comprises silicone oil.

18. A method of fingerprint detection, comprising:
operating a photo-sensing detection apparatus in a time-division mode comprising a plurality of time-sequential photo-sensing modes; and
integrating signals detected in the plurality of time-sequential photo-sensing modes to detect a fingerprint information;
wherein the photo-sensing detection apparatus comprises a counter substrate; an array substrate facing the counter substrate; and a fingerprint sensing driver;
wherein, in a respective one of the plurality of time-sequential photo-sensing modes, the method comprises:
emitting light using a plurality of light sources toward the counter substrate, at least a portion of the light being totally reflected by a surface of the counter substrate away from the array substrate; and
detecting the at least the portion of the light being totally reflected by the surface of the counter substrate away from the array substrate using a photosensor.

19. The method of claim 18, in a respective one of the plurality of time-sequential photo-sensing modes, the method comprises driving a plurality of light emitting blocks spaced apart to respectively emit light, which is respectively reflected by a plurality of touch sub-regions in a surface of the counter substrate away from the array substrate;
wherein the plurality of touch sub-regions are spaced apart from each other.

20. A method of operating a display apparatus, comprising operating the display apparatus in a time-division mode comprising a display mode and a fingerprint sensing mode;
wherein, in the display mode, the method comprises displaying an image using the display apparatus; and
in the fingerprint sensing mode, the method comprises detecting a fingerprint according to the method of claim 18; and
the fingerprint sensing mode comprises the plurality of time-sequential photo-sensing modes.

\* \* \* \* \*